(12) United States Patent
Rotschild et al.

(10) Patent No.: US 12,281,601 B2
(45) Date of Patent: *Apr. 22, 2025

(54) HEAT ENGINE

(71) Applicant: TECHNION RESEARCH & DEVELOPMENT FOUNDATION LIMITED, Haifa (IL)

(72) Inventors: Carmel Rotschild, Haifa (IL); Joseph Cassell, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,132

(22) Filed: Jan. 24, 2024

(65) Prior Publication Data

US 2024/0200474 A1 Jun. 20, 2024

Related U.S. Application Data

(63) Continuation of application No. 18/024,061, filed as application No. PCT/IL2021/051061 on Aug. 30, 2021.

(Continued)

(51) Int. Cl.
*F01K 27/00* (2006.01)
*F01K 7/36* (2006.01)
(Continued)

(52) U.S. Cl.
CPC .............. *F01K 27/005* (2013.01); *F01K 7/36* (2013.01); *F01K 21/04* (2013.01); *F01K 23/02* (2013.01); *F01K 25/06* (2013.01); *F02C 1/04* (2013.01)

(58) Field of Classification Search
CPC ........ F01K 27/005; F01K 21/04; F01K 25/06; F01K 7/36; F01K 23/02; F02C 1/04
(Continued)

(56) References Cited

U.S. PATENT DOCUMENTS 3,456,454 A 7/1969 Kantor
3,972,195 A 8/1976 Hays et al.
(Continued)

FOREIGN PATENT DOCUMENTS

DE 19742677 A1 4/1999
WO 2008064197 A2 5/2008
(Continued)

OTHER PUBLICATIONS

Alon Gany, Innovative Concepts for High-Speed Underwater Propulsion International Journal of Energetic Materials and Chemical Propulsion, 17(2):83-109 (2018).
(Continued)

*Primary Examiner* — Hoang M Nguyen
(74) *Attorney, Agent, or Firm* — CANTOR COLBURN LLP

(57) ABSTRACT

A method for converting heat to mechanical work includes providing incoming heat transfer liquid (HTL) at a first temperature to a plurality of mixing chambers, providing incoming compressed gas at a second temperature to the plurality of mixing chamber, enabling the gas and the HTL to mix, producing a gas-and-HTL mix, enabling the HTL in the gas-and-HTL mix to heat the gas and isothermal expansion of the gas in the gas-and-HTL mix, limiting volume of the gas-and-HTL mix, thereby increasing pressure of the gas and causing acceleration of a flow of the gas-and-HTL mix, causing the gas-and-HTL mix to eject through a plurality of nozzles, thereby converting the heat of the HTL to kinetic energy to cause movement of the plurality of nozzles; and using the kinetic energy to produce mechanical work.

5 Claims, 22 Drawing Sheets

Related U.S. Application Data

(60) Provisional application No. 63/184,928, filed on May 6, 2021, provisional application No. 63/074,485, filed on Sep. 4, 2020.

(51) Int. Cl.
 *F01K 21/04* (2006.01)
 *F01K 23/02* (2006.01)
 *F01K 25/06* (2006.01)
 *F02C 1/04* (2006.01)

(58) Field of Classification Search
 USPC .......................................................... 60/649
 See application file for complete search history.

(56) References Cited

U.S. PATENT DOCUMENTS

| | | | |
|---|---|---|---|
| 5,598,700 | A | 2/1997 | Varshay |
| 5,771,693 | A | 6/1998 | Coney |
| 11,927,117 | B2 * | 3/2024 | Rotschild ................ F01K 25/06 |
| 2005/0072154 | A1 | 4/2005 | Frutschi |
| 2009/0260361 | A1 | 10/2009 | Pruitt |
| 2010/0011760 | A1 | 1/2010 | Scampini |
| 2018/0306067 | A1 | 10/2018 | Dearman et al. |

FOREIGN PATENT DOCUMENTS

| | | |
|---|---|---|
| WO | 2010130981 A2 | 11/2010 |
| WO | 2020002818 A1 | 1/2020 |
| WO | 2022049573 A2 | 3/2022 |

OTHER PUBLICATIONS

International Preliminary Report on Patentability for corresponding application PCT/IL2021/051061 filed Aug. 30, 2021; Mail date Feb. 18, 2023.
International Search Report for corresponding application PCT/IL2021/051061 filed Aug. 30, 2021; Mail date Feb. 18, 2022.
Nachum E. Eisen, "Theoretical Performance Evaluation of a Marine Solid Propellant Water-Breathing Ramjet Propulsor", J. Mar. Sci. Eng. 2020, 8, 8; doi: 10.3390/jmse8010008, www.mdpi.com/journal/jmse.
Written Opinion for corresponding application PCT/IL2021/051061 filed Aug. 30, 2021; Mail date Feb. 18, 2022.

* cited by examiner

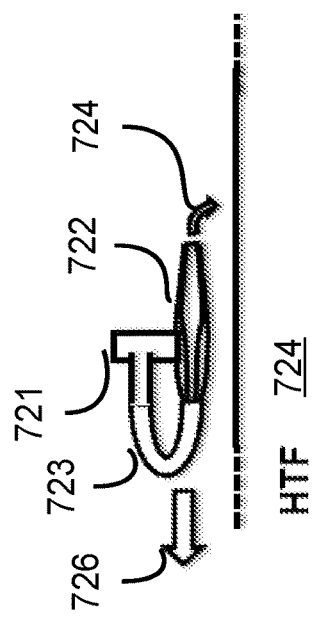
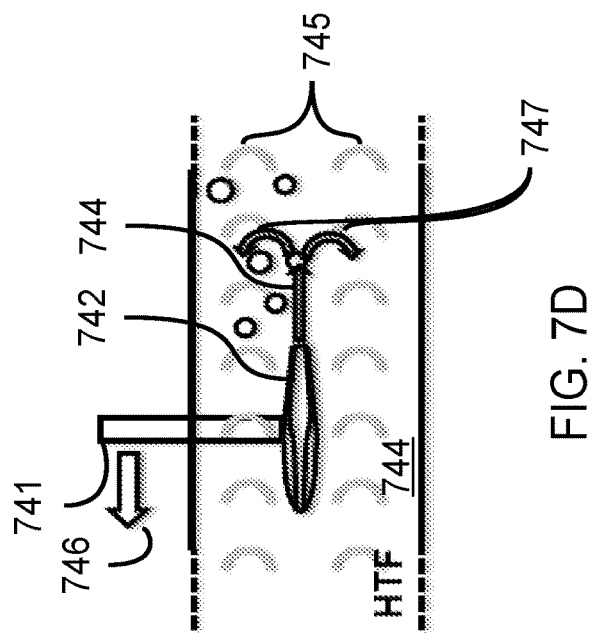
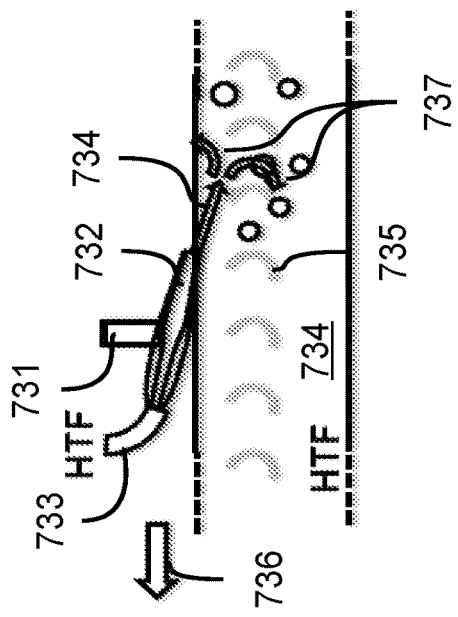
FIG. 7B
FIG. 7C
FIG. 7D

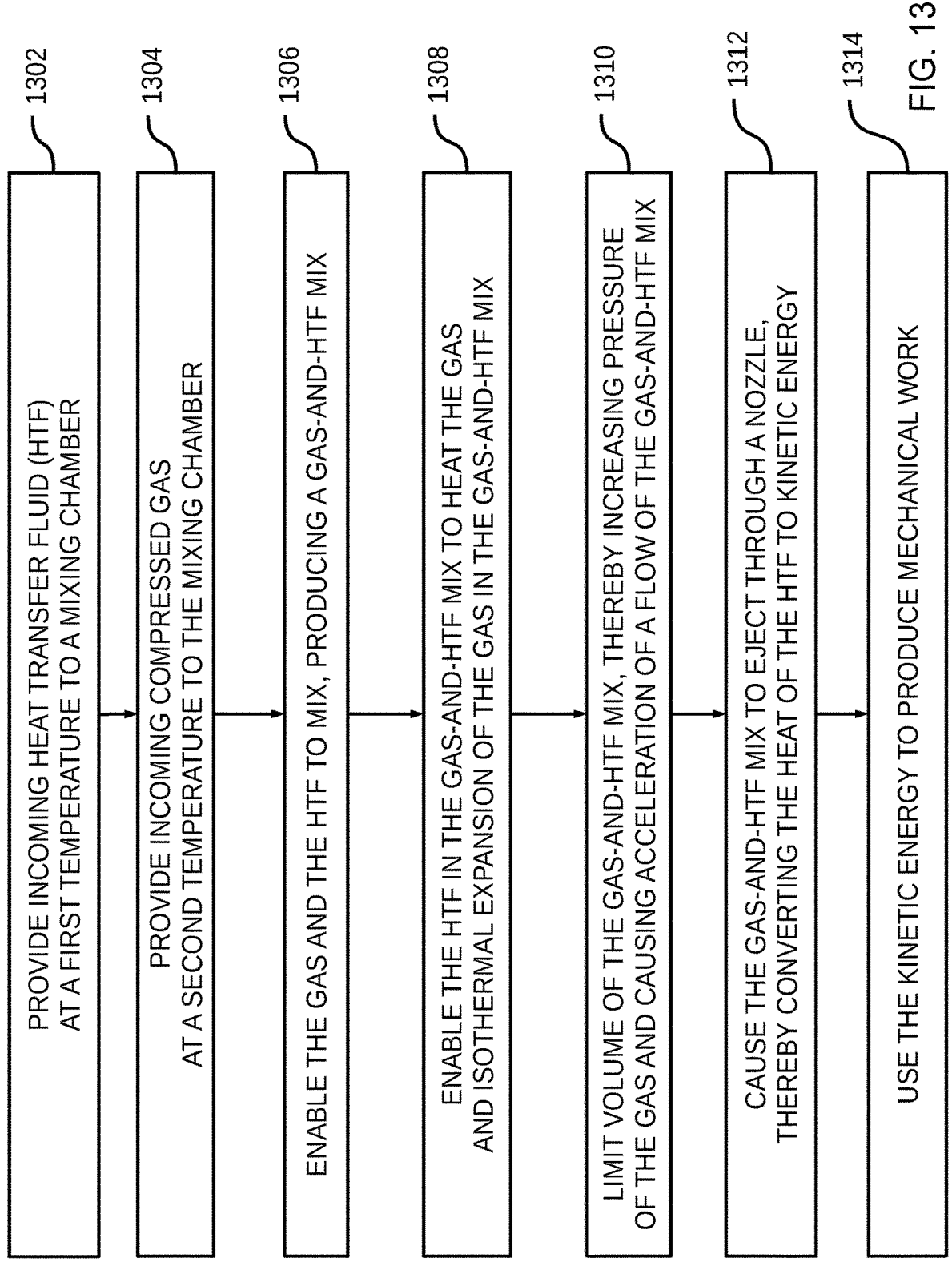

HEAT ENGINE

CROSS REFERENCE TO RELATED APPLICATION

This application is a Continuation of U.S. patent application Ser. No. 18/024,061 filed on Mar. 1, 2023 as the National Stage of International Patent Application No. PCT/IL2021/051061 filed on Aug. 30, 2021 which claimed the benefit of U.S. Provisional Patent Application No. 63/184,928, filed on May 6, 2021 and U.S. Provisional Patent Application No. 63/074,485, filed on Sep. 4, 2020, the contents of which are all incorporated by reference as if fully set forth herein in their entirety.

FIELD AND BACKGROUND

The present disclosure, in some embodiments thereof, relates to a heat engine and, more particularly, but not exclusively, to systems and methods for using a mix of gas and fluid to operate a heat engine.

Additional background art includes:
U.S. Pat. No. 5,598,700 to Varshay et al.;
an article titled "Innovative Concepts for High-Speed Underwater Propulsion" by Alon Gany, published in International Journal of Energetic Materials and Chemical Propulsion, 17(2):83-109 (2018); and
an article titled "Theoretical Performance Evaluation of a Marine Solid Propellant Water-Breathing Ramjet Propulsor" by Nachum E. Eisen and Alon Gany published in *J. Mar. Sci. Eng.* 2020, 8, 8; doi: 10.3390/jmse8010008.

The disclosures of all references mentioned above and throughout the present specification, as well as the disclosures of all references mentioned in those references, are hereby incorporated herein by reference.

SUMMARY

The present disclosure, in some embodiments thereof, relates to an external-heat engine and, more particularly, but not exclusively, to systems and methods for using a mix of gas and fluid to operate an external-heat engine.

According to an aspect of some embodiments of the present disclosure there is provided a method for converting heat to mechanical work including providing incoming heat transfer fluid (HTF) at a first temperature to a mixing chamber, providing incoming compressed gas at a second temperature to the mixing chamber, enabling the gas and the HTF to mix, producing a gas-and-HTF mix, enabling the HTF in the gas-and-HTF mix to heat the gas and isothermal expansion of the gas in the gas-and-HTF mix, limiting volume of the gas-and-HTF mix, thereby increasing pressure of the gas and causing acceleration of a flow of the gas-and-HTF mix, causing the gas-and-HTF mix to eject through a nozzle, thereby converting the heat of the HTF to kinetic energy, and using the kinetic energy to produce mechanical work.

According to some embodiments of the disclosure, the mechanical work is used to drive an electric generator.

According to some embodiments of the disclosure, the mechanical work is used to drive a compressor for compressing the incoming compressed gas.

According to some embodiments of the disclosure, the first temperature of the incoming HTF is greater than 90 degrees Celsius.

According to some embodiments of the disclosure, the second temperature of the incoming gas is lower than the first temperature.

According to some embodiments of the disclosure, the providing incoming gas, the providing incoming HTF, and the enabling the gas-and-HTF mix to flow through a nozzle include providing incoming gas to a plurality of mixing chambers, providing incoming HTF to the plurality of mixing chambers, and enabling the gas-and-HTF mix to flow through a plurality of nozzles, and using the movement of the plurality of nozzles to produce work.

According to some embodiments of the disclosure, the gas is quasi-isochorically heated by the HTF.

According to some embodiments of the disclosure, the gas is isochorically heated by the HTF.

According to some embodiments of the disclosure, producing the kinetic energy is controlled by controlling a parameter selected from a group consisting of pressure of the incoming compressed gas, rate of flow of incoming gas, rate of flow of incoming HTF, size of the nozzle, and shape of the nozzle.

According to an aspect of some embodiments of the present disclosure there is provided apparatus for producing mechanical work including a heat engine including a HTF input port for accepting Heat Transfer Fluid (HTF), a gas injector port for injecting gas into the HTF, a chamber for mixing the gas and the HTF, producing a gas-and-HTF mixture, and a nozzle for ejecting the gas-and-HTF mixture, and a rotor, wherein the heat engine includes one or more nozzles, so that when the gas-and-HTF mixture is ejected through the one or more nozzle(s), the rotor rotates in reaction to the ejected gas-and-HTF mixture, thereby producing mechanical work.

According to some embodiments of the disclosure, the apparatus includes a plurality of heat engines, and a plurality of nozzles.

According to some embodiments of the disclosure, the rotor includes a plurality of arms.

According to some embodiments of the disclosure, the heat engine is designed to withstand HTF at a temperature above 200 degrees Celsius.

According to some embodiments of the disclosure, the heat engine is designed to withstand HTF including molten salt.

According to some embodiments of the disclosure, the heat engine is designed to prevent cavitation in the gas-and-HTF mixture.

According to an aspect of some embodiments of the present disclosure there is provided a method for operating a heat engine, the method including providing Heat Transfer Fluid (HTF) to a heat engine, providing gas to a heat engine, enabling isothermal expansion of the gas in a gas-and-HTF mix causing acceleration of the HTF inside the heat engine, and using the accelerated HTF to generate work.

According to some embodiments of the disclosure, the isothermal expansion is quasi-isothermal expansion.

According to some embodiments of the disclosure, prior to enabling the isothermal expansion or quasi-isothermal expansion, inducing isochoric heating of the gas.

According to some embodiments of the disclosure, the heat engine includes a nozzle. According to some embodiments of the disclosure, providing the HTF includes providing HTF at a temperature greater than 50 degrees Celsius.

According to some embodiments of the disclosure, providing the HTF includes providing HTF at ambient temperature.

According to some embodiments of the disclosure, mixing gas with the HTF includes providing gas at a higher-than-ambient-pressure.

According to some embodiments of the disclosure, mixing gas with the HTF includes providing gas at a higher-than-ambient-temperature.

According to some embodiments of the disclosure, mixing gas with the HTF includes providing gas at an ambient temperature.

According to some embodiments of the disclosure, mixing gas with the HTF includes providing gas at a higher than ambient temperature.

According to some embodiments of the disclosure, the work generated is used to pressurize gas.

According to some embodiments of the disclosure, hot gas exiting the heat engine is used to heat the HTF.

According to some embodiments of the disclosure, hot gas exiting the heat engine is used to drive an additional heat engine.

According to an aspect of some embodiments of the present disclosure there is provided a heat engine including an input for Heat Transfer Fluid (HTF), a gas injector for injecting gas into the HTF, a section for isothermal expansion of the gas in the gas-and-HTF mix causing acceleration of the HTF inside the heat engine, and an output of the gas-and-HTF mix.

According to some embodiments of the disclosure, including a section for isochoric heating of the gas in the gas-and-HTF mix.

According to some embodiments of the disclosure, the heat engine includes a gradually narrowing section of the heat engine for the isothermal expansion of the gas.

According to some embodiments of the disclosure, the heat engine includes a section of the heat engine for isochoric heating of the gas.

According to some embodiments of the disclosure, the heat engine includes a nozzle through which the HTF flows.

According to some embodiments of the disclosure, the engine is mechanically connected to provide power for providing pressurized gas to the gas injector.

According to some embodiments of the disclosure, the engine is connected to produce electricity for powering pressurizing gas for providing pressurized gas to the gas injector.

According to an aspect of some embodiments of the present disclosure there is provided a method of producing rotational power, the method including mounting a heat engine on at least one rotor arm, and providing fluid and pressurized gas to the heat engine to rotate the rotor arm.

According to some embodiments of the disclosure, providing fluid includes providing heated fluid at a temperature above ambient temperature.

According to some embodiments of the disclosure, providing pressurized gas includes providing pressurized gas and injecting the pressurized gas into the fluid at a radial distance from an axis of rotation of the rotor arm which is less than a radial distance of the nozzle.

According to some embodiments of the disclosure, providing pressurized gas includes providing pressurized gas and injecting the pressurized gas into the fluid at a location prior to the fluid input to the nozzle.

According to some embodiments of the disclosure, the location for injecting the pressurized gas into the fluid is selected where flow of fluid flowing outwardly along the arm is not prevented from sucking HTF from a HTF source into the arms.

According to some embodiments of the disclosure, the location for injecting the pressurized gas into the fluid is selected where HTF flowing outwardly along the arm drags gas toward the nozzle.

According to an aspect of some embodiments of the present disclosure there is provided a method of operating a heat engine, the method including providing a gas at a first temperature and a first pressure to a heating chamber, isochoric heating the gas in the heating chamber to a second temperature higher than the first temperature by heat transfer from a heat transfer fluid (HTF), thereby increasing the gas pressure to a second pressure, higher than the first pressure, providing the heated and pressurized gas into a pressure chamber including HTF, and using the pressure to generate HTF flow to operate an engine.

According to some embodiments of the disclosure, including mixing the HTF and the heated and pressurized gas in the pressure chamber.

According to some embodiments of the disclosure, including collecting the HTF exiting from the engine and providing the collected HTF back into the pressure chamber.

According to some embodiments of the disclosure, including heating the HTF by using a source of heat selected from a group consisting of a solar panel, a concentrated solar receiver, a geothermal heat source, an electric heater, a chemical exothermic reaction, mechanical friction, and waste heat.

According to some embodiments of the disclosure, the engine provides energy to compress the gas at ambient pressure into a gas chamber at the first pressure, and providing the gas at the first temperature and the first pressure to the heating chamber includes providing from the HTF chamber.

According to some embodiments of the disclosure, the HTF includes a fluid selected from a group consisting of water, oil, molten salt, and molten metal.

According to an aspect of some embodiments of the present disclosure there is provided a method for converting heat to mechanical work including providing incoming heat transfer fluid (HTF) to a mixing chamber, providing incoming compressed gas to the mixing chamber, enabling the gas and the HTF to mix, producing a gas-and-HTF mix, enabling isothermal expansion of the gas in the gas-and-HTF mix, thereby reducing pressure of the gas and causing acceleration of a flow of the gas-and-HTF mix, causing the gas-and-HTF mix to eject through a nozzle, thereby converting the heat of the HTF to kinetic energy, and using the kinetic energy to produce electricity.

According to an aspect of some embodiments of the present disclosure there is provided a method of continuous isothermal compression including providing Heat Transfer Fluid (HTF) to an HTF input of an HTF flow pipe, rotating the pipe, thereby inducing centrifugal force on the HTF to flow from the input to a second, more distal radial location, providing gas to a gas input of the pipe, thereby mixing the gas and the HTF, wherein an increasing centrifugal force caused by the rotation of the pipe causes the gas to compress as the gas flows along the pipe, and enabling the gas to maintain temperature during compression by transferring heat of compression to the HTF.

According to an aspect of some embodiments of the present disclosure there is provided a system including a heating chamber containing a gas at a first temperature and a first pressure, a heater for heating the gas, thereby increasing the gas temperature and the gas pressure, a pressure chamber, arranged to accept the heated and pressurized gas, containing heat transfer fluid (HTF), the pressure chamber including a mixing element for mixing the HTF with the gas, and an opening for exiting the HTF at accelerated velocity accompanied by isothermal expansion of the gas, and an engine arranged to accept accelerated HTF and to produce work.

According to an aspect of some embodiments of the present disclosure there is provided a method for operating an heat engine, the method including providing Heat Transfer Fluid (HTF) to an input section of a heat engine, mixing gas with the HTF in an injection section of the heat engine downstream of the input section, enabling isothermal expansion of the gas in the gas-and-HTF mix causing acceleration of the HTF inside the heat engine, and using the accelerated HTF to generate work.

According to some embodiments of the disclosure, prior to enabling isothermal expansion, inducing isochoric heating of the gas.

According to some embodiments of the disclosure, prior to enabling isochoric heating of the gas, inducing isothermal compression of the gas.

According to some embodiments of the disclosure, the heat engine includes a nozzle.

According to some embodiments of the disclosure, providing the HTF includes providing HTF at a temperature greater than 0 degrees Celsius.

According to some embodiments of the disclosure, providing the HTF includes providing HTF at a temperature greater than 50 degrees Celsius.

According to some embodiments of the disclosure, providing the HTF includes providing HTF at a temperature greater than 250 degrees Celsius.

According to some embodiments of the disclosure, mixing gas with the HTF includes providing gas at a higher-than-ambient-pressure.

According to some embodiments of the disclosure, mixing gas with the HTF includes providing gas at a higher-than-ambient-temperature.

According to some embodiments of the disclosure, the work generated is used to pressurize gas.

According to some embodiments of the disclosure, the work generated includes generating electricity.

According to some embodiments of the disclosure, the work generated includes generating mechanical work.

According to an aspect of some embodiments of the present disclosure there is provided a heat engine including an input for Heat Transfer Fluid (HTF), a gas injector for injecting gas into the HTF, a section for isothermal expansion of the gas in the gas-and-HTF mix causing acceleration of the HTF inside the heat engine, and an output of the gas-and-HTF mix.

According to some embodiments of the disclosure, including a section for isochoric heating of the gas in the gas-and-HTF mix.

According to some embodiments of the disclosure, the heat engine includes a gradually narrowing section of the heat engine for the isothermal expansion of the gas.

According to some embodiments of the disclosure, the heat engine includes a section of the heat engine for isochoric heating of the gas.

According to some embodiments of the disclosure, the heat engine includes a nozzle through which the HTF flows.

According to some embodiments of the disclosure, including a source for heated HTF.

According to some embodiments of the disclosure, including a source for pressurized gas.

According to some embodiments of the disclosure, the engine is mechanically connected to provide power for providing pressurized gas to the gas injector.

According to an aspect of some embodiments of the present disclosure there is provided a method of producing rotational power, the method including mounting a nozzle on at least one rotor arm, providing fluid and pressurized gas to the nozzle to rotate the rotor arm.

According to some embodiments of the disclosure, providing heated fluid includes providing heated fluid at a temperature above ambient temperature.

According to some embodiments of the disclosure, providing pressurized gas includes providing pressurized gas and injecting the pressurized gas into the fluid at a radial distance from an axis of rotation of the rotor arm which is less than a radial distance of the nozzle.

According to some embodiments of the disclosure, providing pressurized gas includes providing pressurized gas and injecting the pressurized gas into the fluid at a location prior to a location of fluid input to the nozzle.

According to some embodiments of the disclosure, the location for injecting the pressurized gas into the fluid is selected where flow of fluid flowing outwardly along the arm is not prevented from sucking HTF from a HTF source into the arms.

According to some embodiments of the disclosure, the location for injecting the pressurized gas into the fluid is selected where HTF flowing outwardly along the arm drags gas toward the nozzle.

According to an aspect of some embodiments of the present disclosure there is provided a method of operating a heat engine, the method including providing a gas at a first temperature and a first pressure to a heating chamber, isochoric heating the gas in the heating chamber to a second temperature higher than the first temperature by heat transfer from a heat transfer fluid (HTF), thereby increasing the gas pressure to a second pressure, higher than the first pressure, providing the heated and pressurized gas into a pressure chamber including HTF, and using the pressure to generate HTF flow to operate an engine.

According to some embodiments of the disclosure, including mixing the HTF and the heated and pressurized gas in the pressure chamber.

According to some embodiments of the disclosure, including storing the HTF and the heated and pressurized gas in the pressure chamber.

According to some embodiments of the disclosure, the engine includes a turbine.

According to some embodiments of the disclosure, including collecting the HTF exiting from the engine and providing the collected HTF back into the pressure chamber.

According to some embodiments of the disclosure, including heating the HTF by using a source of heat selected from a group consisting of a solar panel, a concentrated solar receiver, a geothermal heat source, an electric heater, a chemical exothermic reaction, mechanical friction, and waste heat.

According to some embodiments of the disclosure, the engine provides energy to compress the gas at ambient pressure into the heating chamber at the first pressure.

According to some embodiments of the disclosure, the engine provides energy to compress the gas at ambient pressure into a gas chamber at the first pressure, and providing the gas at the first temperature and the first pressure to the heating chamber includes providing from the HTF chamber.

According to some embodiments of the disclosure, the gas is air.

According to some embodiments of the disclosure, the gas is nitrogen.

According to some embodiments of the disclosure, the HTF includes a fluid selected from a group consisting of water, oil, molten salt, and molten metal.

According to some embodiments of the disclosure, the second temperature is above 370 degrees Kelvin.

According to an aspect of some embodiments of the present disclosure there is provided a system including a heating chamber containing a gas at a first temperature and a first pressure, a heater for heating the gas, thereby increasing the gas temperature and the gas pressure, a pressure chamber, arranged to accept the heated and pressurized gas, containing heat transfer fluid (HTF), the pressure chamber including a mixing element for mixing the HTF with the gas, and an opening for exiting the HTF at accelerated velocity accompanied by isothermal expansion of the gas, and an engine arranged to accept accelerated HTF and to produce work.

According to some embodiments of the disclosure, further including a mixer for mixing the pressurized gas and the HTF in the pressure chamber.

According to some embodiments of the disclosure, further including a HTF chamber for collecting HTF exiting the engine.

According to some embodiments of the disclosure, further including a pump for pumping the collected HTF to the pressure chamber.

According to some embodiments of the disclosure, further including a heat source for heating the HTF pumped from the HTF chamber to the pressure chamber.

According to some embodiments of the disclosure, the heat source includes a source of heat selected from a group consisting of a solar panel, a concentrated solar receiver, an electric heater, a chemical exothermic reaction, mechanical friction, geothermal heat, and waste heat.

According to some embodiments of the disclosure, the engine contains a turbine.

According to some embodiments of the disclosure, the engine produces electricity.

According to some embodiments of the disclosure, the engine produces mechanical work.

According to some embodiments of the disclosure, the engine compresses gas.

According to some embodiments of the disclosure, including the engine providing electricity and connected to a pump for pressurizing the gas in the heating chamber.

According to some embodiments of the disclosure, further including a gas chamber for storing the gas at a first temperature and a first pressure prior to providing the gas at a first temperature and a first pressure to the heating chamber.

According to some embodiments of the disclosure, including the engine providing electricity by connection to a pump for pressurizing the gas in the gas chamber.

According to some embodiments of the disclosure, the engine is mechanically connected to drive the pump for pressurizing the gas in the gas chamber.

According to some embodiments of the disclosure, including an additional chamber connected to the gas chamber for storing pressurized gas from the gas chamber.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 7A-7D are simplified illustrations of heat engines in a jet-engine-like configuration according to an example embodiment;

FIG. 13 is a simplified flow chart illustration of a method according to an example embodiment.

DESCRIPTION OF SPECIFIC EMBODIMENTS

Figure 1B:
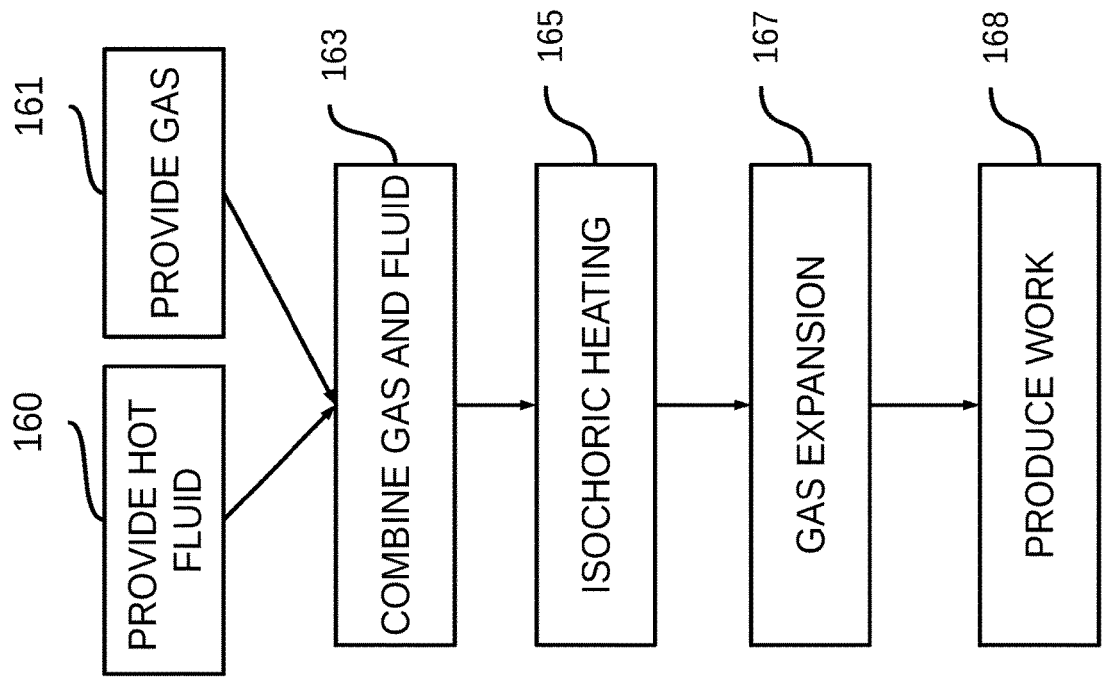
FIG. 1B is a simplified flow chart illustration of a method according to an example embodiment.

The present disclosure, in some embodiments thereof, relates to a heat engine and, more particularly, but not exclusively, to systems and methods for using a mix of gas and fluid to operate a heat engine.

Overview

An aspect of some embodiments relates to mixing two materials—a first material with a high thermal capacity, and a second material with one or more properties which are used to convert thermal energy of the high thermal capacity material to mechanical energy.

In some embodiments, a property which is used to convert the thermal energy of the high thermal capacity material to mechanical energy is compressibility of the second material.

A non-limiting example of two such materials includes a liquid as the first material, and a gas as the second material. A liquid typically has a thermal capacity greater than gas. A gas is compressible, while a liquid is typically not compressible.

When the liquid and the gas are mixed, especially if the gas is mixed into the liquid in the form of many bubbles, there can be heat exchange between the liquid and the gas.

By way of a non-limiting example, when the liquid is hotter than the gas, the gas will heat. When the heating occurs in a closed chamber, the gas heats up to the temperature of the liquid, which changes little, because the gas has a lower heat capacity than the liquid. As the gas is heated, the pressure of the gas increase. The gas-and-liquid mixture now has mechanical energy which can be used.

In some embodiments, it does not matter whether the liquid or fluid is initially hotter than the gas. Compressed air may be injected into liquid or fluid at a same temperature as the compressed air. The liquid or fluid maintains the gas-and-fluid mix at approximately the same temperature as the initial temperature of the fluid, by virtue of the higher heat capacity of the fluid, even during expansion of the gas. The fluid ensures that the gas does not cool by expansion.

In some embodiments, the chamber in which the gas-and-liquid mixture is contained is a closed chamber. In some embodiments, the closed chamber is optionally opened when it is desirable to use mechanical energy.

In some embodiments, the chamber may include an opening. Gas may be continuously provided to the chamber through one or more gas inlets, and liquid may be continuously provided to the chamber through one or more liquid inlets, and the gas-and-liquid mix may be continuously ejected through one or more outlets or nozzles.

In some embodiments, a property of the first material is high heat capacity, or heat capacity higher than the second material.

In some embodiments, a property of the second material is that it is compressible. In some embodiments, a property of the second material is low heat capacity, or heat capacity lower than the first material.

In some embodiments, a property of the first material is non-compressibility, or very low compressibility.

In some embodiments, a property of the second material is that it does not dissolve into the first material.

In some embodiments, a property of the second material is that it hardy dissolves into the first material, for example less than 10 percent of the second material is able to dissolve into the first material under working conditions such as temperature and pressure of the heat engine.

An aspect of some embodiments relates to mixing fluid and gas in an external-heat engine. The gas provides a compressible and/or expandable component in a gas-and-fluid mixture, and the fluid provides a component with a much higher thermal capacity than the gas.

In some embodiments, the fluid is hotter than the gas, and the fluid heats the gas.

In some embodiments, the volume is kept constant or approximately constant, so the fluid heating the gas causes an increase in pressure.

In some embodiments, the temperature is kept constant or approximately constant, so the fluid heating the gas causes an expansion, and the gas accelerates flow of the gas-and-fluid mixture.

In some embodiments, the gas-and-fluid mixture is compressed, thereby increasing pressure, substantially isothermally, since the compression of the gas does not provide sufficient heat to heat the fluid substantially.

An aspect of some embodiments relates to mixing fluid and gas in a heat engine, and enabling the gas to expand isothermally, causing acceleration of the fluid, and using the accelerated fluid to generate work.

Figure 1A:
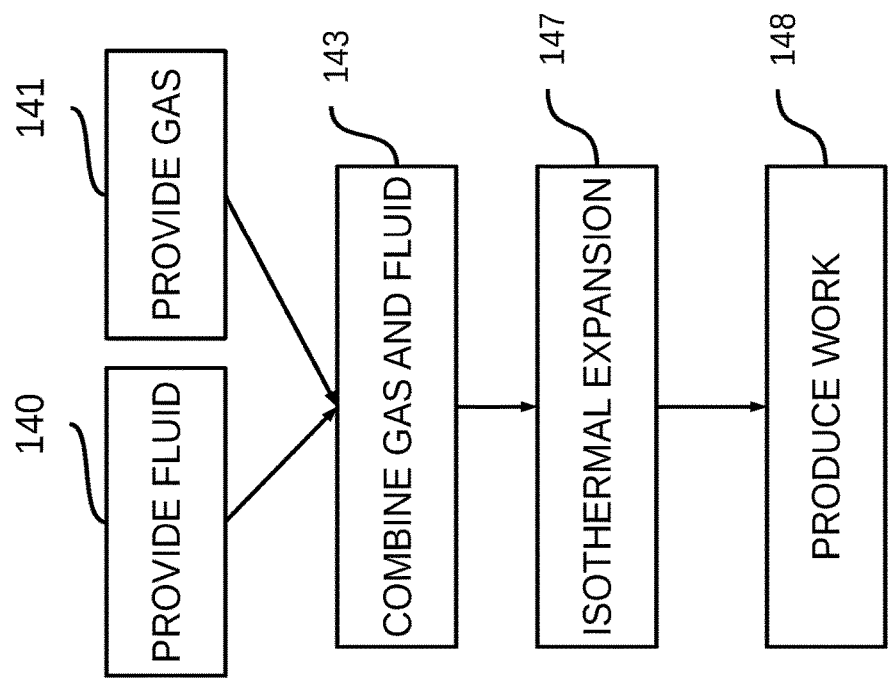
FIG. 1A is a simplified flow chart illustration of a method according to an example embodiment.
Figure 1C:
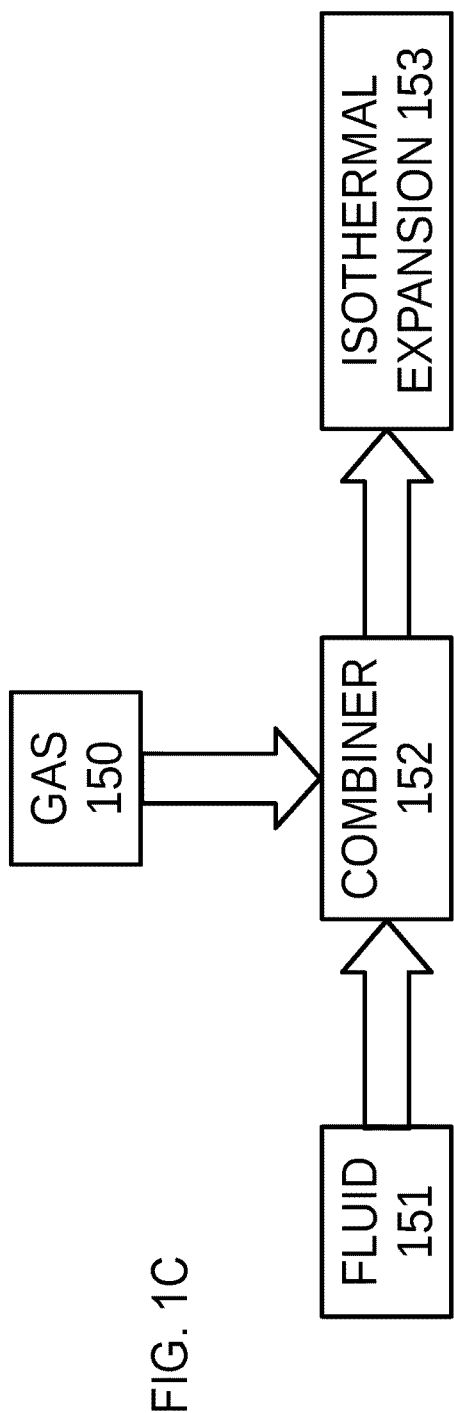
FIG. 1C is a simplified block chart illustration of a heat engine according to an example embodiment.
Figure 1D:
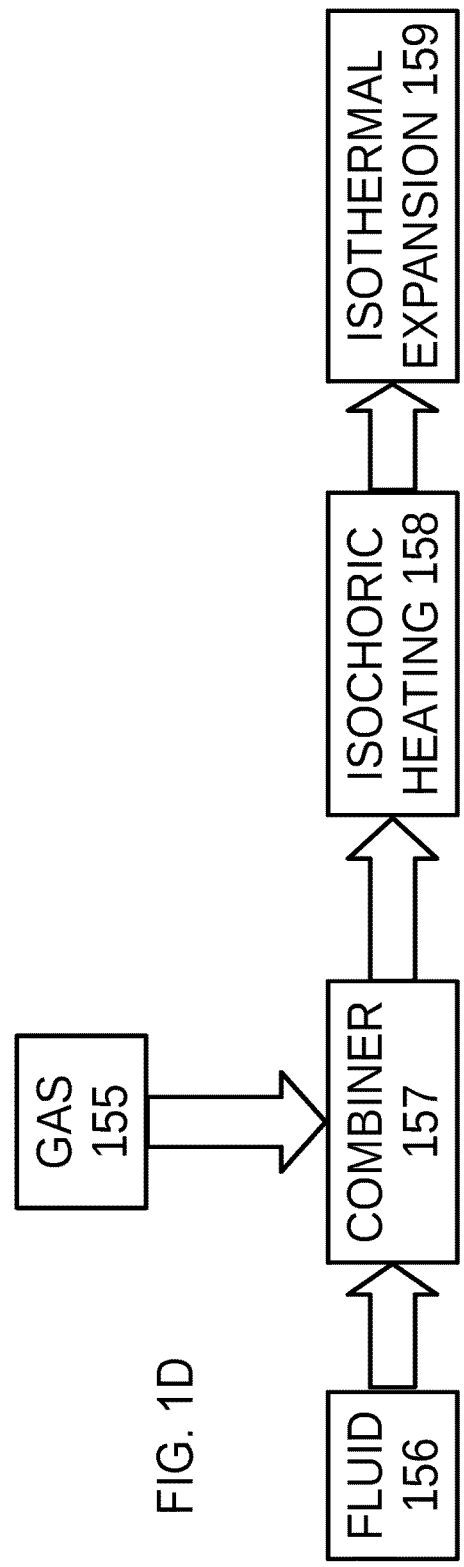
FIG. 1D is a simplified block chart illustration of a heat engine according to an example embodiment.
Figure 2:
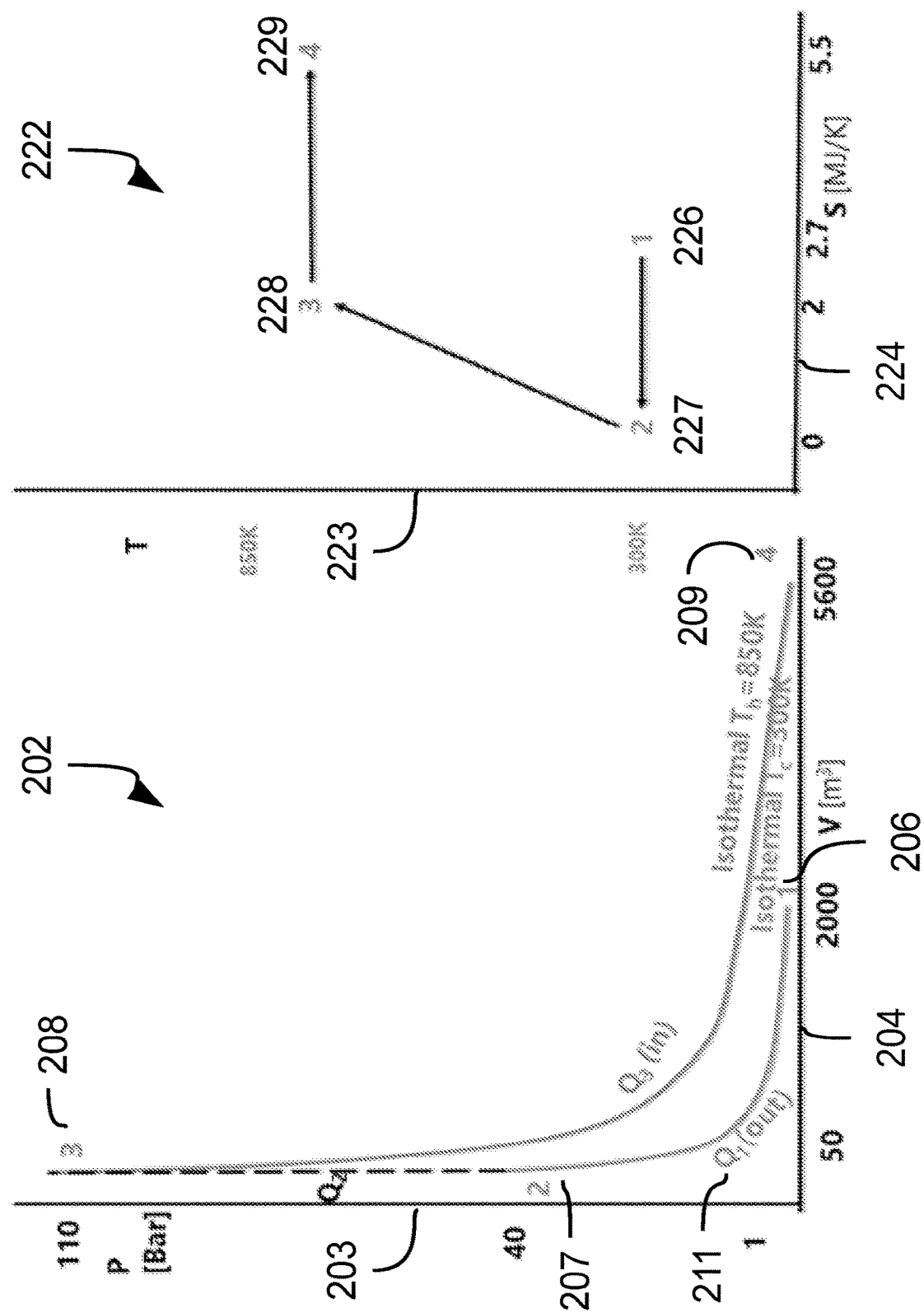
FIG. 2 shows a P-V diagram and a T-S diagram of an example embodiment.

Various drawings in the present application describe various aspects, as follows:

FIGS. 1A-1D show a method and a block diagram of a heat engine according to example embodiments, and FIG. 2 describes the method using graphs commonly used to describe thermodynamic systems.

FIGS. 1E, 3, and 4A-4F illustrate using an embodiment process to produce energy, and optionally to produce the energy in conjunction with an energy storage system.

Figure 5:
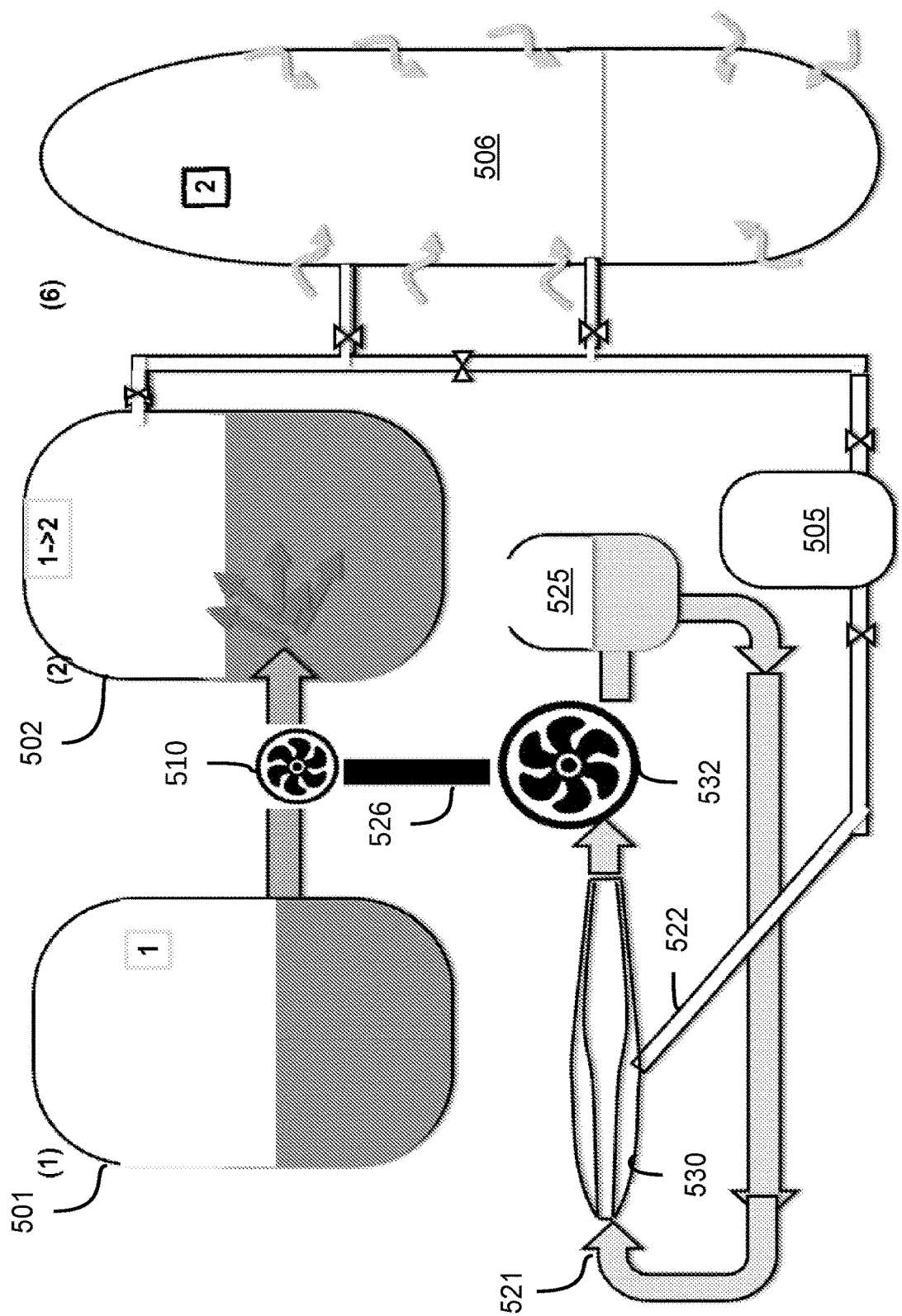
FIG. 5 is a simplified illustration of using a nozzle as a heat engine according to an example embodiment.
Figure 6:
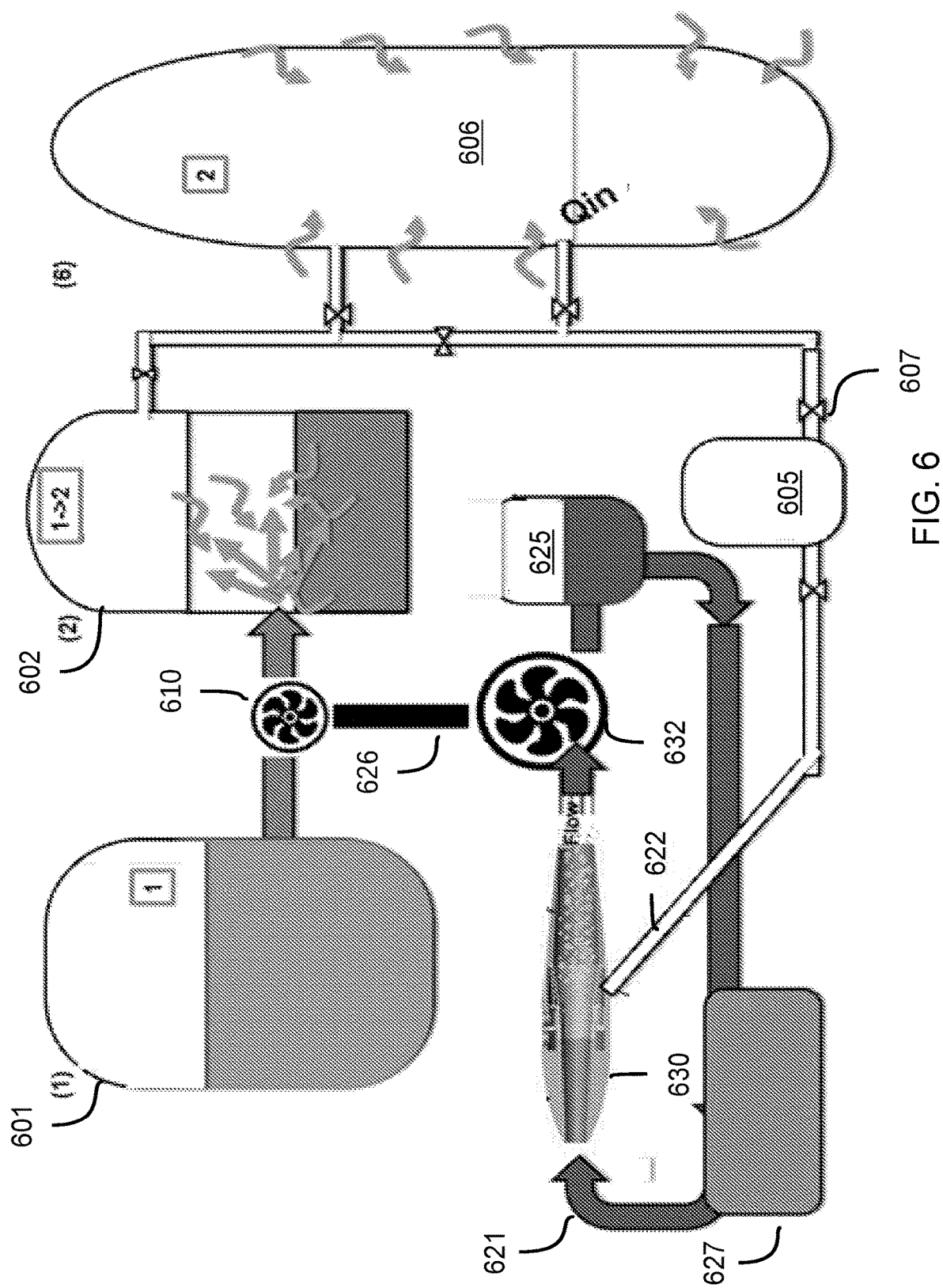
FIG. 6 is a simplified illustration of an example embodiment heat engine used in an energy generation setting according to an example embodiment.

FIGS. 5 and 6 show using a heat engine embodiment to produce energy, and optionally to produce the energy in conjunction with an energy storage system.

FIGS. 7A-7D, 8A-C and 9 illustrate using a heat engine embodiment to produce energy.

Figure 10A:
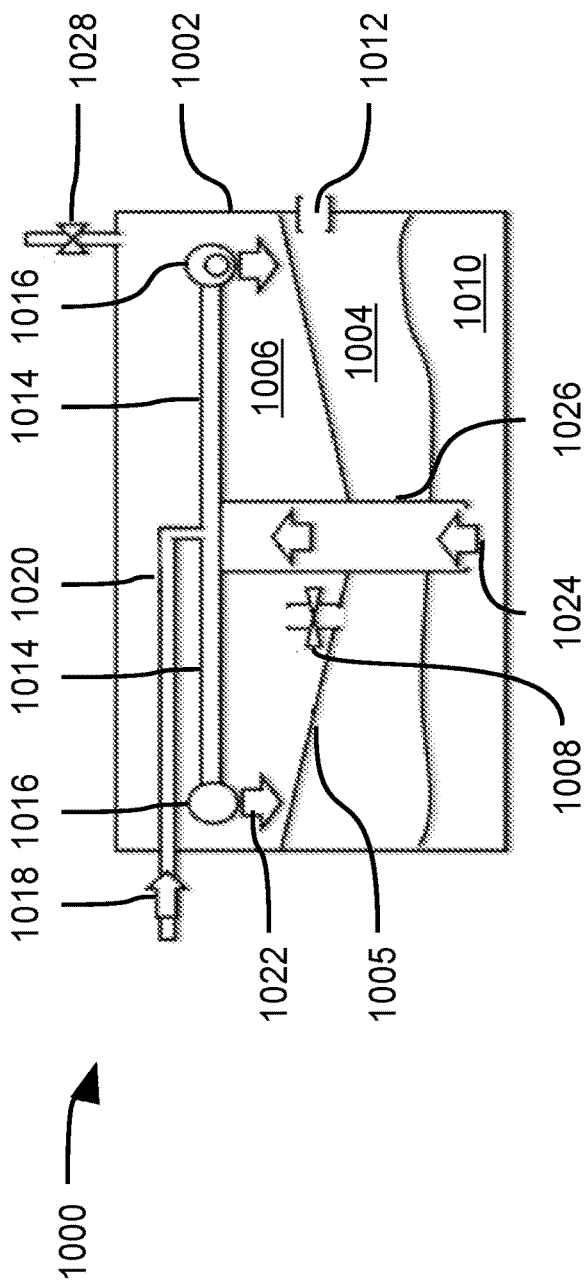
FIG. 10A is a simplified illustration of a device for continuous isothermal gas compression according to an example embodiment.
Figure 10B:
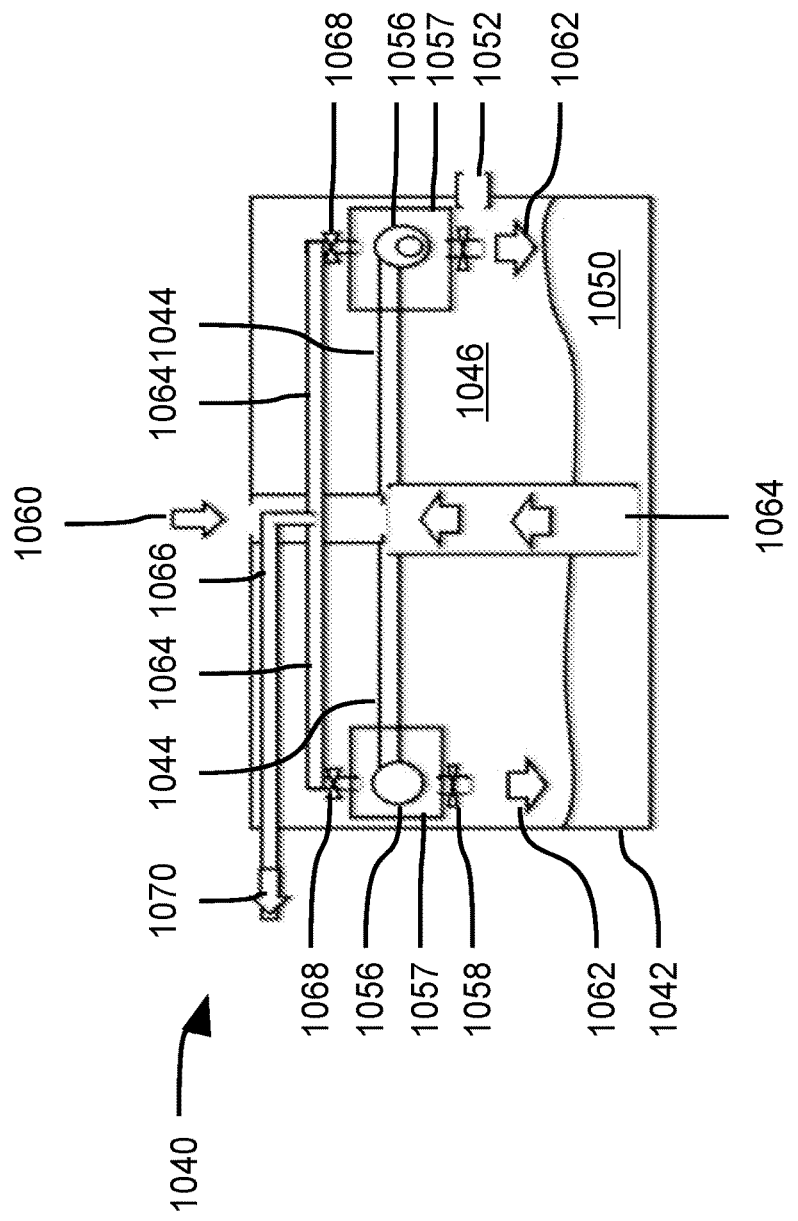
FIG. 10B is a simplified illustration of a device for continuous isothermal gas compression according to an example embodiment.

FIGS. 10A and 10B illustrate using one or more rotating arms to continuously compress gas isothermally or approximately isothermally. Such compression may optionally be used as a source of compressed gas for various uses, including one or more of the heat engines and processes to produce energy described in the above-mentioned Figures.

Figure 11:
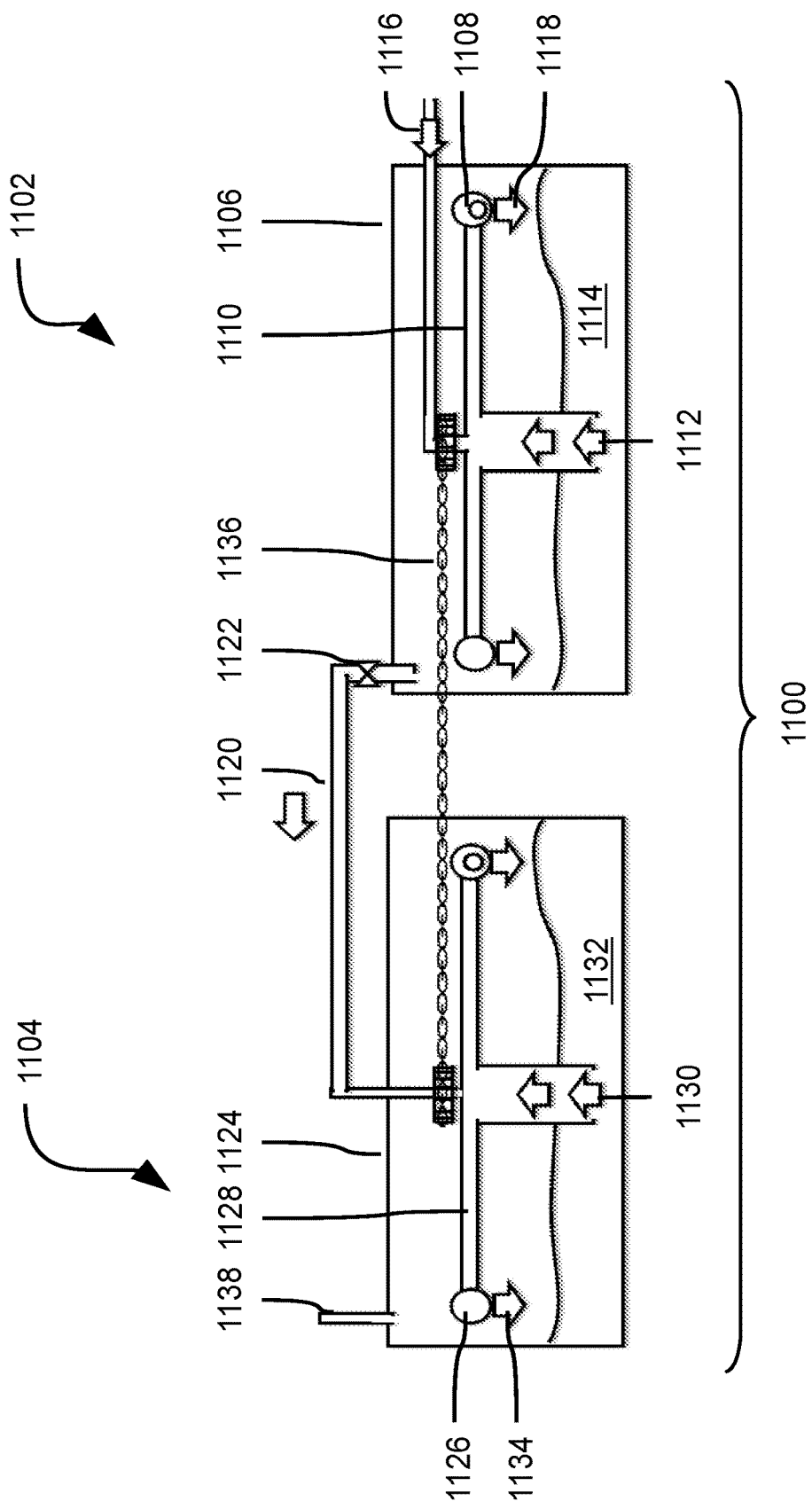
FIG. 11 is a simplified illustration of an energy production system using a combination of heat engines and compressed air generators according to an example embodiment.

FIG. 11 illustrates a compressor such as illustrated in FIGS. 10A and 10B and a heat engine such as illustrated in FIGS. 7A-D, 8A-C and 9 working together to produce energy. Many engines work by compressing gas—which increases gas pressure, then heating the gas—which increases gas pressure even more. The compressing and the heating increase energy content of the gas. Such engines then use the concentrated energy by letting the heated compressed gas expand, producing work.

However, the heat capacity of gas is not as great as that of a liquid. Furthermore, when gas expands, it cools, losing energy.

The terms "air" in all its grammatical forms is used throughout the present specification and claims interchangeably with the term "gas" and its corresponding grammatical forms.

The use of "example" and "for example" in all their grammatical forms is used throughout the present specification and claims interchangeably with the use of "non-limiting example" and its corresponding grammatical forms.

In some embodiments, heat engines as described in FIGS. 7A-D, 8A-C, 9 and 14 are optionally used continuously, being fed with compressed air from sources and/or chambers such as described with reference to FIGS. 1E, 3, 4A-F, 5 and 6. This is in contrast with systems which charge a chamber with compressed air, and when the pressure in the chamber is used up, stopping to recharge the chamber from the above-mentioned sources.

In some embodiments, a process described herein is used where the gas is used together with a liquid, potentially providing an advantage that the gas expands almost isothermally.

In some embodiments, a process described herein is used where the gas is used together with a fluid, in the sense of a fluid less expandable than gas, by way of a non-limiting example liquid, potentially providing an advantage that the gas expands almost isothermally.

The term isothermal, in all its grammatical forms, is used in the present specification and claims to mean that the gas-fluid mixture cools much less than cooling without the temperature stabilizing effect of the fluid.

It is noted that without the temperature stabilizing effect of the fluid the expansion of gas would be an adiabatic expansion, or an isentropic expansion.

In some embodiments, the gas is heated isochorically.

An isochoric process, also called a constant-volume process, an isovolumetric process, or an isometric process, is a thermodynamic process during which volume of a closed system undergoing such a process remains constant.

When the gas is heated isochorically, the heating causes a pressure increase, since the gas does not expand. It is noted that were the gas to expand, that would result in some cooling, or a loss of some of the heat.

In some embodiments, a heat engine is described here which uses isothermal expansion to capture more work from gas expansion.

In some embodiments, isochoric heating is described here which retains more work when heating a gas than a non-isochoric process.

In some embodiments, isochoric heating is used to heat a gas, and isothermal expansion is used to produce work.

In some embodiments, a gas-fluid mix is used to produce work, which potentially benefits from the above-listed benefits of the gas process, and imparts kinetic energy to the fluid, which may act well upon some types of engines, such as turbines, which use kinetic energy of a gas or liquid to cause rotation.

A mixture of fluid and gas, being potentially denser than gas alone, can potentially impart more momentum to turbine blades.

An aspect of some embodiments relates to a heat engine which potentially benefits from the above-listed benefits of the gas process, and produces kinetic energy.

In some embodiments, the kinetic energy is used to rotate and power an electric generator.

In some embodiments, the kinetic energy is used to rotate and power a mechanical device.

In some embodiments, the kinetic energy is used to feed back into the heat engine, by way of a non-limiting example by:

Rotating a shaft used to pump pressurized gas into the engine. The energy of pressurizing the gas plus heat energy added by a fluid can provide excess energy relative to the energy used for pressurizing the gas.

Providing electricity to operate a pump to provide pressurized gas into the engine. The energy of pressurizing the gas plus heat energy added by a fluid can provide excess energy relative to the energy used for pressurizing the gas.

An aspect of some embodiments relates to selecting and controlling a size of fluid droplets in a mixture of hot fluid and gas in an engine in order to maintain the fluid heating the gas during passage of the mixture through the engine.

In some embodiments, size of fluid droplets is controlled by determining a diameter of holes through which the hot fluid is injected into the engine. In some embodiments the diameter of holes selected optionally takes into account surface tension of the fluid, at the temperature desired, to produce a desired size of droplets.

An aspect of some embodiments relates to using heat from heat sources such as solar energy and/or waste heat, and or geothermal for operating a heat engine.

The above mentioned improvements to producing work from compressed and/or heated gas mixed with fluid are suitable for using heat from various sources, including waste heat from industrial processes and waste heat from solar energy devices such as concentrated-solar-energy devices and such as thermal solar panels.

An aspect of some embodiments relates to storing energy in forms such as compressed gas or heat, and releasing the stored energy in a way which potentially benefits from the above-listed benefits of the gas process.

In some embodiments, releasing the stored energy in a way more efficient than previously.

Making Work Output Continuous

It is noted that chambers for containing fluids and gas are described with reference to various embodiments herein. The chamber typically include valves at their openings, and the valves are typically operated to open and enable fluid or gas or compressed gas to enter, and closed to enable a process to occur within the chamber without allowing fluid or gas to exit the chamber during the process.

For example, in some chambers a process is performed which is described as isochoric heating. The isochoric, or constant volume, heating is performed with the chamber closed, not allowing fluid or gas to exit the chamber, thereby keeping the volume constant.

It is noted that chambers described herein may be closed at one phase of a process, and open at another phase. In some embodiments, in order to produce energy without stopping for a chamber to complete a phase of the process, two or more chambers may be used to perform a same process, and while one chamber is closed and not providing fluid-and-gas to perform work, another chamber may be open and providing fluid and gas to perform work, thereby providing a more continuous work output.

Type of Engines

Various engines may be powered by expansion of gas in a fluid-and-gas obtained by methods described herein. All such engines are intended to be included in variations on embodiments described herein, including, by way of some non-limiting examples: turbines, Kaplan design turbines, Pelton wheels, hydroelectric turbines, high temperature thermal oil turbines, ram-jet engines, and jet engines.

Heat Sources

Various heat source may provide heat to a fluid-and-gas using methods described herein. All such heat sources are intended to be included in variations on embodiments described herein, including, by way of some non-limiting examples: solar heat; concentrated solar heat; geothermal heat; waste heat from industrial processes; and heat from fossil fuels.

We do not know of a high efficiency engine, for example with efficiency greater than 33%, with a capacity below 20 MW, for a temperature less then 850K, for example for use in solar fields. An efficient heat engine such as a steam turbine exists, but its capacity is larger than 20 megawatts, which requires a huge energy source or solar field, and large investments. Small steam turbines (<1 MW) are typically at less than 20% efficiency.

Small and efficient engines can potentially allow using distributed concentrated solar power in which economics of scale can reduce costs, similarly to photovoltaics, to below 3 cents/kWh which, according to the SunShot initiative of the National Renewable Energy Laboratory (NREL) will open a way for 50% solar energy in the US by 2050, compared to 10% for solar energy today.

Present day small heat engines, such as Stirling engines, steam turbine engines, and gas turbines are typically inefficient at 850K (efficiency less than 25%) and are typically expensive.

There is no known cost-effective engine, for example at a cost less than 750$/kW, for small capacities, such as smaller than 3 MegaWatts.

A potential benefit of a heat engine according to some embodiments described herein is that the heat engine can be more cost effective than existing engines up to a capacity of at least 15 MW.

A potential benefit of a heat engine according to some embodiments described herein is that using fluid in addition to gas in an engine can potentially reduce a size of the engine by up to 3 orders of magnitudes.

In some solar energy systems, solar energy is converted to heat at typical temperatures of about 850K, where energy density is low compared to fossil fuel energy density. Known heat engines typically operate on gases, where the gases play two roles: 1) Performing thermodynamic work of expansion and compression. 2) Carrying energy into the engine. Since gases have relatively poor heat capacity per volume, their expansion in the engine is associated with a reduction in temperature. This is in contrast to Carnot's description of an ideal engine where the gas expansion should occur isothermally. This deviation from an ideal Carnot engine leads to a reduction in efficiency.

An aspect of some embodiments relates to a heat engine where heat transfer fluid supplies heat to the gasses inside an engine during thermodynamic expansion and compression, leading to isothermal or closer-to-isothermal expansion and compression, and increased efficiency.

The term Carnot engine describes a theoretically most efficient work that can be done by a pump and a turbine at a constant temperature, by isothermal compression and isothermal expansion.

Reference is now made to FIG. 1A, which is a simplified flow chart illustration of a method according to an example embodiment.

FIG. 1A is meant to show a heat process which potentially extract more work from a compressed gas than would be extracted if the gas expansion was not isothermal.

The method shown by FIG. 1A includes:
providing fluid (140);
providing gas (141);
combining the gas and the fluid (143);
enabling the gas and the fluid to perform isothermal expansion (147),
thereby producing work (148).

In some embodiments, the method includes performing isochoric heating of the gas before the isothermal expansion (147).

Reference is now made to FIG. 1B, which is a simplified flow chart illustration of a method according to an example embodiment.

FIG. 1B is meant to show a heat process which potentially extracts more work from a compressed gas than would be extracted if the gas heating was not isochoric.

FIG. 1B also shows an optional stage of isothermal expansion which potentially extract more work from a compressed gas than would be extracted if the expansion was not isothermal.

The method shown by FIG. 1B includes:
providing hot fluid (160);
providing gas (161);
combining the gas and the fluid (163);
performing isochoric heating (165);
enabling the gas to perform expansion (167),
thereby producing work (168).

In some embodiments, enabling the gas to perform expansion (167) comprises enabling the gas to perform isothermal expansion.

Reference is now made to FIG. 1C, which is a simplified block chart illustration of a heat engine according to an example embodiment.

FIG. 1C is meant to show a generic heat engine, where pressurized gas and fluid are combined, and work is produced.

In the heat engine of FIG. 1C, pressurized gas 150 and fluid 151 are combined in a combiner 152.

The pressurized gas expands, in what is close to isothermal expansion 153, or close to isothermal expansion, and also accelerates the fluid.

Because the thermal capacity of the fluid per volume is much greater than that of the gas, the temperature of the gas-and-fluid combination does not change as much as if only the gas were to expand, without presence of the fluid.

The work produced potentially benefits from the mass of the accelerated fluid, which is typically greater than the mass of the gas.

Reference is now made to FIG. 1D, which is a simplified block chart illustration of a heat engine according to an example embodiment.

FIG. 1D is meant to show a generic heat engine, where gas and heated fluid are combined, and work is produced.

In the heat engine of FIG. 1D, gas 155 and heated fluid 156 are combined in a combiner 157.

The gas heats up by heat transfer from the fluid, in a volume 158 which does not allow the gas to expand. The heating is isochoric heating, or close to isochoric heating.

An isochoric process, also called a constant-volume process, an isovolumetric process, or an isometric process, is a thermodynamic process during which volume of a closed system undergoing such a process remains constant.

In some embodiments, because the thermal capacity of the fluid is much greater than that of the gas, the temperature of the gas-and-fluid combination may not change much.

Following the isochoric heating, the pressurized gas is allowed to expand, in what is close to isothermal expansion 159, or close to isothermal expansion, and also accelerates the fluid.

The work produced potentially benefits from the mass of the accelerated fluid, which is typically greater than the mass of the gas.

Isothermal compression, or close to isothermal compression, and isothermal expansion, or close to isothermal expansion, can be achieved. 100% isothermal work capacity is: $PVlan(P/P_0)$ Joule. By mixing fluid with gas when compressing or expanding the gas we add thermal mass of fluid to the gas, and achieve 50% up to close to 100% of isothermal compression and expansion. Fluid is optionally compressed and/or expanded at a temperature of 50 degrees Celsius and higher, 100 C. and higher, 350 C. and higher, and on up to very high temperature heat transfer fluid (HTF) keeping gas temperature at approximately 750 C. and higher up to 1500 C. Substantially isothermal compression and expansion of gas is performed by a mixing between liquid and gas in a chamber during the isothermal process. The high heat capacity of the liquid maintains an approximately constant temperature of the gas. For example, injecting air as bubbles into water or spraying air with water are two efficient ways to increase surface area between the air and water to enable isothermal expansion and compression of the air. The liquid can be a heat transfer fluid, optionally at a high temperature. By way of some non-limiting examples, oil at 700K or molten salt at 830K or higher.

Large chambers at constant temperature potentially enable a slow variation of pressure, which potentially enables highly efficient isothermal processes. Heat transfer between fluid and gas by bubbles or droplets is very high, potentially enabling isothermal processes. A high heat transfer coefficient of gas bubbles in fluid, or fluid droplets in gas enables achieving isothermal expansion as a rapid process. For example, expansion by a factor 10 of volume in 1 sec can be achieved isothermally with droplets initial size of 1 mm.

Various examples are described herein of a heat engine that benefits from the properties of isothermal processes.

Aspects of some examples relate to storage and conversion of solar energy, and conversion of waste heat to electricity.

Aspects of some examples relate to using a high temperature incompressible fluid (for example molten salt, or thermal oil) mixed with gas for isothermal expansion of the gas at a high temperature for producing work.

An aspect of some embodiments relates to producing electricity. Hydroelectric turbines where pressurized water drives an electric generator, have a typical efficiency of 90% and are some of the most efficient and cost-effective energy converters.

Hydroelectric energy storage, where water is pumped to an elevated altitude and then used for generating electricity has around 70%-80% electricity to electricity efficiency and is considered an efficient energy storage method.

An energy storage embodiment using chambers is described herein, where height potential energy (altitude difference) is replaced with a pressure and temperature difference. In such an example storage system, water or some other fluid is pumped by a hydroelectric pump from a lower pressure chamber into a chamber for a higher pressure. The chamber for the higher pressure has air or some other compressible gas within a closed chamber. In some embodiments, the air is compressed adiabatically (isentropic), and compression of air also heats up the air, so heated compressed air stores energy in the form of heat and pressure. In some embodiments, the air is compressed and additionally heated from a heat source (e.g. solar source, waste heat, geothermal source) as well as heating up just by compression, and the heated compressed air stores energy in the form of heat and pressure. At a discharge stage, the water flows from the high-pressure chamber to the low-pressure chamber through a hydroelectric turbine, recovering energy. In terms of electricity, such a system recovers most of the electric energy. Such systems report about 70%-80% round trip efficiency.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Figure 1E:
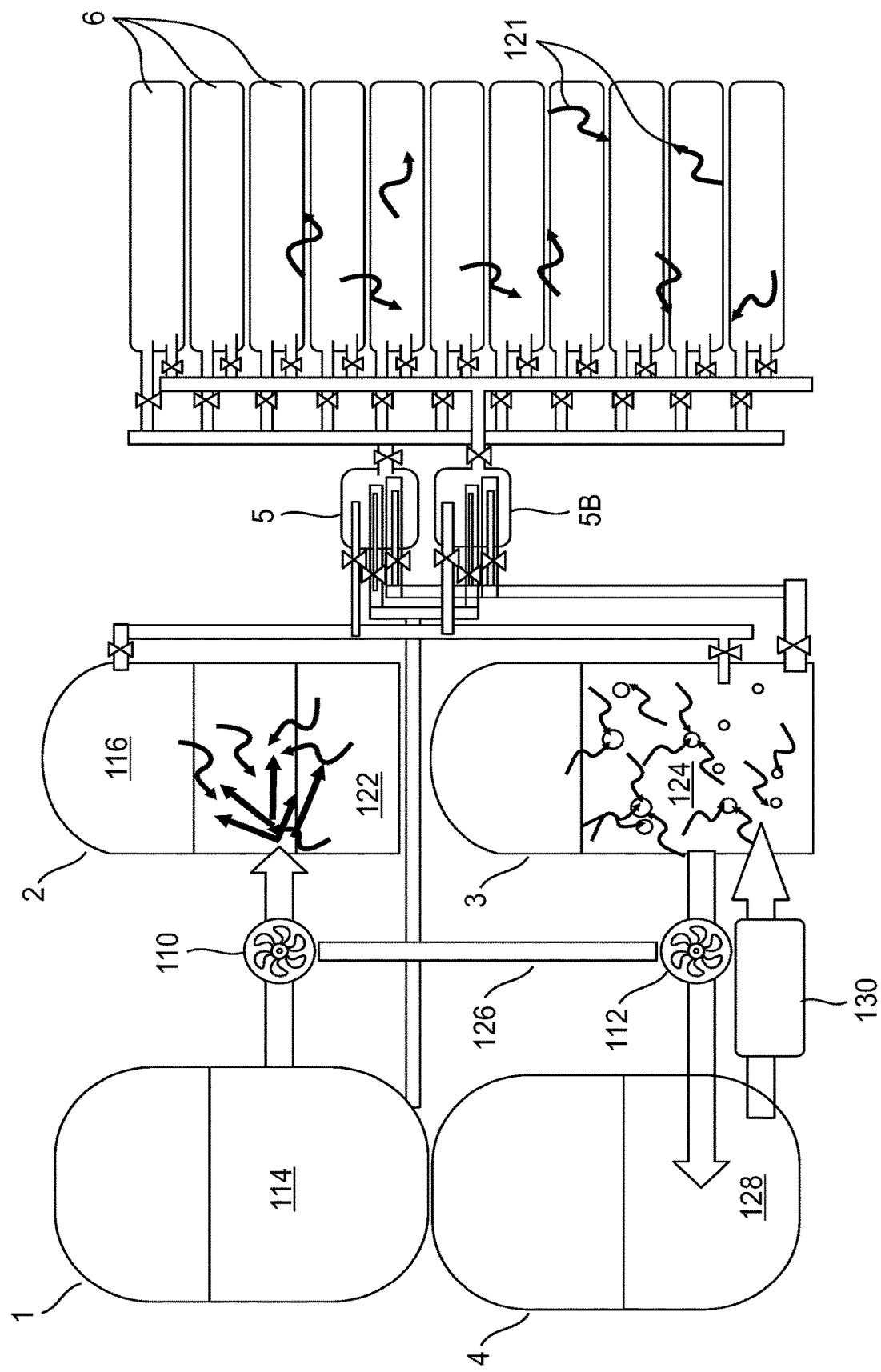
FIG. 1E is a simplified illustration of an example embodiment.

An Example Embodiment Method and System Using Large Chambers at High Temperature and High Pressure Reference is now made to FIG. 1E, which is a simplified illustration of an example embodiment.

FIG. 1E depicts a system including lower pressure chambers 1 4, higher pressure chambers 2 3, a pump 110 and a turbine 112 for using heat energy to pressurize air, to be converted to electricity by the turbine 112.

As a general example, consider a system, depicted in FIG. 1E, of hydroelectric energy storage, including a first chamber 1 at ambient pressure and temperature. By way of a non-limiting example, the first chamber 1 may be a tank of 50 cubic meters, at least partially filled with fluid 114, at a pressure of 1 Bar and a temperature of 300K. The first chamber 1 is connected through a pump 110 to a second chamber 2, at least partially filled with gas 116, for example air.

Driving the pump 110 pumps fluid 114 which compresses the gas 116, optionally isothermally, into the second chamber 116. The pumped fluid is shown as fluid 122 in the second chamber 116.

From the second chamber 116 pressurized air is optionally charged into a chamber 5 and may be stored under pressure in chamber(s) 6.

In some embodiments isothermal compression in chamber 6 may release heat to the environment, as indicated by arrows 121.

Discharging pressure in a reverse direction from the chamber(s) 6 into the second chamber 2 which is at least partially filled with fluid 122, e.g. water 122, can drives a hydro-turbine (not shown) for generating electricity (not included in the figures).

Storage of high-pressure gas and subsequently providing to a turbine is available to be converted into electricity.

In some embodiments, a third chamber 3, contains liquid 124 at high temperature. For example, molten salt at 850° K., or thermal oil at 700° K. or water under pressure at a temperature slightly below its boiling point.

The turbine 112, in some embodiments a turbine that is chemically resistive and designed for the operating liquid and temperature, is used as a hydro-electric turbine to produce electricity by converting flow to rotation to electricity. The turbine 112 is connected to the third chamber 3, and to a fourth chamber 4 at lower-pressure, for example at ambient pressure, or at 1 Bar.

Such a design can use, for the turbine 112, a Francis turbine, a Kaplan turbine, a Pelton wheel, a Tesla turbine and similar designs used for hydroelectric turbines, and in some embodiments use materials typically used for molten salt and/or high temperature thermal oil pumps.

In some embodiments, electricity generated by the turbine 112 may be used to operate the pump 110.

In some embodiments, the turbine 112 is optionally connected by a shaft 126 to the pump 110, either directly or by gears for controlling flow rate of the pump 110. Work is produced when pressure at the third chamber 3 increases, and the shaft 126 drives the pump 110.

Example operating conditions of the system depicted in FIG. 1E may include, by way of some non-limiting examples:

Water at room temperature and/or ambient pressure in the first chamber 1, termed herein state 1, is pumped into the second chamber 2, which may be wholly or partially with air 116, compressing the air isothermally, to a pressure above ambient, such as to 40 Bar, 100 Bar, 300 Bar, or other value, termed herein state 2.

In some embodiments, a spray of water in the second chamber 2, or a circulation of air bubbles in the second chamber 2 while the pressure increases, optionally enables maintaining isothermal or close-to-isothermal compression.

In some embodiments, isothermal compression is maintained as long as the heat capacity of the water is considerably larger than the heat capacity of the compressed air. Such conditions are optionally achieved using a sufficient quantity of water.

The water compresses air into the chambers 5 6 by an air pipe from the second chamber 2.

In some embodiments, the chamber 5 is optionally smaller than the chamber(s) 6, in some cases at a ratio defined by the operating temperatures.

In some embodiments, the chamber 5 is optionally used for driving the turbine 112, while the chamber(s) 6 are used to store additional compressed air that can be used later to drive the turbine 112 for generating electricity between the second chamber 2 and the first chamber 1.

In some embodiments, in chambers 5 and/or 6 water spray may be used to cool the compressed air, to enable isothermal compression.

In some embodiments, the chamber 5 has an inlet of heating pipes, where molten salt flow optionally raises the temperature. When temperature increases and chamber 5 is sealed, the pressure elevates. For 40 Bar at 300K, a pressure of 113 Bar is reached at 850K, termed herein state 3.

At state 3, the third chamber 3 is optionally partially filled with molten salt. Opening airflow between the third chamber 3 and the chamber 5 increases pressure at the third chamber 3 to 113 Bar, optionally without generating a flow.

Once flow is enabled between the third chamber 3 and the fourth chamber 4, work is produced, and in some embodiments the shaft 126 rotates. In the fourth chamber 4 air expands isothermally to ambient pressure, reaching a state termed state 4.

In some embodiment, isothermal expansion of the air is achieved by spraying the molten salt or circulating air bubbles in the third chamber 3.

Optionally, high pressure can be avoided by inserting an initial lower pressure into chamber 3. For example, an initial 15 Bar at 300K reaches 42.5 Bar at 850K, or any other pressure as long as a desired energy conversion is generated. A numerical example is calculated below.

A numerical example for the 113 Bar case:

The first and second chambers 1 2 each have a size of 50 cubic meters. The volume of air at a pressure of 1 Bar is compressed into the second chamber 2, in this example, to 1.25 cubic meters volume of air at 40 Bar. This isothermally compressed air at room temperature is captured in chambers 5 6. Once the air is compressed the chambers are sealed and optionally water is drained from the second chamber 116 back to the first chamber 1 for reuse in compressing air into the chamber 6, optionally in a cassette of chambers 6.

Zooming in on chambers 5 6, the molten salt is at 850K compared to room temperature at 300K. Such a ratio leads to a ratio in work that can be performed by an isothermal process, which leads to a desired ratio in size between the two chambers. Work needed to compress the air to 40 Bar is:

$$W_1 = P_1 V_1 \ln\left(\frac{V_2}{V_1}\right) = 50 \text{ m}^3 * 1 Bar * \ln(40) = 18.45 \text{ MJ}$$

Using a portion of molten salt to heat captured air at 40 Bar in the chamber 5. After heating the air at a pressure of 40 Bars in the chamber 5 850K, the pressure is increased by the temperature ratio to 40*850/300=113 Bars, and the total work that can be done by the air at the same volume, through isothermal expansion is increased by a factor of:

$$\frac{P_1 V_1 \ln(V_1/V_0)}{P_2 V_1 \ln(V_2/V_0)} = \frac{113 \ln(113)}{40 \ln(40)} = 3.62$$

The above computation shows that potentially only 1/3.62=27% of the compressed air is needed for producing the work of that compression. The heating chamber 5 in this example can be only 27% of the volume of the compressed air volume in the second chamber 2.

For the example of 1.25 cubic meters compressed air at 40 Bar in the second chamber 2, the chamber 5 can be 0.345 cubic meters, and the chamber 6 can be 0.9 cubic meters.

For extracting work from hot compressed air, the hot compressed air is optionally injected as bubbles or by other mixing methods to the optionally completely full of molten salt third chamber 3, which pressurizes the chamber 3 to 113 Bar. The pressure at the molten salt third chamber 3 optionally induces a flow that drives the turbine 112, producing work. As the pressure drops with the flow, the air volume expands isothermally.

In some embodiments, mechanical work is optionally transferred by a shaft 126 to the colder (for example 300K) portion of the system, where a pump 110 optionally compresses air isothermally. As calculated above, the work is potentially sufficient to compress the entire 50 cubic meters of air from ambient pressure to 1.25 cubic meters at 40 Bar, filling the chambers 5 and 6.

The process described above optionally continues until all the chambers 6 are full.

In some embodiments, the chamber 6 may be one large chamber, for example having a volume of 50 m³, which is discharged, optionally partially, when the chamber 3 is emptied and refilled. The process is optionally repeated until the pressure in the large chamber 6 drops, for example to ambient pressure. Such a use of a large chamber may be cost-effective. With this energy 3.62 chambers 6 can be filled with compressed air at 40 Bar. Chamber 1 is 1 Bar, chamber 2 is the compressed air to 40 Bar that can be stored in chamber 6.

In some embodiments, the chamber 6 may be several chambers. In some embodiments, valves enable pressurized gas flow into one or more of the several chambers 6 individually, and pressurized gas flow from one or more of the several chambers 6 individually.

In some embodiments, having two chambers 5 5B enables one chamber to be compressed (charged) at the same time that the other chamber is de-compressed (discharged), to potentially allow a more continuous flow at the turbine 112 and at the pump 110.

In some embodiments, the system is multiplied to increase the overall capacity.

Optionally, more than one chamber 5 5B are used simultaneously for discharge, potentially increasing the turbine 112 power.

We note that in some cases when air enters the chamber 5 the air is optionally at ambient temperature. This can be achieved by pre-cooling the second chamber 2 with water spray or a heat exchanger.

In some embodiments, instead of refilling the second and third chambers 2 and 3, the pump 110 and the turbine 112 directions are optionally reversed, and the high-pressure chambers become the first and the fourth chambers 1 and 4. Optionally the airflow may be directed to the new high-pressure first chamber 1 and fourth chamber 4. In such a scenario, once the third chamber 3 is emptied and the fourth chamber 4 is filled, the fourth chamber 4 is optionally sealed and air is optionally injected to the fourth chamber 4 to increase its pressure. Flow from the fourth chamber 4 can drive the turbine 112, while returning to the third chamber 3. Such a cycle is optionally repeated and the chambers operate like a two piston engine, pushing the turbine in the same rotation direction.

In some cases a change of pressure gradient may not necessarily cause the turbine 112 and pump 110 to work in the reverse direction. In some embodiments, the operation direction may be maintained by additional pipes that connect the newly high-pressure chambers 1 and 4 to a same high-pressure side of the pump 110 and turbine 112 as in the case where the chambers 2 and 3 are at high-pressure.

Reference is now additionally made to FIG. 2, which shows a P-V diagram and a T-S diagram of an example embodiment.

FIG. 2 shows a thermodynamic process occurring in an example embodiment system as a P-V (Pressure-Volume) diagram 202 and as a T-S (Temperature-Entropy) diagram 222. The P-V diagram 202 has an X-axis 204 of Volume [m³], and a Y-axis 203 of Pressure [Bar].

The T-S diagram 222 has an X-axis 224 of entropy S [MJ/K], and a Y-axis 203 of Temperature [Kelvin].

The values shown in the diagrams 202 222 are according to the example embodiments described below, and the process described is an example embodiment process.

At above-described state 1 (references 206 226) a system is at 300K and air is compressed isothermally, optionally by injecting water spray, to, for example, 40 Bar. By injecting water at a same temperature, or approximately a same temperature as the air, the large heat capacity of the water keeps the compressed air at an approximately fixed temperature when pressure drops, so the expansion is termed isothermal.

The system reaches state 2 (references 207 227) as heat exits the system, see Q1(Out) 211. Next, the air is inserted as air bubbles to, for example, molten salt at 850K, potentially exhibiting ideal or close to ideal gas expansion. For a non-limiting example calculation, we consider a volume of 50 cubic meters of pressurized air at 40 Bar.

The air expands slowly according to the increase in volume due to the flow. We consider the air to be heated at constant volume reaching a pressure of $$P_3 = 40 * \frac{850}{300} = 113 bar$$

and state 3 (references 208 228).

Finally, bubbles or spray produce work through isothermal expansion, as the molten salt flows to a lower pressure, increasing the volume and driving the turbine. The system relaxes to an ambient pressure of 1 Bar at state 4 (references 209 229).

In some embodiments, such as shown in FIG. 1E, the turbine 112 is optionally connected by the shaft 126 to the pump 110 that compresses, optionally isothermally, the air between states 1 and 2.

The same process is depicted in the T-S diagram 222.

In some embodiments, the pump 110 is driven electrically, while the turbine 112 between the third chamber 3 and the fourth chamber 4 is connected to an electric generation motor as in other turbine-electric systems.

An example calculation of total efficiency:

$$Q_1 = W_1 = P_1 V_1 \ln\left(\frac{V_2}{V_1}\right) = 50 \text{ m}^3 * 40 Bar * \ln(40) = 205 \text{ kWh}( = 738 \text{ MJ})$$

$$P_1 V_1 = mRT_1 => m = P_1 V_1 / RT_1 = 2353 \text{ Kg}$$

$$Q_2 = mPC_V \Delta T = 2353 \text{ Kg} * 780 * 550 \text{ K} = 280 \text{ kWh}( = 1009 \text{ MJ})$$

$$Q_3 =$$

$$W_3 = V_3 P_3 \ln\left(\frac{V_4}{V_3}\right) = 50 \text{ m}^3 * 113 \text{ } Bar * \ln(113) = 7422 \text{ kWh}( = 2670 \text{ MJ})$$

$$\eta = \frac{\Delta W}{Q_{in}} = \frac{W_3 - W_1}{Q_2 + Q_3} = 52\%$$

A potential loss in the system may be at the 850K heat at state 4, which potentially accounts for $$Q_4 = mPC_P \Delta T = 2353 \text{ Kg} * 1000 * 550 \text{ K} = 360 \text{ kWh}$$
$$(=1294 \text{ MJ})$$

Q4 is an amount of heat input to the gas to heat the gas to a temperature equal to the temperature of the fluid.

In some embodiments, the heat is optionally be restored by heating the air at state 2, or heating the water at the final electricity generation at the turbine.

Hot water at this stage potentially results in a larger expansion compared to ambient temperature. The water at this stage can optionally be at 90 degrees Celsius using, for example, waste heat.

The efficiency reached by isothermal expansion potentially reaches 90%. The isothermal expansion is about half of the full compression expansion cycle described above, and indicates an overall potential practical efficiency of:

$$\eta = \frac{\Delta W}{Q_{in}} = \frac{0.9 * (W_3 - W_1/0.9)}{Q_2 + Q_3} = 45\%,$$

without heat recovery as described above.

Re-capturing 50% of the Q4 heat, where Q4 is the heat that was used to heat the gas that is leaving the system, which re-capturing is optionally achieved by using a heat exchanger between the exiting air at 850K and the chamber 5, the efficiency can be:

$$\eta = \frac{\Delta W}{Q_{in}} = \frac{0.9*(W_3 - W_1/0.9)}{Q_2 + Q_3 - Q_4/2} = 55\%$$

Power Consumption

In some cases, in practice, it is desirable to inject a large amount of air to increase productivity at a potential expense of reducing air temperature.

In some embodiments, heat compensation is optionally delivered by, for example, concentrated solar power at a solar receiver. For a solar application, heat transfer fluid (HTF) such as, for example, molten salt, thermal oil, or other, from the solar receiver, can be used as thermal fluid in chambers 3 and 4 driving the heat engine.

In some embodiments, two different fluids may optionally be used. In some embodiments, a heat exchanger is used to transfer heat from a solar HTF to an engine HTF.

For the solar application, an engine such as the pump 110 of FIG. 1E can operate throughout the day, storing power as compressed air (or other gas) in a chamber such as chamber-6, later to be converted to electricity using hydro-turbine.

In some embodiments, the engine may be operatively connected to an electric generator, such as the turbine 112, and generated electric energy may be stored in electric batteries.

In some embodiments, thermal storage may be part of a solar energy system, and the HTF of the turbine 112 may receive heat from the thermal storage, allowing a continuous operation.

In some embodiments, increasing a temperature of the engine HTF depends on a cooling rate of the engine-HTF, which depends on the engine capacity (generated power) and thermal losses. In some embodiments, heat exchange between the solar-HTF and the engine-HTF may occur in each cycle or when the engine-HTF is cooled.

In some embodiments, the heat source is waste heat from an industrial source.

In some embodiments, a geothermic heat source can be used.

In some embodiments, by way of a non-limiting example as shown in FIG. 1E, molten salt temperature in chamber-3 drops, for example, from 850K to 700K as the air expands. This reduction of 150K may optionally be compensated by a heat source (solar receiver as one example).

In some embodiments, a temperature difference of the HTF is less than one degree due to a large heat capacity of the HTF compared to the work produced per cycle. In such a case, chambers 3 and 4 can perform hundreds of cycles before the temperature is reduced and the oil needs to be reheated.

For an example embodiment of a solar application, the above enables re-heating the engine-HTF with the solar-HTF at a delay of many cycles (tens or hundreds of cycles). The delay of heating offers a potential reduction in mass flow and/or a potential reduction in cost, by reducing the number of re-heating events.

In some embodiments, after chamber-3 is emptied, as part of the refilling process, a pump (not included in the drawing) circulates molten salt (fluid 128) from chamber-4 through a solar receiver 130 into chamber-3, potentially causing the temperature of the molten salt (liquid 124) to increase at the solar receiver, optionally back to 850K. In such an example, $Q_2+Q_3=37015$ MJ (1031 kWh) is the input heat of the receiver for the duration of each cycle. For a 1-hour cycle, this translates to 1.031 MWh.

Discussion About Rates

In the above example, the receiver generates $Q_2+Q_3=1.031$ MWh of heat for a discharge of a 50 m³ air chamber-6.

In some embodiments, for example for a solar or waste heat receiver having 1.03 MW thermal power, a full 50 m³ chamber may be discharged in 1 hour. At a same time, the system optionally charges 3.62 such chambers to 40 Bar during that 1 hour, and chambers 1 and 2 optionally operate for 113 cycles. Such a rate may be challenging to implement. Multiplying the number of chambers in a system can support a similar thermal input power over a longer cycle duration. For example, ten chambers 1 and ten chambers 2 system used with the same 1 MW receiver will receive a same total thermal power input of 1 MW, potentially enables 5 minutes per cycle. Dividing a system such as shown in FIG. 1E into two groups of 5 subsystems each potentially enables discharging one set of 5 chamber(s)-6 while charging another set of 5 chamber(s)-6.

In some embodiments, adding multiple systems in parallel potentially extends the cycle duration to any required period.

In some embodiments, during a final discharge of the chamber(s) 6 through the turbine, a solar receiver of 1.03 MW can potentially supply 1.03 MWh*0.45*$6_{hours}$=2.781 MWh of electricity per day even without heat recovery, and 1.03 MWh*0.55*$6_{hours}$=3.4 MWh/day at 55% efficiency when 50% of the heat is recovered.

Dynamic Power Range

A molten salt turbine and a water pump may potentially work over a large range of pressure differences. For example, at the first discharging cycle the pressure difference between chambers 3 and 5 is 113 Bar, and drops to ~2 Bar, while in the last discharging cycle the pressure difference is <10 Bar that drops to ~2 Bar. The pump potentially induces a pressure that is between 2 Bar and 40 Bar.

To overcome such challenge, in some embodiments, one may optionally use a Kaplan turbine where a blade angle can optionally be changed according to changing pressure difference, potentially increasing the range of the optimal pressure difference.

Optionally, if using a Pelton wheel, a nozzle, designed for converting pressure into kinetic energy of flow, can be adjusted and/or replaced with a different nozzle according to the pressure difference between cycles and within cycles.

Optionally, a gear between the pump and the turbine can convert power as needed, maintaining both the pump and the turbine at optimal operation.

Reducing Hot Chamber (3) Pressure

Molten salt (or other hot fluid) drives the pump and the storage. In the above example the work done is 2670 MJ, which can be achieved by molten salt at various pressures and volumes according to the following equation:

$$Q_3 = V_{fluid} P_{fluid} \ln\left(\frac{P_{salt}}{1 Bar}\right) = 2670 \text{ MJ or}$$

$$V_{fluid} = \left(\frac{2670 \text{ MJ}}{P_{salt} \ln(P_{fluid}/1 Bar)}\right)$$

An example list of possible pressure and volume values that are equivalent to the above example of 50 m³ volume operating at 113 bar includes:

| P [Bar] | V [m³] |
|---|---|
| 10 | 1159.214 |
| 20 | 445.4986 |
| 30 | 261.5931 |
| 40 | 180.8943 |
| 50 | 136.4608 |
| 60 | 108.6535 |
| 70 | 89.75242 |
| 80 | 76.14026 |
| 90 | 65.90869 |
| 100 | 57.96071 |
| 110 | 51.62314 |
| 120 | 46.46116 |
| 113 | 50 |

Reducing Volume and Pressure in the High-Temperature Chamber by Time-Sequential Air Injection Thus far we described a balanced system where the high-temperature cycle and the cold cycle, potentially enables refilling all chambers at the same time. The description included a molten salt chamber-3 optionally having a volume on the order of the volume of the water chamber-2, for example volumes as described in the table above.

In some embodiments, chamber-5 optionally contains sufficient air to fill chamber-3.

In some embodiments, we allow the molten salt in chamber 3 to complete an input and output cycle faster than an input and output cycle of the water chamber 1 cycle, we can potentially reduce the volume of chamber-3 by the ratio of input-and-output cycle times.

In some embodiments, a synchronization between the cold and hot cycle duration is optionally maintained. For example, 10 times faster in charging-discharging reduces the chambers-3 volume and the chamber 5 volumes by 10—by an order of magnitude.

Figure 3:
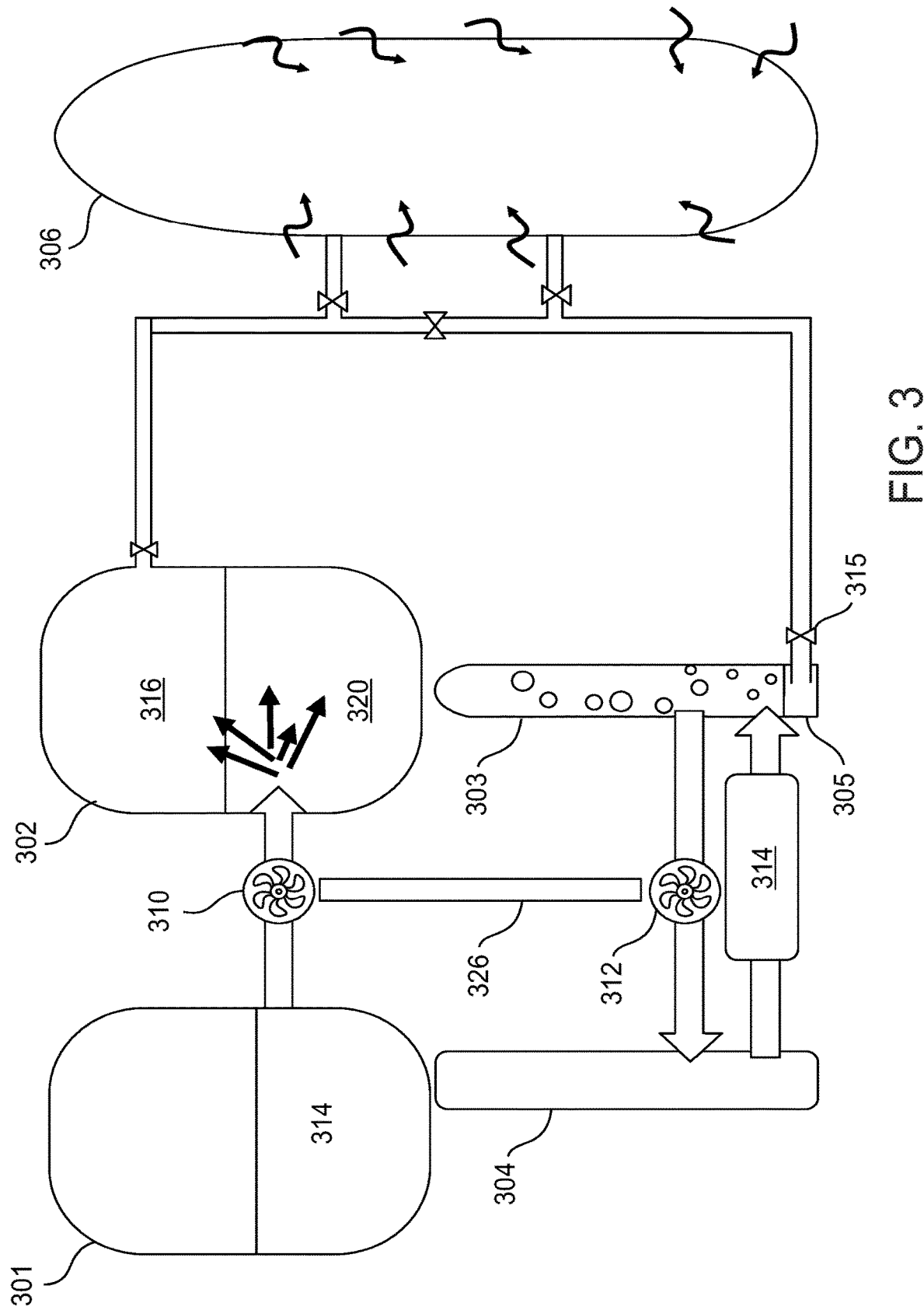
FIG. 3 is a simplified illustration of an example embodiment.

In some embodiments, smaller chambers 3, 4, and 5 may optionally be used, for example by a system depicted in FIG. 3.

Reference is now made to FIG. 3, which is a simplified illustration of an example embodiment.

FIG. 3 depicts a system including lower temperature chambers 301 302, and higher temperature chambers 303 304, a pump 310 and a turbine 312 for using heat energy to pressurize air, to be converted to electricity by the turbine 312.

FIG. 3 shows an example embodiment which uses a fast high temperature cycle for reducing volumes of chambers 3, 4 and 5 shown with reference to FIG. 1E.

FIG. 3 shows the cassettes of chamber(s) 6 in FIG. 1E optionally replaced by a larger chamber 306.

In some embodiments, a chamber-305 is optionally attached at a bottom of chamber 303.

A non-limiting example flow of energy in the system of FIG. 3 is now described.

Water at ambient temperature (e.g. ~300K) and/or ambient pressure in the chamber 301, being in state 1, is pumped into the chamber 302, which may be wholly or partially filled with air 316, compressing the air isothermally, by the air exposed to a fluid having a high heat capacity, which maintains an approximately constant temperature along expansion, to a pressure above ambient pressure, such as to 40 Bar, 100 Bar, 300 Bar, or other value, at the ambient temperature, transferring from state 1 to state 2. Compressed air in state 2 is optionally stored in chamber 306, in state 2, for example at a pressure of 40 Bar and ambient temperature, e.g. 300K. In some embodiments, the air is exposed to a fluid in chamber 3 by bubbling. In some embodiments, the fluid is sprayed into the air in chamber 3.

Pressurized air is optionally fed from the chamber 306 to the chamber 305, after which a valve 315 is closed, and hot fluid, or air, or a fluid/gas mixture, heated by a heat source 314 is fed to the chamber 315 and/or to the chamber 303, heating the pressurized air as a fluid/air mixture, reaching state 3 within the chamber 303. For example, the chamber 303 contains 0.02 m³ of molten salt at a temperature of 850K and a pressure of 113 Bar.

The molten salt at a temperature of 850K and a pressure of 113 Bar is used to drive the turbine 312, feeding into the chamber 304, losing pressure and/or temperature. By way of a non-limiting example the chamber 304 may contain molten salt at a temperature of 700K and an ambient temperature, for example 300K.

In some embodiments, the chamber 304 may have a volume of 0.02 m³.

In some embodiments, the heat source 314 may be a solar receiver and/or some other heat input.

In some embodiments, a shaft transfers energy from the turbine 312 to the pump 310. In some embodiments, the turbine 312 produces electricity which is provided to the pump 310, in addition to other users of the generated electricity.

Such a design can use, for the turbine 312, a Francis turbine, a Kaplan turbine, a Pelton wheel, a Tesla turbine and similar designs used for hydroelectric turbines.

In some embodiments, before filling chamber-303, chamber-305 is optionally filled with cold air at, by way of a non-limiting example, 40 Bar pressure. The chamber 305 may remain hot from a previous cycle. In such a case, a heat transfer rate between the air and the walls of chamber-305 is optionally designed to be slower than the rapid filling of the chamber 305 with air and sealing of the chamber 305.

For example, air is added into the chamber 305 air at a pressure of 40 Bar. The air heats up into the chamber 305 to a pressure of 113 Bar. If the volume of chamber-303 is 20 liters, then the chamber-305 can optionally have a volume of 20 liters/113=0.18 liters.

When opening the valve between chamber-306 and chamber 305 the pressure potentially equalizes in a short time, for example a few milliseconds, faster than a typical heat transfer rate, potentially eliminating or drastically reducing temperature rise.

In some embodiments, several such chambers 305 and 303 are used in a time-sequential manner, to reach a continuous, or closer-to-continuous, powering of the turbine. Similar to car engines, there are optionally 2, 3, 4, or other numbers of chambers, optionally filling at different times, optionally having equal phase differences between their cycles.

In some cases, with an additional piping system that is optionally connected in reverse, (for example chamber 303 connected to a low-pressure side of the turbine 312, chamber 304 to the high-pressure side of the turbine 312, and also similarly for chambers 301 and 302. In such a case, when chambers 303 and 301 are empty, valves are flipped to switch between chambers 301 and 302 and between chambers 303 and 304. In such an example configuration chamber 304 is optionally also connected to chamber-305 at its bottom. A discharge time for each chamber-303 for the same power generation as the previous example (50 m$^3$) is potentially proportional to the size and the number of chambers. For a 20-liter volume and 10 chambers (of each chamber 305 and 303), the discharge time can be 10*3600/50000*20=14 seconds.

A trade-off between the volume and pressure can also be implemented by using fast air injection for reducing pressure while increasing the size of chambers 303 and 305.

Converting Heat to Work by Generation of Vacuum

Thus far we have described a method for using heat to produce a pressure gradient and to produce mechanical work. The method used high temperature and high-pressure chambers which may be expensive. In addition, a turbine that operates at high temperatures and is run by a potentially corrosive media may be expensive. There may be an advantage to eliminate using a turbine and/or using high-temperature and/or high-pressure chambers.

Figure 4A:
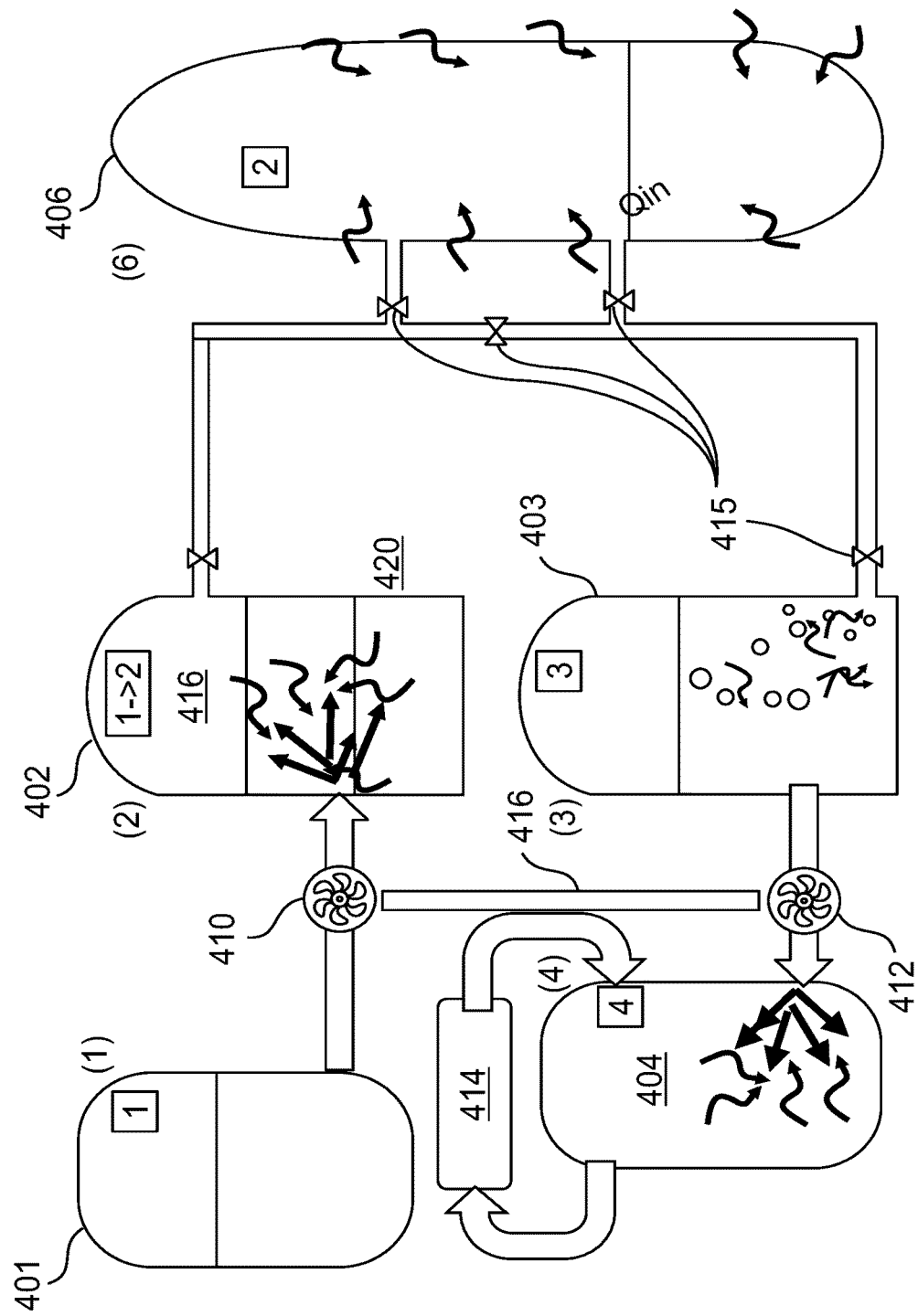
FIG. 4A is a simplified illustration of a system for converting heat to work by generation of vacuum according to an example embodiment.

Reference is now made to FIG. 4A, which is a simplified illustration of a system for converting heat to work by generation of vacuum according to an example embodiment.

FIG. 4A shows a system partially similar to the system of FIG. 3. The portion similar to FIG. 3 includes chamber-1 401, pump 410, chamber-2 402 and chamber 6 406.

FIG. 4A also shows a chamber-3 403 and valves 415 by which either chamber 2 402 or chamber 6 406 can provide pressurized gas to the chamber-3 403, depending on valve settings.

FIG. 4A shows a chamber-1 401 of, by way of a non-limiting example, 50 m$^3$ volume containing water at 300K and 1 Bar, which are, for example, ambient conditions. The choice of the ambient conditions is only by way of example. A pump 410 transfers the water from chamber-1 401 into chamber-2 402, having sealed air or some other gas. The air is isothermally compressed by the pumped water, for example by using a spray of water or circulating air bubbles in the water. The compressed air at, by way of a non-limiting example, 40 Bar is optionally collected in chamber-6 406. The compressed air from chamber-6 406 is used to increase pressure at chamber-3 403 to, by way of a non-limiting example, 40 Bar.

Hot air from an optional solar receiver 414 or some other heat source such as a waste heat source 414 is optionally transferred to chamber-4. The hot air is, by way of a non-limiting example, at a temperature of 850K.

Chamber-4 404 is optionally sealed, and water spray optionally cools the air to ambient temperature, for example 300K.

In some cases, water from chamber-3 403 is provided, to act as cooling water. The pressure potentially drops in chamber 4 404 by a factor of 300K/850K, from 1 Bar to 0.353 Bar. A turbine 412 performs mechanical work by converting the pressure difference between chamber 3 403 and chamber 4 404 to a rotation of a shaft 416.

Such a design can use, for the turbine 412, a Francis turbine, a Kaplan turbine, a Pelton wheel, a Tesla turbine and similar designs used for hydroelectric turbines.

It is noted that the work done by the turbine 412 is proportional to a natural logarithm (ln) of the pressure difference across the turbine, so reducing the pressure in chamber 4 404 by approximately three-fold increases potential work done by adding approximately ln(3)=~1.1 to approximately, for example, ln(40 Bar/1 Bar)=ln 40=~3.7, and improvement of work produced by approximately 1.1/3.7=~30%.

In some embodiments, the expansion of air or gas in chamber 3 403 is an isothermal processes, with fluid maintaining an approximately steady temperature.

In some embodiments, the expansion of air or gas in chamber 4 404 is an isothermal processes, with spray of water or other fluid maintaining an approximately steady temperature. The vacuum method potentially uses repeating cycles of refilling of chambers.

Adjusting Power Between a Turbine and a Pump

In some of the methods and systems described, a shaft is optionally connected between a turbine producing work and a pump used to compress air to produce the work. Using a shaft to directly connect the turbine and the pump may not enable adjusting the power between the pump and the turbine.

In some cases, the shaft is optionally connected to a gearbox (not shown) that provides some options in rotation speed ratio between the turbine rotation and the pump rotation. This allows a wider dynamic range for potentially achieving greater efficiency.

In some cases, the gearbox is optionally able to cover an entire range of ratios of rotations that is relevant to a maximal pressure needed at the pump side, which for the above example is 40 Bar and for a minimal pressure difference at the turbine.

In some embodiments, a pressure compensated pump is included in the hydro-pump to enable compressing the air over a large range of pressure differences.

In some embodiments, air is compressed from 1 bar in chamber 301 to 40 Bars in chamber 302, and the pump provides a pressure difference of 1-40 bar.

For the example described, for the turbine to operate also during a final cycle, when, for example, chamber 6 306 of FIG. 3 is nearly empty, having pressure, for example, of 2 Bar, the gas at 2 Bar pressure will increase in pressure, after heating to, for example, 700° K. to 4.7 Bar. In such a case, the system of FIG. 3 may use a gear with a ratio of 10, where the turbine is 10 times faster than the pump, to provide enough energy to the pump.

In some embodiments, gear ratio between the turbine and the pump is increased as the pressure difference across the turbine decreases.

At another end of the pressure change during use of the chamber 6 406, during the system's first cycle, chamber-6 406 has, for example, a pressure of 40 Bar, which is heated and increases to 93 Bar in chamber-3 303 of FIG. 3.

In some cases, at that time, the pump 310 may work against a substantially empty chamber-2 302 of FIG. 3. Under such conditions, the ratio in rotations may be about a factor of 10, where the pump is faster.

In some embodiments, achieving 2 orders of magnitude dynamic range (a ratio of 0.1 to 10 in rotation range) is achieved by a pump design such as a Kaplan pump, which potentially enables a broader efficiency range by changing turbine blade angle.

In some cases, the turbine is a Kaplan design turbine.

Reducing the Operation Pressure

In some systems, it may be preferable to operate at a lower pressure than mentioned above.

For example injection of cold air at 17.6 Bar into thermal oil at 370 C. results in 40 Bar operation pressure driving a 40 Bar turbine. In another example; injection of cold air at 8.75 Bar into thermal oil at 370 C. results in 20 Bar operation pressure, which allows driving a turbine designed for 20 Bar.

Maintaining a High-Efficiency Turbine by Dynamic Changing the Load with the Reduction in Pressure When the high-temperature high-pressure chamber-3 303 of FIG. 3 or high temperature chamber-4 403 of FIG. 3 are discharged, pressure drops from its maximal value to a lower pressure, optionally as low as a minimum value at which 312 the turbine can operate. The lower pressure can be nearly ambient pressure, or some higher pressure. When the pressure drops, the HTF velocity emerging from the nozzle, driving the turbine, decreases. For turbines, a maximal efficiency is when velocity of the fluid is double the tangential velocity of the turbine. Conventional turbines typically operate against a constant load defined by a head pressure of the system. In such a conventional system, a drop in the pressure against the constant load (that matches the high pressure), slows the rotation of the turbine and reduces efficiency of the turbine. In some cases the turbine is connected to an electric generation unit. In such a case, the load on the turbine is defined by the electric power generation. Reducing the generation of electric power to match the reduction in pressure, potentially maintains the linear velocity of the turbine blade tips at 50% of the fluid velocity, maintaining maximal efficiency. Such an effect can be achieved by an electric control system over the electric generation unit. Optionally, because the load reduction matches the pressure reduction, a mechanical element such as a piston, driven by the pressure of the HTF, may control the electric load and replace an electric control system.

Such control is similar to an electric car generator connected to the brakes in an electric car. High pressure on the brakes increases the generation of the electric generator (producing more electric energy by increasing the load). Reducing the pressure on the brakes reduces the electric generator load.

In some embodiments, the turbine is connected by a shaft to the-pump storing energy as compressed air. In such a case, a mechanical element that reduces load on the turbine as the HTF-pressure drops is similar to car brake pads. Increasing the pressure across the turbine increases load, maintaining the turbine velocity at an optimal value compared to the HTF velocity.

In some embodiments, a mechanical gear between the turbine and the pump potentially maintains an optimal turbine velocity for an entire dynamic pressure range, or at least a better-than-no-gear turbine velocity across the dynamic pressure range.

In some embodiments a pressure compensated pump is used for efficient pumping over a broad range of pressure differences.

An aspect of the examples described herein takes as an example a combination of air as a compressible gas with a fluid such as water and/or thermal oil, and/or molten salt. However, such a concept can be realized with any gas, for example, $CO_2$, $N_2$, steam, and many others. The heat transfer fluid can be any useful fluid, for example, such as used in concentrated solar power plants, or nuclear power plants, including molten sodium.

An ideal Carnot cycle is based on an isothermal process. However, the same concept can also be implemented through an isobaric expansion or compression of gas pushing fluid in chamber-3, and driving a turbine.

In some cases, on-demand releasing the compressed gas from chamber 6 into a water chamber-3 is used to drive a hydroelectric turbine, thereby converting the stored gas pressure into electricity. In such a process, the expansion of the gas potentially depends on the temperature of the water.

In some embodiments, heating water to an elevated temperature potentially increases an example device's efficiency. For example, taking 50 $m^3$ of gas at 40 Bar and 400° K. potentially has 25% more energy (to be converted to electricity) than gas under the same conditions, at 300° K. Taking advantage of a high heat capacity and a low rate of thermal loss of water, it is potentially possible to heat the water at the end of an energy-storing stage.

In a solar receiver example, once the sun sets salt which received heat during the day may still be hot but maybe not sufficient to drive a turbine as molten salt.

In some embodiments, residual heat of the salt is optionally transferred to a water chamber, elevating the temperature of the water.

In some embodiments, the turbine has a minimal pressure value in which it operates efficiently. The minimal pressure can maintain a residual pressure of hot gas and HTF in the chamber-3 or chamber-4. It is possible to recover this pressure by connecting a pipe between chambers 3 and 4 and chamber-2, bypassing the turbine and directly increasing the pressure in chamber 2 for storage.

In some embodiments, the use of residual pressure is performed before the gas has an opportunity to cool.

According to a cycle of the example described above, chambers 3 and 4 are left with hot gas (for example air) after complete gas expansion. Heat of the air may be wasted when the chamber is refilled with HTF during a next cycle.

In some embodiments, the heat loss is prevented by heating chamber-5 after it is filled with compressed cold air. In such an embodiment, the pressure in chamber-5 increases with heating, reducing heat transfer from the fluid, for example from the oil.

In some embodiments, such as in solar applications, a large chamber-5 is used, that supplies sufficient air to the operation through an entire day. Such a supply of air may correspond to 10, 50, or 100 $m^3$ of chamber size. Using the residual heat in chambers 3 and 4 to heat chamber 5 in each engine cycle, potentially increases temperature of chamber-5 by a small amount, but recycles potentially wasted heat. In some embodiments, at night, chamber-5 is re-filled using the hydro-pump.

Figure 4B:
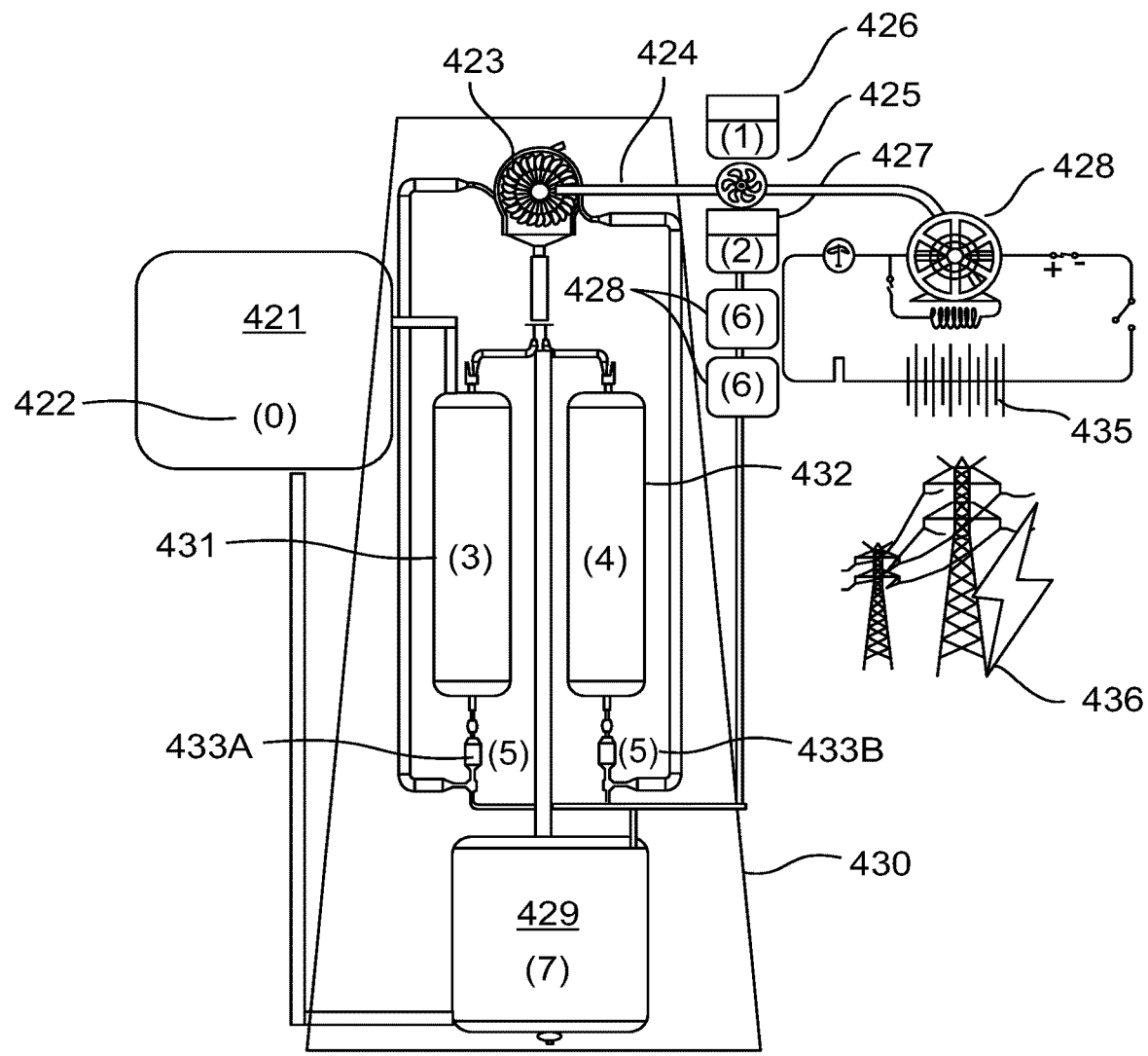
FIG. 4B is a simplified illustration of a heat engine used in an energy production system according to an example embodiment.

Reference is now made to FIG. 4B, which is a simplified illustration of a heat engine used in an energy production system according to an example embodiment.

FIG. 4B depicts a heat receiver 421 such as a solar receiver, optionally integrated with thermal storage, chamber-0 422, and an oil-driven HTF-engine 423. In the example embodiment of FIG. 4B, thermal oil, for example Therminol® 66, at a temperature of 400° Celsius is used to drive a 100 kW turbine 423. A shaft 424 connects the turbine 423 to a pump 425 which compresses a fluid into chambers 1 426 & 2 427 which contain an initial amount of air, for providing initial compressed air to one or more chamber-6 428. In some embodiments, the shaft 424 is also connected to an electric generator 428 for generating electricity, to be stored in a battery 435 or provided to the grid 436.

Heated fluid such as Therminol® 66 from the heat receiver 421 is collected into the chamber 3 431.

Compressed air from chambers 6 428 or chamber 2 427 is provided to a chamber-5 433A. Once chamber 5 433A is sealed the heated fluid from the chamber 3 431 is then provided to the chamber 5 433A, where the heated fluid heats the compressed air and pressure increase by the temperature ratio. The heated fluid-and-gas are led to the turbine 423, where work is produced, and used as described above.

Such a design can use, for the turbine 423, a Francis turbine, a Kaplan turbine, a Pelton wheel, a Tesla turbine and similar designs used for hydroelectric turbines. In some embodiments, the fluid then fills chamber 4 432. When air pressure fills chamber 5 433BB and chamber 5 433B is sealed, the fluid at chamber 4 432 is provided to chamber 5 433B, and increases pressure by heating from the fluid from chamber 4 432. Then the pressurized fluid-and-gas drives the turbine 423.

In some embodiments, the fluid returns to chamber 3 431, completing a cycle, and the cycle starts over.

In some embodiments, the example embodiment of FIG. 4B includes an HTF reservoir, chamber 7 429. The HTF reservoir chamber 7 429 optionally collects the oil after one or more cycles at the turbine 423.

In some embodiments, at an end of a day air pressure is used to transfer the HTF collected in the HTF reservoir chamber 7 429 into heat receiver 421 or the chamber-0 422 for reheating.

In some embodiments, chambers containing potentially hot fluid and/or gas and pipes leading potentially hot gas are optionally thermally insulated 430. The components insulated may optionally include chamber 3 431, chamber 4 432, chambers 5 433A 433B, optional chamber 7 429.

Controlled Volume Calculations for Therminol® 66 at 400° C. Designed for a 100 kW Solar Receiver Considering a volume of air in the inertial frame of reference.

Step-1: Starting with a 3 m³ of controlled volume air in chamber 1 426, at ambient conditions.

$$P_1V_1 = mRT_1 = > m = \frac{P_1V_1}{RT_1} = 3.51 \text{ Kg}$$

According to the ideal gas equation, PV=nRT, increasing the pressure of the gas from approximately 1 Bar to 40 Bar reduces the volume to 0.075 m³. When the process is done isothermally, the heat to be removed from the gas to the surrounding is $Q_1=W_1=P_1V_1 \ln(V_2/V_1)=1.107$ MJ.

Step-2: heating the gas with oil to 673K at constant volume. Assuming air to oil volume ratio of 4/96. It is noted that using 4% air instead of 2% can reduce chamber sizes by a factor 2 with pressure losses less than 1%), heat capacities of $$C_{v,Air} = 0.81 \frac{KJ}{KgK}, C_{oil} = \frac{2.89 \text{ KJ}}{KgK},$$

and oil density of 738 Kg/m³. The resulting temperature is:

$$3.51*0.81*\Delta T_{Air} = 0.075*0.96/0.04*738*2.89*\Delta T_{oil},$$
and $$\Delta T_{oil} = 373 - \Delta T_{Air} = > \Delta T_{Air} = 372.97K.$$

Both the air and the oil are at a temperature of 673K. The heat taken up by the air is: $Q_2 = mC_v \Delta T = 3.51$ Kg*0.81*373K=1.06 MJ, and the pressure increases to, for an ideal gas $P_2 = 673*40$ Bar/300=89.7 Bar.

Step-3: calculating for an approximately isothermal expansion, $$Q_3 = W_3 = V_3 P_3 \ln(V_4/V_3) = 0.0375 \text{ m}^3 * 89.7 \text{ Bar} * \ln(89.7) = 3.02 \text{ MJ}.$$

The total energy invested is $Q_2 + Q_3 = 1.06$ MJ + 3.02 MJ = 4.08 MJ.

$$Q_4 = mC_P \Delta T = 3.51 \text{ Kg} * 0.7 \frac{KJ}{KgK} * 373 \text{ } K = 0.916 \text{ MJ}$$

The change in oil temperature due to $Q_2+Q_3=0.075$ m³ 0.96/0.04*738*2.89*$\Delta T_{oil}$ $\Delta T_{oil}=1K$. In some embodiments, the oil temperature has dropped by 1 degree Kelvin, and so may be used again, to heat more gas, in another cycle.

An ideal efficiency is $$\eta = \frac{\Delta W}{Q_{in}} = \frac{W_3 - W_1}{Q_2 + Q_3} = 47\%.$$

A practical (assuming 90% as in hydro-electric) efficiency of $$\frac{0.9W_3 - W_1/0.9}{Q_2 + Q_3} = 40\%$$

is potentially achieved without heat recovery from chamber 4, and $$\frac{0.9W_3 - W_1/0.9}{Q_2 + Q_3 - Q_4/2} = 47\%$$

with 50% heat recovery from chamber 4.

In some embodiments, the heat recovery from chamber 4 is done by a heat exchanger between outgoing air at an operating temperature, for example ~400 C., and chamber-6, after it is filled and sealed.

$$W_3 = \frac{mV^2}{2} = 2712 \text{ Kg} \cdot V^2/2 = > \langle V \rangle = 47 \text{ m/s},$$

$Q_3=W_3$ is converted to kinetic energy of the fluid to be converted to electricity by a turbine.

In an example embodiment, having a heat supply of 0.1 $MW_{th}$ (0.1 MJ/s) implies a duration time of 4.08 [MJ]/0.1 [MJ/s]=40.8 s for emptying chamber 3 431 and changing over to chamber 4 432.

In some embodiments, such a solar receiver and HTF engine can use thermal storage using solar radiation to heat the thermal storage, and the thermal storage can drive the HTF-engine on demand.

In some embodiments, battery storage can be used instead of thermal storage by driving the HTF-engine when solar radiation is available and charging batteries for on-demand use.

In some embodiments, compressed air in one or more chamber-6 428 is used to store the energy.

In some embodiments, when the sun is not available for a few days, longer than the energy storage capacity described above, the HTF-engine can operate on hydrogen, biogas, natural gas, or any other fuel source. This way the system can operate 24/7/365 and replace energy system which operate just on fossil fuels (gas, coal, or other), such a system enables collecting solar power when it is available, and shifting to stored energy stored by the same system, and finally shifting to using fuel when neither solar energy not stored energy are available. Replacing fossil fuel turbines by multi-source energy systems potentially reduces costs of the entire grid system.

In some embodiments, low-quality waste heat, at temperatures higher than ambient temperature, for example higher than 373K, drives the HTF-engine.

In some embodiments, heated water at temperatures below boiling temperature can be used as the HTF for driving the turbine, that is, for converting pressure to electricity using a hydroelectric motor (not shown) connected to chamber-2 427. In this case, the high-temperature water elevates the pressure increasing the output power.

Discussion About Chamber 3 431, Chamber 4 432 and Chambers 5 433 of FIG. 4B In some embodiments, use of chamber 5 433A 433B of FIG. 4B is removed, and non-heated pressurized air is provided from a top of the chamber 3 431 and chamber 4 432 which are scaled before the heated fluid is supplied, and the air is heated and the pressure increases. Removing chamber 5 433 potentially reduces costs and complexity. FIG. 4C depicts an optional configuration of such a system and the chamber's configuration.

Reference is now made to FIG. 4C, which is a simplified illustration of use of a chamber for mixing heated fluid and gas according to an example embodiment.

FIG. 4C shows a chamber 441. A valve 442 can be opened to provide heated fluid into the chamber 441. The valve 442 can then be closed. A valve 443 can be opened and compressed air can be provided into the chamber 441. The valve 443 can then be closed, so as not to lose pressure. The heated fluid heats the compressed air in the chamber 441 in an isochoric process, since the gas cannot expand and cannot compress the fluid.

In some embodiments, the chamber 441 also has a pump 444 which optionally mixes the air and the fluid in the chamber 441. In some embodiments, the pump 444 may suck fluid from a bottom of the chamber 441 and spray the fluid at a top of the chamber 441.

In some embodiments, the pump 444 pumps air from a top of the chamber 441 and injects the air into the fluid at the bottom of the chamber 441, as bubbles which bubble up through the fluid, heating the gas along the way.

The chamber 441 includes an exit 445, which when opened, allows the fluid-and-gas to flow forcefully into an engine such as the HTF-engine 423 shown in FIG. 4B.

Figure 4D:
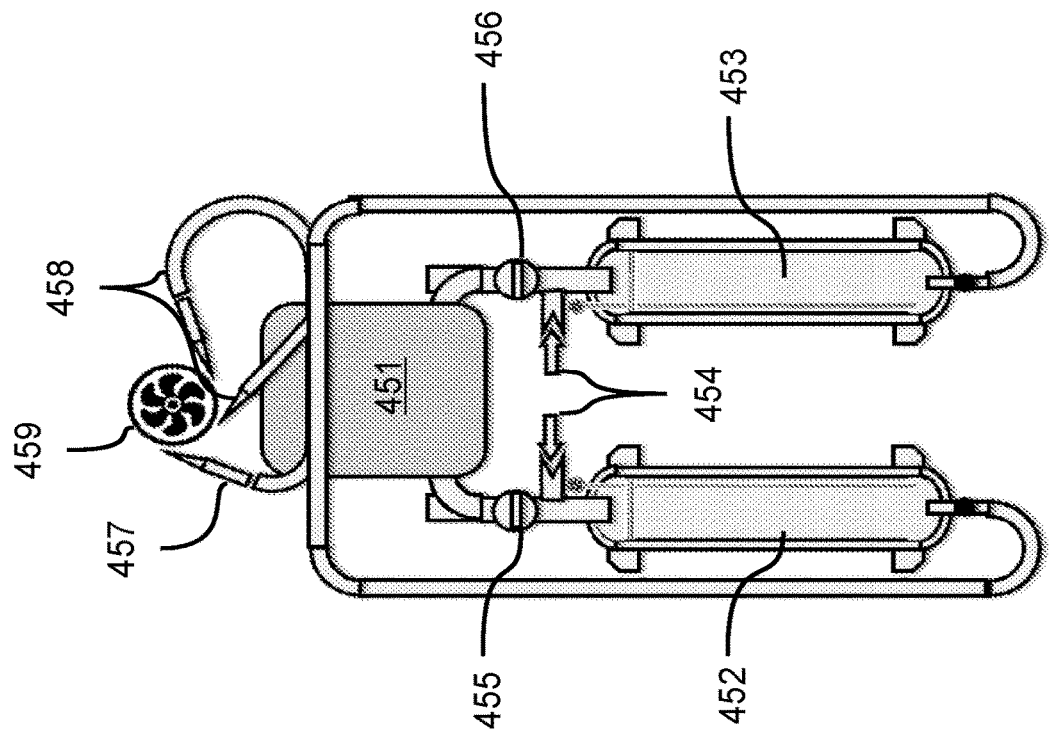
FIG. 4D is a simplified illustration of use of two chambers according to an example embodiment.
Figure 4C:
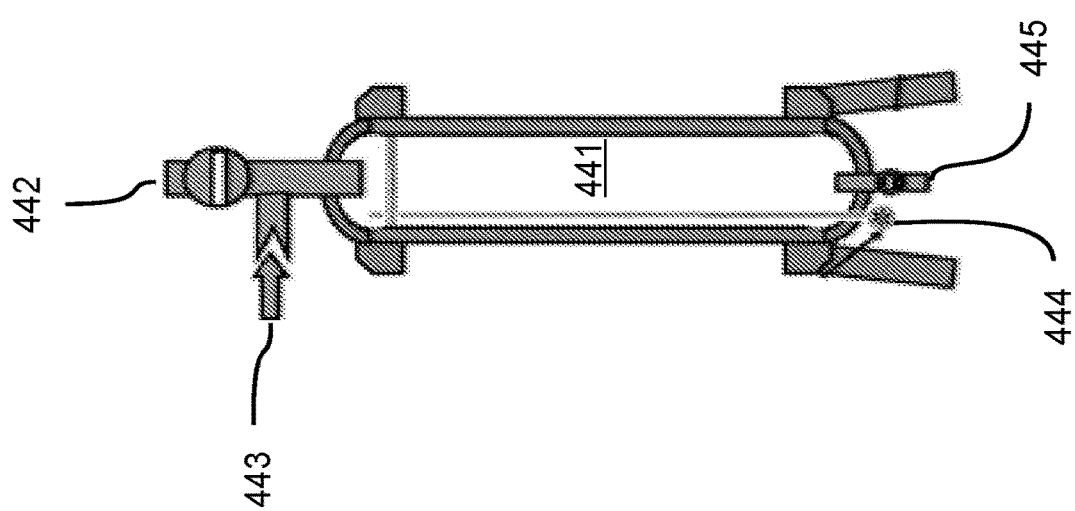
FIG. 4C is a simplified illustration of use of a chamber for mixing heated fluid and gas according to an example embodiment.

Reference is now made to FIG. 4D, which is a simplified illustration of use of two chambers according to an example embodiment.

FIG. 4D shows a chamber 3 452, and a chamber 4 453 (without chambers 1 426 and chamber 2 427 described with reference to FIG. 4B).

In some embodiments, a partial filling of the chamber-4 453 leaves a sufficient volume to insert cold air instead of air from chamber 5 433B of FIG. 4B. Once the cold air is injected, the chamber-4 453 is scaled, and an optional spray oil pump (or air bubble pump) such as shown in FIG. 4C, operates and the temperature of the air reaches the temperature of the oil. Then the oil valve is opened and the oil flows to a heat engine 459, such as a Pelton wheel shown in FIG. 4B, rotating the heat engine. The oil optionally drains through a drain to the chamber-3 452.

In some embodiments, the oil passes through a collection chamber 451.

In some embodiments, the oil passes through a thermal storage 451 or solar receiver 451 for re-heating. The re-heating can be performed in each cycle, or after many cycles, for increasing the temperature difference.

Then, chamber 3 452 is sealed, cold air is injected, and the process repeats. FIG. 4D shows a configuration where two chambers can alternately provide heated fluid-and-gas for driving a heat engine.

FIG. 4D shows nozzles 457 458 459 for providing flow onto the heat engine 459.

Such a design can use, for the heat engine 459, a turbine, a Francis turbine, a Kaplan turbine, a Pelton wheel, a Tesla turbine and similar designs used for hydroelectric turbines.

Figure 4F:
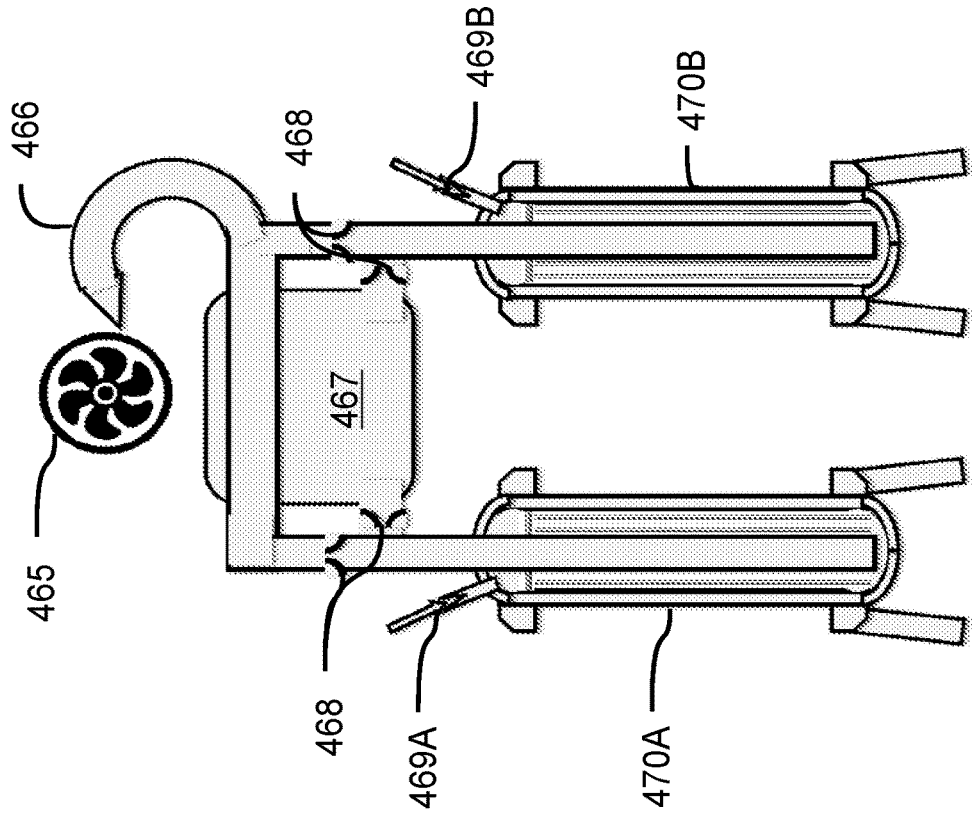
FIG. 4F is a simplified illustration of use of two chambers according to an example embodiment.
Figure 4E:
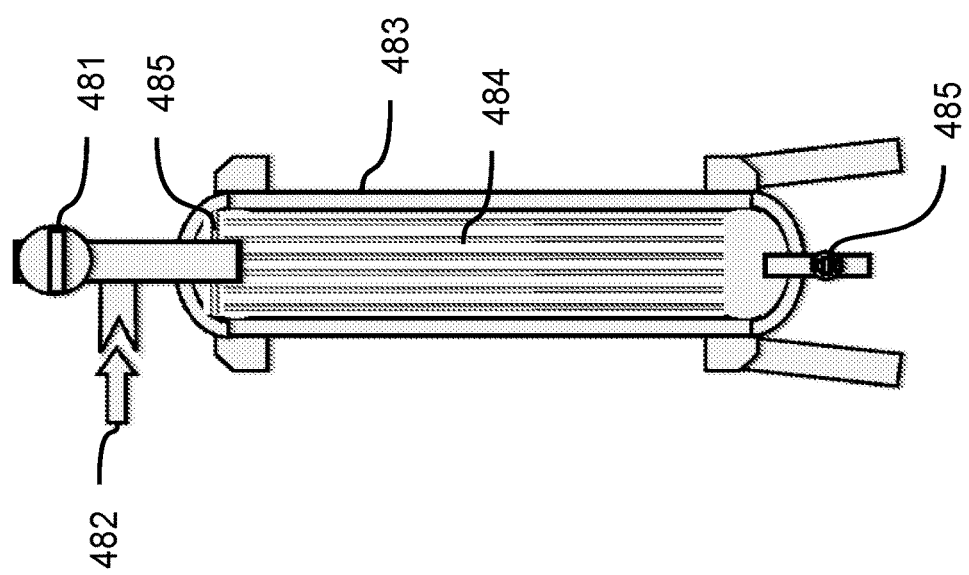
FIG. 4E is a simplified illustration of use of a chamber for mixing heated fluid and gas according to an example embodiment.

Reference is now made to FIG. 4E, which is a simplified illustration of use of a chamber for mixing heated fluid and gas according to an example embodiment.

FIG. 4E shows a chamber 483, in which narrow pipes 484, open at their tops and at their bottoms, are placed vertically. The pipes 484 are connected at their top to a plate 485, and the plate 485 divides the chamber 483 into a top portion, above the plate 485, and a bottom portion, below the plate 485.

A valve 481 can be opened to provide heated fluid into the chamber 483. The valve 481 can then be closed.

In some embodiments, the heated fluid is typically provided to take up approximately 95% of a volume of the chamber 483.

In some embodiments, the heated fluid is filled so as not to reach above the plate 485. A valve 482 can be opened and compressed air can be provided into the chamber 483. The valve 482 can then be closed, so as not to lose pressure. The heated fluid heats the compressed air in the chamber 483 in an isochoric process, since the gas cannot expand and cannot compress the fluid.

The heated fluid is all around the pipes 484, and inside the pipes 484. When a valve 485 is opened at the bottom of the chamber 483, the heated and pressurized air expands through the pipes 484 and pushes the fluid out of the chamber 483. The expansion of the pressurized gas is performed approximately isothermally, because the air passes through the pipes, and while expanding gas should cool, in this case the expanding gas receives heat from a source at a high temperature and a high heat capacity—the pipes and the oil surrounding them.

Fluid exiting through the valve 485 flows forcefully into an engine such as the HTF-engine 423 shown in FIG. 4B.

Reference is now made to FIG. 4F, which is a simplified illustration of use of two chambers according to an example embodiment.

FIG. 4F shows a first chamber 470A, and a second chamber 470B, pipes for feeding compressed air 469A 469B, a nozzle 466 for injecting an HTF stream onto a Pelton wheel 465, an optional basin 467 for collecting spent HTF, and valves 468 for controlling flow of gas and HTF. FIG. 4F shows an example configuration with two pipes for each chamber.

In some embodiments, a partial filling of fluid into the first chamber 470A leaves a sufficient volume to insert air from pipe 469A. Once the air is injected, the first chamber 470A is sealed and the temperature of the air reaches the temperature of the HTF. Then a valve 468 is opened and the HTF flows to a heat engine, such as the Pelton wheel 465, rotating the heat engine. The HTF optionally drains to the basin 467, and from there to the second chamber 470B.

In some embodiments, the HTF is collected in the optional basin 467.

In some embodiments, the HTF passes through a thermal storage or a solar receiver (not shown) for re-heating. The re-heating can be performed in each cycle, or after many cycles, for increasing the temperature difference.

Then, the second chamber 470B is sealed, cold air is injected through the pipe 469B, and the process repeats.

FIG. 4F shows a configuration where two chambers can alternately provide HTF for driving a heat engine.

In FIGS. 4E and 4F, as well as other example configurations described herein, HTF may flow from into a chamber by gravity. In some embodiments, a pump may pump the HTF into the chamber.

Such a design can use, for the heat engine 465, a turbine, a Francis turbine, a Kaplan turbine, a Pelton wheel, a Tesla turbine and similar designs used for hydroelectric turbines.

Size & Velocity of Oil Drops to Maintain a Close-to-Isothermal Process $Q_3=W_3$ is the heat that needs to be supplied and the work generated, respectively, along the isothermal expansion process. The heat $Q_3$ is transferred from the oil drops to the gas (air or other gas). For simplicity, we give the example of a 15 kW Pelton wheel, which can apply to any other turbine, which supports a total net power of 6 kW (due to investment in initial pressure and losses, which leads to 40% efficiency).

The heat transferred, $\dot{Q}_f=15$ kW$=\dot{V}_{Oil}C_{V\_oil}\Delta T_{Oil\_air}$, where $\dot{V}_{Oil}$ is a total volume of oil spray per second injected into the air, $$C_{V\_oil} = 2140 \frac{KJ}{m^3 K}$$

is the oil's heat capacity per volume, and $\Delta T_{Oil\_air}$ is a final difference in temperature between the air and the oil. For example, calculating for a temperature difference of no more than $\Delta T_{Oil\_air}=10°$ degrees as follows $\dot{V}_{Oil}=0.7$ $liter/_{sec}$. For $\Delta T_{Oil\_air}=50°$, $\dot{V}_{Oil}=0.14$ $liter/_{sec}$, and for $\Delta T_{Oil\_air}=100°$, $\dot{V}_{Oil}=0.07$ $liter/_{sec}$.

It is noted that in some embodiments, the heat transfer rate equals the generation power.

In some embodiments, a control system is not used to control the spray pump. In some embodiments, a shaft, or another mechanical or electric wiring without a control system, connects between a main shaft of the Pelton wheel and the spray pump. When the power generation is high, the spray pump operates at a high capacity, and when power generation is low, the spray pump generates a low spray rate.

In some embodiments, a control system is optionally used to control a rate of spray associated with changes in pressure and flowrate at the Pelton wheel.

A parameter for consideration related to oil spray is droplet size and velocity: too small a size and droplet heat-capacity is small, which may lead to a temperature drop and inefficiency. Too large a size may reduce the droplet surface area to volume ratio, and reduce the heat transfer rate.

In some embodiments, changing the droplet diameter is compensated for by changing a rate of droplets provided, $\dot{N}$, to maintain a constant oil volume and/or mass and/or heat capacity rate. For example, oil volume can be expressed as $$\dot{V}_{Oil} = \dot{N} \frac{4}{3} \pi r^3$$

where r is the droplet radius.

Calculating Droplet Size

The droplet size affects a terminal velocity of the droplet, a duration in air of the droplet, and a heat transfer rate from the droplet.

For example, working with an average pressure of 20 Bar, oil at a temperature of 673K and a 10 degree temperature difference of the oil until it returns to the flow, the following value ranges are expected:

| Droplet diameter [m] | Terminal velocity oil | Nu at 400 C. | Heat transfer coefficient | $t = \rho * V* Cp/ (h * A) * Ln (\Delta ti/\Delta Tf)$ | Propagation distance [m] |
|---|---|---|---|---|---|
| 1.00E–04 | 0.04 | 2.45 | 1228.74 | 0.0000601 | 0.00000 |
| 2.50E–04 | 0.45 | 4.25 | 852.68 | 0.0002166 | 0.00010 |
| 5.00E–04 | 0.54 | 5.49 | 550.31 | 0.0006713 | 0.00036 |
| 1.00E–03 | 1.19 | 9.35 | 468.93 | 0.0015756 | 0.00187 |
| 2.00E–03 | 1.78 | 14.73 | 369.39 | 0.0040002 | 0.00714 |
| 3.00E–03 | 2.38 | 20.01 | 334.42 | 0.0066279 | 0.01577 |
| 4.00E–03 | 2.68 | 24.05 | 301.55 | 0.0098005 | 0.02624 |
| 5.00E–03 | 2.68 | 26.65 | 267.34 | 0.0138179 | 0.03700 |
| 1.00E–02 | 2.88 | 38.13 | 191.25 | 0.0386321 | 0.11110 | where "Nu" stands for Nusselt number, and "t" stands for heating time to final temperature.

The propagation distance in the above table is equal to terminal velocity x time to final temperature.

In some embodiments, an approximate size of a chamber, one or more of length, diameter, and width, is optionally selected to be equal to the propagation distance, which is terminal velocity multiplied by time to final temperature.

From the above calculation, it is seen that for a chamber size of a few meters, and under the conditions that the air is maintained at a temperature not less than 20 degrees below the oil temperature, a useful droplet diameter is 5 mm or more, where a droplet having a diameter of 5 mm has a propagation length of 3.7 centimeters before its temperature is reduced by 10 degrees. Accordingly, a droplet that is larger than 1 mm diameter can enable a higher temperature difference.

Nozzle for Mixing Gas with Fluid in a Jet-Like Configuration

In some cases, instead of mixing gas and HTF in chambers, the gas is optionally injected into a nozzle with the HTF flow.

One way of mixing air and fluid can be done as described in "Underwater two phase ramjet engine" (Hezi Varshay, and Alon Gany, U.S. Pat. No. 5,598,700 to Hezi Varshay, and Alon Gany). In that method a motor for boats is proposed where the air is injected in a nozzle, isothermally expands, and the pressure is converted to the kinetic energy of the water.

However, the above propulsion uses water at an ambient temperature.

Example Embodiment of a Jet

In some embodiments described herein, air and *hot* fluid are mixed.

Reference is now made to FIG. 5, which is a simplified illustration of using a nozzle as a heat engine according to an example embodiment.

FIG. 5 shows an example embodiment, where a nozzle 530 suitable for operating at high temperatures, for example, with air and thermal oil at 700° K., can replace a chamber 5 and a chamber 3 as described with reference to FIG. 1E and with reference to additional embodiments, where hot HTF is used to heat compressed air.

Air at ambient temperature, for example at 300K, is optionally compressed in a chamber 502, for example to 40 Bar, and is optionally heated, optionally without expansion, in a chamber 505, for example to a temperature of 700K, reaching a pressure of 93.3 Bar.

Hot thermal oil at 700K flows 521 into the nozzle 530. Air at 700K is injected 522 into the nozzle 530. The air pressure is converted to kinetic energy of the oil as the air expands isothermally. The high-velocity thermal oil optionally drives an engine, such as a turbine 532, producing work. In some embodiments, the engine may be a Pelton wheel, which rotates and is optionally connected to a shaft 526, optionally driving a hydro-pump between two chambers, such as chamber 501 and chamber 502, to produce pressurized air. In some embodiments, the pressurized air is stored in a chamber 506. The above-mentioned processes are similar to the description of FIG. 1D.

Such a design can use, for the heat engine 532, a turbine, a Francis turbine, a Kaplan turbine, a Pelton wheel, a Tesla turbine and similar designs used for hydroelectric turbines.

In some embodiments, oil can be collected in a collection chamber 525, for re-use and/or for separation between the oil and air.

It is noted that air does not need to enter pressurized. A gas may enter not pressurized, and pressure can be generated by heating without expansion, also termed isochoric heating. It may enter not pressurized, and pressure will be generated by heating where expansion is limited, which is close to isochoric heating.

A potential advantage of such a system and method over systems and methods described above is the high output power that can be extracted. Another advantage is a more continuous operation (longer cycles), and no need for large chamber 3 and/or chamber 4 and no need for a large amount of heat transfer fluid. A fully continuous operation method is also described.

Reference is now made to FIG. 6, which is a simplified illustration of an example embodiment heat engine used in an energy generation setting according to an example embodiment.

FIG. 6 shows a closed-loop cycle with a fixed jet configuration, where gas, such as air is injected 622 into a nozzle 630 which receives input of heated HTF 621, forming bubbles, which expand isothermally. HTF jet velocity is enhanced by the gas expansion, and pressure of the heated gas is transformed into kinetic energy of the HTF.

In some embodiments, an engine 632 such as an impulse turbine or a Pelton wheel, is used to convert the HTF velocity into a rotation of a shaft 626 driving a pump 610. The pump 610 optionally pumps fluid such as water into a chamber 602, pressurizing air in the chamber 602. In some embodiments, the pressurized air is stored in a storage chamber 606.

Such a design can use, for the engine 632, a turbine, a Francis turbine, a Kaplan turbine, a Pelton wheel, a Tesla turbine and similar designs used for hydroelectric turbines.

In some cases, the air injected 622 into the nozzle 630 is optionally preheated in a heating chamber 605 to generate isochoric heating of the air in a closed chamber. Optionally the preheating of the air is done with a spray of the HTF or bubbles of gas in the HTF.

In some cases, a valve 607 is used to ensure that the high-pressure gas does not return to the chamber 606.

In some cases, a circulating pump (not shown) returns the HTF after the engine 632 into the nozzle 630, optionally at a desired pressure and velocity.

In some cases, the circulating pump drives the HTF through a heat exchanger 627 for reheating. Optionally the circulating pump replaces the cold HTF with hot HTF from thermal storage.

An Example Rotating Jet-Engine-Like Configuration

In some embodiments, a jet directly rotates a shaft connected to an electric generator and/or to a pump for generating air pressure and compressed air storage.

Reference is now made to FIGS. 7A-7D, which are simplified illustrations of heat engines in a jet-engine-like configuration according to an example embodiment.

Figure 7A:
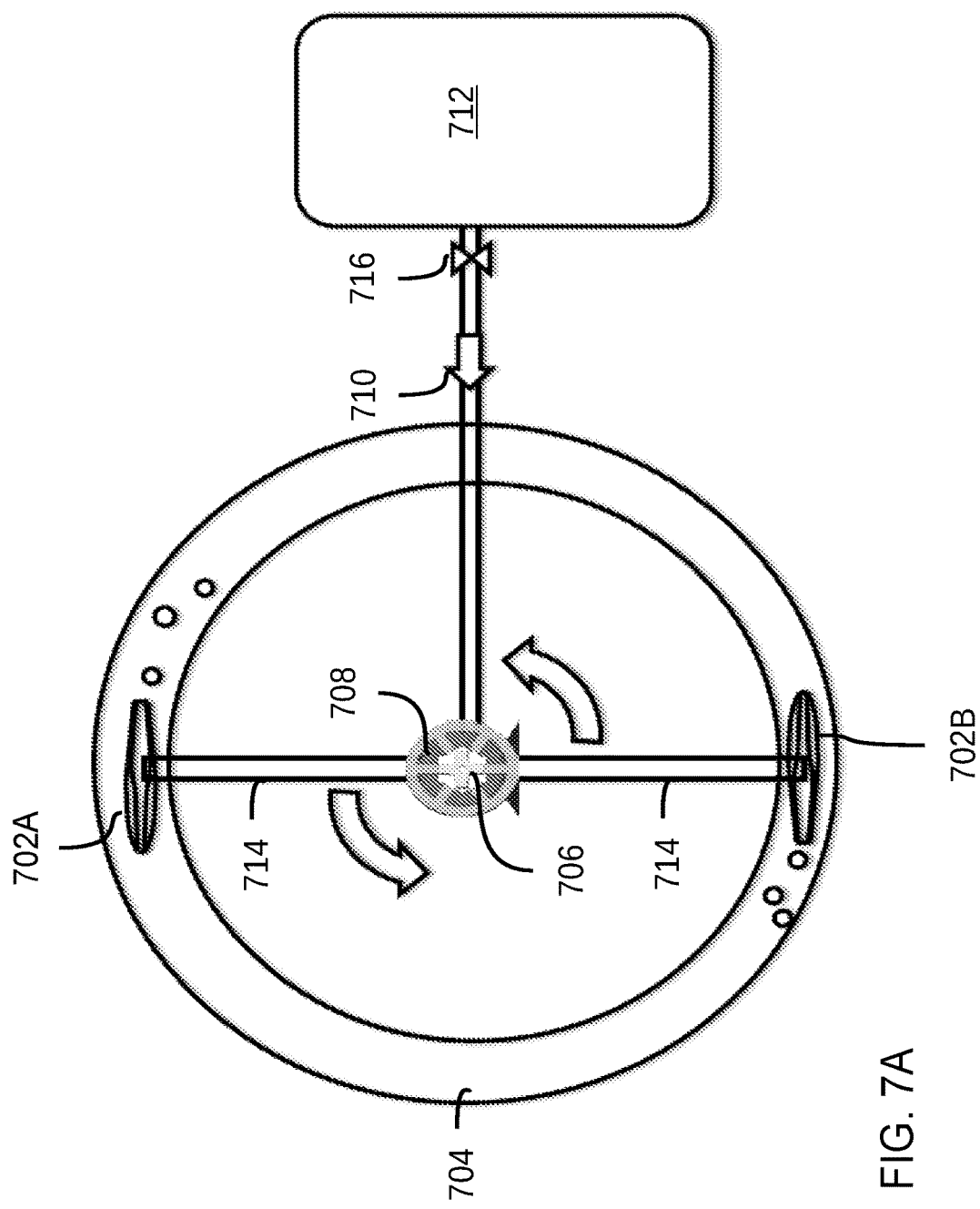

FIG. 7A shows a configuration of two jet nozzles 702A 702B rotating in or above a ring shaped HTF pool 704. A potential advantage of such a configuration is an ability to constantly generate power (in contrast to some closed chamber configurations, where in some embodiments pressure may drop exponentially in a duty cycle).

In various embodiments, one, two, or more nozzles can optionally rotate in or above the ring shaped HTF pool 704, producing a rotation torque transferred to a shaft 706 connected to an electric generator unit 708 or a pump 708. Air is supplied 710 from an air source 712, through a central axis and through arms 714 reaching the nozzles 702A 702B.

In some embodiments, the air expands isothermally in the nozzle(s) 702A 702B, rotating the shaft 706, producing work as electricity and/or mechanical work. By way of a non-limiting example FIG. 7A shows a top view of two nozzles 702A 702B rotating a main shaft 706 connected to an electric generator 708 or a pump 708 or a hydro pump 708.

In various embodiments, any number of nozzles 702 can be connected to generate more power.

In some embodiments, a valve 716 may be used to open and close providing air from the air supply 712 to the nozzles 702A 702B.

It is noted, with reference to FIG. 7A and with reference to FIGS. 8A-C, 9, 10A, 10B, 11 and 14 described below, that the number of arms 714 and nozzles 702A 702B is not limited to two. Any integer number of arms and nozzles is to be understood, and two arms 714 and two nozzles 702A 702B are only a non-limiting example.

It is noted that in some embodiments compressed air from sources and/or chambers such as described with reference to FIGS. 1E, 3, 4A-F, 5 and 6 can be used for providing compressed air to power heat engines as described in FIGS. 7A-D, 8A-C, 9 and 14.

In some embodiments, heat engines as described in FIGS. 7A-D, 8A-C, 9 and 14 are optionally used continuously, being fed with compressed air from sources and/or chambers such as described with reference to FIGS. 1E, 3, 4A-F, 5 and 6. This is in contrast with systems which charge a chamber with compressed air, and when the pressure in the chamber is used up, stopping to recharge the chamber from the above-mentioned sources.

Some non-limiting example operating parameters for the configuration shown in FIG. 7A include:

Example 1: The HTF may be at a high temperature, for example 670K, or in a range from 100 c to 1500 C., and pressurized air may be provided at a pressure of 5 Bar and a high temperature of 670K, or in a range from 100 c to 1500 C.

Example 2: The HTF may be at a high temperature, for example 670K, and pressurized air may be provided at a pressure of 5 Bar and at an ambient temperature. In some embodiments, the air heats when mixed with the heated HTF.

Example 3: The HTF may be at ambient temperature, for example 21 C., and pressurized air may be provided at a pressure of 5 Bar and at the ambient temperature. In some embodiments, the pressurized air may be provided from a source of pressurized air. In some embodiments, the source of pressurized air is used to store energy in a form of pressurized air, as described with reference to FIGS. 1E, 3, 4A-4B, 5 and 6, and the configuration of FIG. 7A is used to produce energy, for example in form of electricity.

The configuration of FIG. 7A may provide one or more of the following benefits:

There is no need to use an HTF pump to continuously provide HTF to the nozzles 702A 702B. When the nozzles are in operation, centrifugal force conveys HTF along the arms 714 to the nozzles 702A 702B, and suction from the HTF being conveyed to the nozzles sucks HTF from the HTF pool 704.

Operation of the nozzles may optionally be started by providing heated HTF to inputs of the nozzles, even by a manual pump, or by a starter pump which does not need to be used once the arms are rotating.

In some embodiments, providing compressed air to the nozzle may start the rotation.

It is noted that when the arms 714 of the configuration of FIG. 7A rotate, HTF flowing along the arms 714 toward the nozzles 702A 702B is accelerated along the arms 714, producing a suction force that, in some embodiments, can serve to suck the HTF from the HTF pool 704 toward the nozzles 702A 702B.

The pressure profile along the radial arms 714 supplying the HTF to the nozzles 792A 702B increases along the arms 714.

In some embodiments, compressed gas is injected into the HTF at a location along the arms 714.

In some embodiments, flow of the HTF along the arms may produce suction which can suck the gas into the arm. Adding the pressure of the pressurized gas to the sucking action of the flowing HTF produces a specific pressure at the injection location.

In some embodiments, the injection location is selected so that the HTF-and-gas flow outward along the arms 714, producing suction to suck HTF from the HTF pool 704 into the arms 714.

In some embodiments, the injection location is selected so that the flow of the HTF drags the gas bubbles toward nozzles 702A and 702B.

A pressure profile in the radial arms 714, supplying the HTF to the nozzles 702A 702B increases along the radial arm—the further from the center of rotation, the greater the pressure.

In some embodiments, injecting air into the HTF along the radial arms 714 at an air temperature lower than the HTF temperature results in heating the air along with increasing the pressure. The HTF, being a fluid, is not compressible, and arrests the air expansion, resulting in isochoric heating of the air along with the flow of the HTF toward the nozzles 702A 702B.

In some embodiments, air bubbles can reach the nozzles 702A 702B at a same or smaller size as when injected into the arms 714.

In some embodiments, air bubbles can reach the nozzles 702A 702B at a same temperature as the HTF.

It is noted that when the arms 714 rotate, centrifugal force is exerted on the HTF. Since fluid is usually denser than gas, even than compressed gas, the HTF is pushed away from the axis of rotation, and the bubbles, according to the Archimedes principle, are pushed toward the axis of rotation.

In some embodiments, for the bubbles to reach the nozzles, a drag force exerted by the HTF on the air bubbles dragging the bubbles along with the HTF flow is made to be stronger than the Archimedes force pushing the bubbles opposite the HTF flow.

In some embodiments, when air bubbles next to the nozzles 702A 702B the bubble size may be smaller than when injected into the arms, and the Archimedes force may be lower than at the injection location.

The following parameters may typically interact in an embodiment such as illustrated by FIG. 7A:
centrifugal force dependent on distance along the arms and rate of rotation;
gas pressure of the bubbles;
rotational rate of the arms;
radial flow velocity of the HTF;
a drag coefficient of the HTF dragging the bubbles along with its flow;
a bubble size, which affect the drag coefficient;
a bubble air mass, which together with the bubble air pressure affect the bubble size;
a radial distance from center of rotation to the gas injection location; and
a radial location of the nozzles.

A non-limiting calculation example is described below:

The example describes injecting air into HTF at a radial distance $r_1$ from an axis of rotation, termed herein location 1, while the nozzle is at a radial distance $r_2$, where $r_2 = \sqrt{2} * r_1$, termed herein location 2.

Taking a pressure of the gas bubbles to be $P_2$ at the nozzle and $P_1$ at the injection location, $P_2=2*P_1$ due to the centrifugal force being $F=m\omega^2 r$.

Assuming the temperature of the air is doubled during the flow between $r_1$ and $r_2$, the bubble volume is maintained unchanged, which corresponds to the bubbles having undergone isochoric heating; $V_{bubble\_2}=V_{bubble\_1}$.

The drag force is $F_D=1/2\rho\vartheta^2 C_D A$, where, $\rho$ is density of the HTF, $\vartheta$ is a velocity of a bubble relative to the HTF velocity $U_{HTF}$, $C_D$ is the drag coefficient, and A is the bubble diameter.

The centrifugal force which acts on the HTF, is $F_{cent}=m\omega^2 r$, and the Archimedes principle says that the force acts in an opposite direction on the bubble to push the bubble toward the axis of rotation, where m is a mass of HTF displaced due to the bubble, and w is the rotation velocity. In case of the present non-limiting example where $r_2=\sqrt{2}*r_1$, the relation between centrifugal force at the nozzle, at location 2, and the centrifugal force at the injection location 1, is $F_{cent\_r2}=\sqrt{2}F_{cent\_r1}$.

In some embodiments, the drag force with which the HTF drags the bubble is made to be larger than the centrifugal force, for the bubble to flow in the radial direction with positive velocity.

$F_{cent\_r2}<F_{D\_r2}$, which is made to be true for all value of r between $r_1$ and $r_2$, including where $r=r_2$.

The following relation is found between the bubble size, the velocity of the HTF, and additional system parameters:

$$U_{HTF} > \sqrt{\frac{D_{bubble}*R*\omega^2}{3C_D}}$$

In some embodiments, an HTF flow rate value lower than the above $U_{HTF}$ is used, for example 50% of $U_{HTF}$, which still allows the bubbles to reach the nozzles, and also the bubbles slow down along the way.

In some embodiments, the gas pressure increases along with the radial flow of the HTF, compressing the air along with the flow, which can potentially reduce or eliminate need for initial compression of the injected air used in such an embodiment. Using the radial flow to compress the air can reduce initial pressure of compressed air, which may potentially simplify the system and/or increase energy efficiency. In some embodiments, uncompressed gas is added to HTF, and the uncompressed gas is compressed as the HTF flows along with the HTF into a location of higher pressure, such as, by way of a non-limiting example, adding gas to a rotating arm 714, and allowing the rotation to pressurize the gas as it flows outward along the rotating arm.

Control

Control of heat engines as described herein is optionally provided by controlling some input parameters.

In some embodiments, rotation speed of such a heat engine is optionally performed by controlling pressure of incoming gas, optionally by controlling a valve which controls the pressure and/or flow rate of the incoming gas.

In some embodiments, rotation speed of such a heat engine is optionally performed by controlling a rate of incoming HTF.

In some embodiments, rotation speed of such a heat engine is optionally performed by controlling size and/or shape of an adjustable nozzle.

In some embodiments, the controlling is optionally performed in order to increase efficiency of an energy production system using a heat engine as described herein.

In some embodiments, the controlling is optionally performed in order to increase efficiency of an energy production system, wherein the efficiency is calculated as described elsewhere herein.

Isochoric or Quasi Isochoric Heating

Some embodiments of isochoric heating are described herein. However, in some embodiments, a quasi-isochoric heating process is applied, even if quasi isochoric heating may not be as efficient as isochoric heating. An example embodiment using a quasi-isochoric heating process may include a heating of gas where some expansion occurs during the heating, followed by compression of the gas. In all, the gas has been heated, and the gas final volume is kept approximately the same, so a result of the process is same-volume or approximately same-volume, and hotter gas, similar to isochoric heating The above process can be realized in a flow where the pressure increases, which may lead to heating the gas, which may lead to gas expansion, later to be compressed, finally reaching the same pressure, volume and temperature as in isochoric heating.

In an example embodiment, a process includes isobaric-heating of gas while the gas expands, followed by adiabatic compression, for example in a pipe such as the rotating arms 714.

In some embodiments, quasi-isochoric heating is achieved along a rotating pipe, such as, for example, the arms 714, where centrifugal forces generate increased pressure to fluid and gas mixture flow.

FIGS. 7B, 7C and 7D show side cross-sectional views of three example embodiment configurations of a nozzle in relation to a pool of HTF 724 734 744.

FIGS. 7B, 7C and 7D show nozzles 722 732 742 mounted on mounts 721 731 741. In the non-limiting example of FIGS. 7B, 7C and 7D, the mounts include a pressurized air feed.

FIGS. 7B, 7C and 7D show the nozzles 722 732 742 providing forward impetus 726 736 746, which can be used to rotate the shaft 706 of FIG. 7A, producing work.

FIGS. 7B and 7C show the nozzles 722 732 with a heated HTF feed 723 733 into a front of the nozzles. In the embodiments of FIGS. 7B and 7C, the HTF fed into the nozzles 722 732 is at a desired temperature for feeding into the nozzle 742. In some embodiments as shown by FIGS. 7B and 7C, the HTF in the HTF pool 724 734 may not be heated, and the HTF may be heated when provided to the nozzles 722 732. In some embodiments as shown by FIGS. 7B and 7C, the HTF in the HTF pool 724 734 may be heated to the desired temperature.

FIG. 7D shows the nozzle 742 travelling inside the pool of HTF 744. In the embodiment of FIG. 7D, the HTF in the HTF pool 744 is at a desired temperature for feeding into the nozzle 742. In some embodiments, the HTF in the HTF pool 744 is heated to the desired temperature. FIG. 7B shows a nozzle configuration where a nozzle 722 travels above the pool of HTF 704.

FIG. 7C shows a nozzle configuration where a nozzle 732 is skimming a surface of the pool of HTF 704.

FIG. 7D shows a nozzle configuration where a nozzle 742 is immersed within the pool of HTF 704.

FIGS. 7C and 7D show the nozzles 732 742 with HTF flowing out 734 744 directly into the HTF pool 704. FIG. 7B shows the nozzle 722 expelling HTF 724 in air, and the expelled HTF 724 falling into the HTF pool 704.

In some embodiments, fins 735 745 or baffles 735 745 are placed in the HTF pool, to rotate flow coming out 734 of the nozzles 732 742 in a similar way to flow in a Pelton turbine's cup. Such fins potentially increase efficiency by reducing velocity of the HTF in the HTF pool 704, potentially providing resistance to the flow out 734 744 of the HTF from the nozzles 732 742, and potentially increasing forward impetus 736 746 provided by the nozzles 732 742. In some embodiments, the fins 735 745 are optionally designed to break flow lines 737 747 mix flow of the HTF, for eliminating circular flow of HTF in the pool. Eliminating such flow in the pool potentially reduces drag of the nozzle 742 which operates within the HTF pool 744.

In some embodiments, HTF in the HTF pool is, for example, oil at 670K, molten salt or other fluid, at high temperature, and ambient pressure. In some embodiments, the HTF is replaced or re-heated when the temperature drops below a specific temperature.

In such nozzles, increasing air flow increases power.

In some embodiments, such as shown in FIG. 7D, a velocity of the nozzles in the HTF pool is between 10 to 50 meters per second. Increasing the velocity of the nozzles increases the power until drag limits efficiency.

In some embodiments, initial pressure of injected air 721 is 2 bars or higher, optionally higher than 10 Bar, 20 Bar, or than 40 Bar. One parameter which is relevant for the nozzle engine is airflow in grams per second. Typical values are between 20 and 40 grams per second for a 2 kW power engine. Increasing the airflow increases the thrust (power). A 20 kW engine can be implemented by injecting 400 grams per second of air supply into a single nozzle rotating at 20 meters per second velocity. The airflow rate in the nozzle is typically less than 0.3% of mass of the HTF, and after decompression, the air typically has a volume no larger than 70% of the volume of the air plus HTF. It is noted that increasing an inlet area increases the thrust of the nozzle.

A potential problem with a configuration such as shown in FIG. 7D, where the nozzle is immersed in the HTF is drag, that can reduce the engine efficiency by 50%. In some embodiments, the drag is optionally be lowered by reducing the rotation velocity.

In some embodiments, the drag is reduced by placing the nozzle mostly outside the HTF level and only the outlet nozzle touches the HTF level, as shown in FIG. 7C. When the nozzle is outside the HTF, an inlet of the nozzle is connected to a pipe that supplies the HTF, and in addition the nozzle also has a pipe supplying air.

In some embodiments, the air supply and/or HTF supply pipes are connected to the nozzles along or through a bar connecting to an axis of rotational symmetry of the nozzle engines.

Shaping Flow Direction

In some embodiments, a shape of flow direction of a rotating arm, such as the rotating arm 714 shown in FIG. 7A is optionally not straight.

In some embodiments, centrifugal and/or Coriolis forces are optionally taken into account when determining a shape of a rotating horizontal pipe.

Some considerations which are taken into account include:

Preventing cavitation in the gas-and-fluid mixture;

The HTF detaching from the pipe walls because of forces exerted upon the HTF;

Friction losses caused by fluid friction with the pipe walls; and

Maintaining the gas-and-fluid mixture, and/or preventing gas bubbles from growing and separating the gas from the fluid, and/or preventing gas bubbles from traveling a different direction than the fluid.

In some embodiments, the pipe shape is similar to a path of a ball tossed in a radial direction outward from a center of a rotating carousel toward an edge of the carousel.

In some embodiments, the pipe shape is designed to reduce radial velocity of the gas-and-fluid mixture, which in some embodiments even reaches a flow that is purely tangential at a circumferential end of the pipe.

We note that when the gas-and-fluid mixture flows in a tangential direction when reaching a nozzle end of the pipe, gas bubbles may "float" in a direction opposite a direction of the centrifugal force, or tangentially to the HTF flow, which may potentially separate the gas from the HTF, which may potentially reduce efficiency of the engine. In some embodiments, to eliminate potential separation of gas from fluid, fins are optionally added inside the pipe, arranged to rotate the flow along the direction of flow. By doing this gas bubbles are optionally maintained in a homogeneous mixture with the HTF.

Figure 8A:
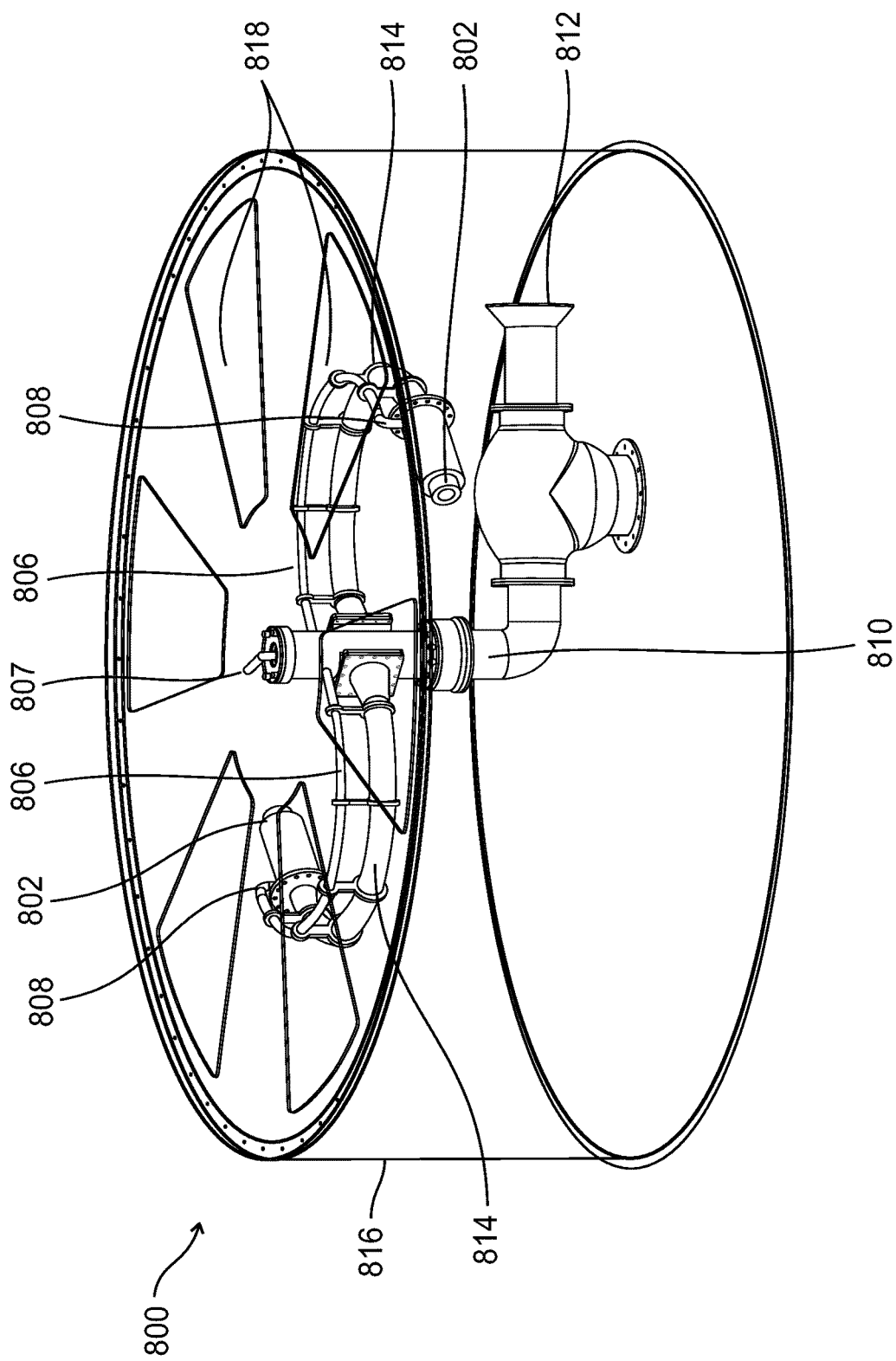
FIG. 8A is a simplified illustration of apparatus in a multiple-jet-engine-like configuration according to an example embodiment.

Reference is now made to FIG. 8A, which is a simplified illustration of apparatus in a multiple-jet-engine-like configuration according to an example embodiment.

FIG. 8A shows a reaction device 800, having two nozzles 802 and two curved, or S-shaped, arms 814. FIG. 8A also shows a gas or air input 807, leading air or gas into pipes 806 which provide the air or gas to mixing chambers 808.

The curved arms 814 receive fluid input through a fluid intake 812 in a tank or container 816. The curved arms 814 rotate on a bearing 810.

In some embodiments, the curved arms 814 are optionally designed and/or shaped to reduce radial velocity of the gas-and-fluid mixture, which in some embodiments even reaches a flow that is purely tangential at the nozzle 802.

In some embodiments, the curved arms 814 are optionally designed and/or shaped to reduce and/or eliminate cavitation during mixing and/or flow of the gas-and-fluid mixture.

In some embodiments, vents 818 may optionally be provided in the tank or container 816. The vents 818 may be used to lead heated gas from the container 816 to serve as a heat source for an optional additional or second heat engine (not shown) for harvesting energy from residual heat from the heat engine of FIG. 8A.

In some embodiments, the second heat engine is optionally of a same type as the heat engine of FIG. 8A, optionally operating at different temperature and/or pressure settings.

Figure 8C:
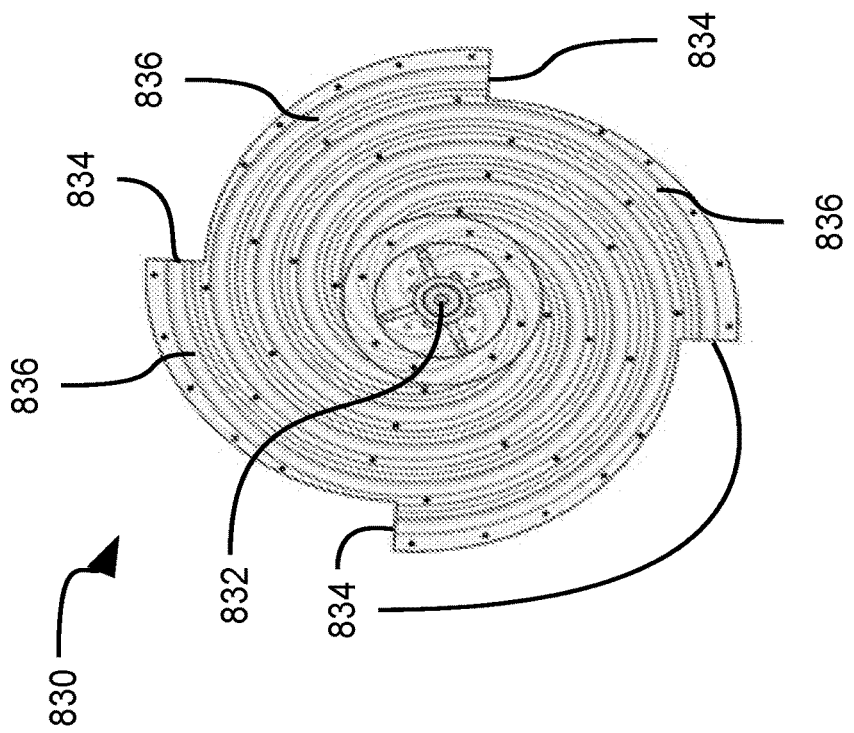
FIGS. 8B and 8C are simplified illustrations of reaction devices according to an example embodiment.
Figure 8B:
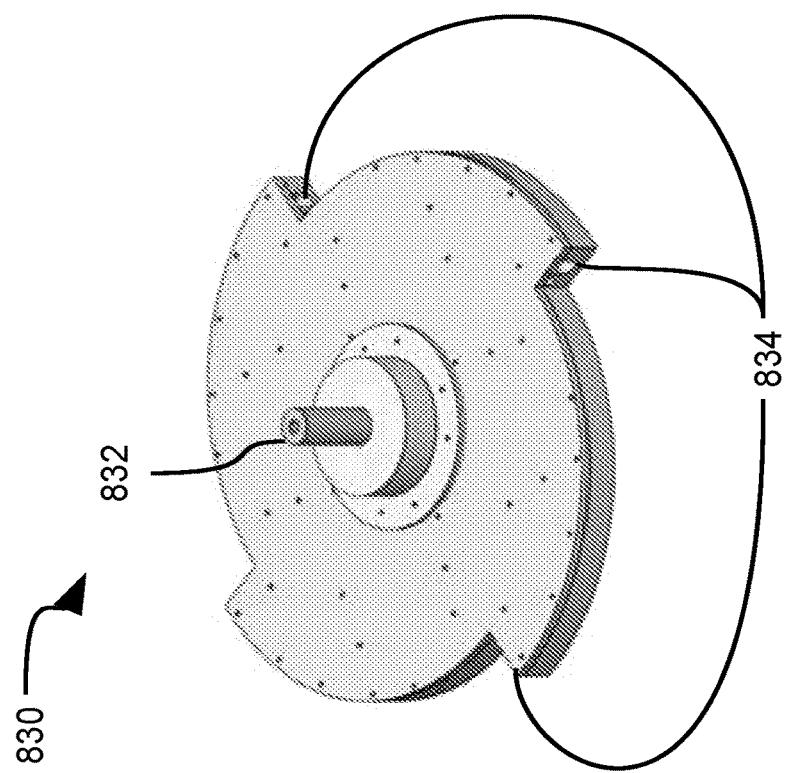

Reference is now made to FIGS. 8B and 8C, which are simplified illustrations of reaction devices according to an example embodiment.

FIG. 8B is an isometric view, and FIG. 8C is a cross-sectional view from above.

FIGS. 8B and 8C show an embodiment of a rotor 830 with four nozzles 834. The rotor 830 includes an entry port 832 for air, an entry port for HTF (not shown), and cross-sectional FIG. 8C also shows spiral flow paths for gas-and-fluid mixture from a center of the rotor 830 to the nozzles 834.

Combined Reaction and Impulse Engine

A reaction nozzle as shown in FIGS. 7A-D (the nozzle is accelerated by reaction to ejected gas-and-fluid) and impulse turbines such as shown in FIGS. 5 and 6 can optionally, potentially enhancing efficiency. The gas-and-fluid jet emerging from the nozzle shown in FIGS. 7A-D may not be at zero velocity compared to the world, implying that there is residual energy in the gas-and-fluid jet which may be harvested.

In some embodiments, an additional impulse engine, such as a Pelton wheel as shown in FIG. 5 or 6 may be used to convert this residual kinetic energy into work or electricity.

In some embodiments, an implementation of such a secondary impulse engine or Pelton wheel may be a ring around the reaction nozzles, also capable of rotation, and being rotated by the ejected gas-and-fluid mixture. In some embodiments, the ring may optionally having a same center of rotation as the arms of the reaction turbine.

Figure 9:
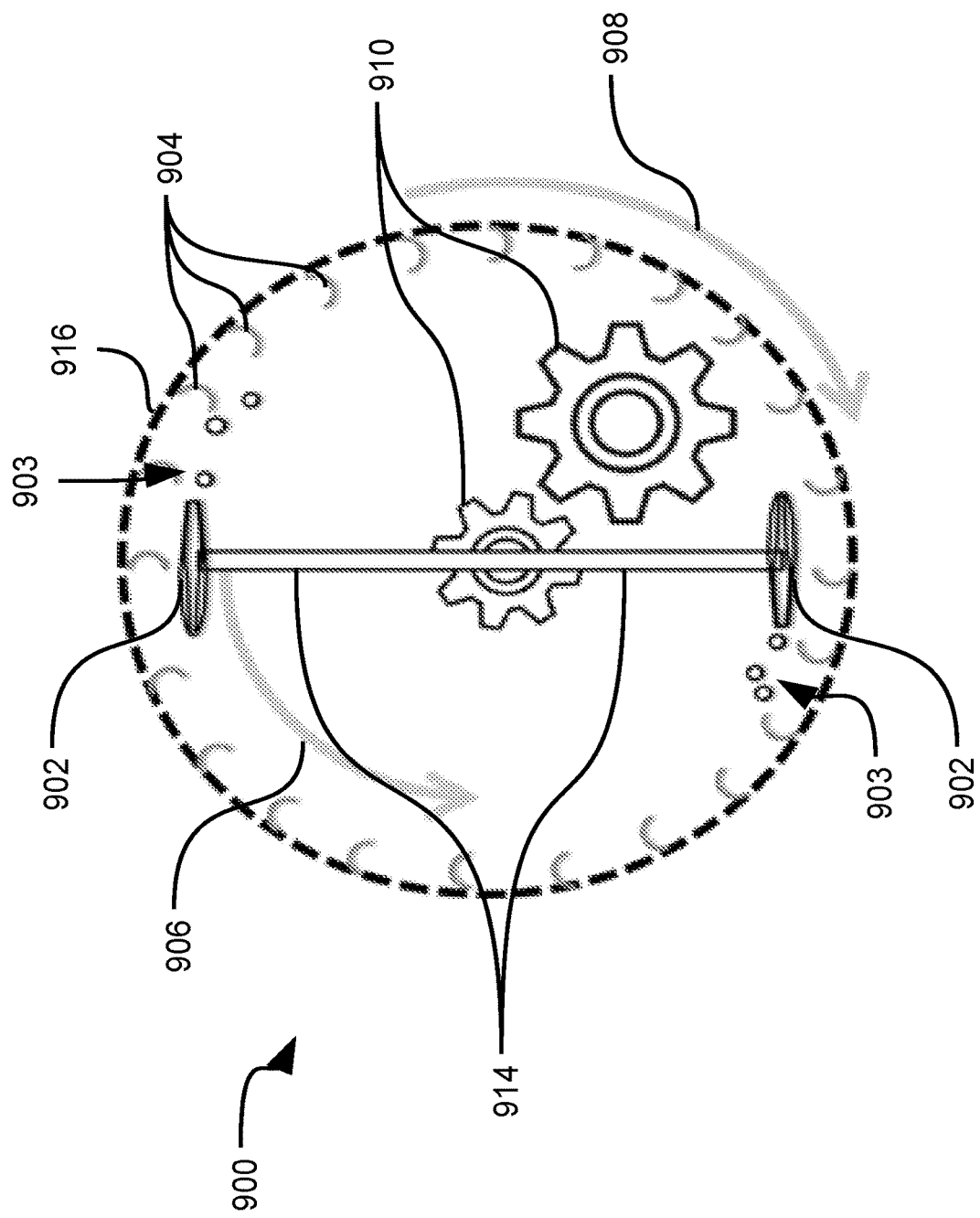
FIG. 9 is a simplified illustration of a heat engine turbine in a combined reaction and impulse configuration according to an example embodiment.

Reference is now made to FIG. 9, which is a simplified illustration of a heat engine in a combined reaction and impulse configuration according to an example embodiment.

FIG. 9 is a top view of a heat engine 900, showing two reaction nozzles 902, mounted on two rotating arms 914, rotating in a first direction 906, ejecting a gas-and-fluid mixture 903. FIG. 9 also shows a ring 916 and fins or cups 904 capturing the ejected gas-and-fluid mixture 903, slowing velocity of the ejected gas-and-fluid mixture 903, potentially even slowing the velocity of the ejected gas-and-fluid mixture 903 to zero, and rotating the ring 916 in a second direction 908, opposite the first direction 906.

In some embodiments, the rotating arms 914 provide rotation motion to produce work or electricity to one energy harvester (not shown), and the rotation ring 916 provides rotation motion to produce work or electricity to another energy harvester (not shown).

In some embodiments, the rotating arms 914 and the rotation ring 916 are mechanically connected to provide rotation motion to produce work or electricity to an energy harvester (not shown).

FIG. 9 shows optional gears 910 connecting the rotating arms 914 and the rotation ring 916, to provide their rotation motion to produce work or electricity.

In some embodiments, the ring rotates at half the rotation speed of the rotating arms. Such embodiments may provide optimal efficiency in capturing the rotation motion to produce work or electricity.

In some embodiments, the outer ring may optionally include fins in a form similar to a Tesla turbine, which can potentially resist cavitation. Instead of the cups, a dense array of fins, blades or plates is placed along the ring. The ejected gas-and-fluid jet optionally flows between the blades, and rotates the ring by viscosity and/or adhesion forces.

An HTF engine as described herein potentially has an excellent efficiency at low temperatures, which is potentially very suitable for harvesting power from waste heat.

By way of a non-limiting example, the HTF engine, may potentially be as a combined (secondary) cycle to a conventional power generator such as a gas turbine, using its waste heat, the combination thereby increasing the total power harvested.

By way of a non-limiting example, exhaust gases from a power generator, which may run on, for example, petrol, hydrogen, gas or diesel, are at temperatures above 300 C., suitable for use in an HTF engine as described herein, with an efficiency above 30%.

Using clean air as the compressed gas in the heat engine as described herein may limit a maximal operation temperature of thermal oil optionally used as HTF to below 300 C., to avoid self-ignition of the thermal oil HTF and the clean air. This may limit the engine efficiency. Exhaust gases may have a low oxygen content.

In some embodiments, exhaust gases are optionally used for one or more of heating and as compressed gas is may improve efficiency.

In some embodiments, the exhaust gases heat the oil HTF, thereby losing heat and cooling, then are compressed by a compressor. Optionally, exhaust gases are compressed adiabatically, increasing their temperature again, and the increased temperature may potentially increases the HTF temperature and the efficiency of the expansion.

In some embodiments, the compressor optionally mixes the gasses with the water, and the water extracts the heat caused by the compression, maintaining the temperature of the gasses equalized with the temperature of the water, making the compression in presence of the water an isothermal compression.

A poor oxygen content in exhaust gasses potentially enables using oil while avoiding self-ignition at high temperatures, such as 300 C., 350 C., or 400 C., potentially depending on oxygen concentration in the exhaust gas.

It is noted that the heat engines, or nozzles, or turbines described in FIGS. 5, 6, 7, 8A-C, 9 and 10 can also operate at ambient temperature, converting gas or air pressure to kinetic energy through isothermal expansion of the gas or air. Such conversion is potentially useful in converting stored energy in the form of pressured air, to work in a continuous process.

Isothermal Continuous Gas Compression

An embodiment described below provides isothermal or quasi-isothermal continuous gas compression. Such an embodiment can potentially removes a need for a compressed air chamber. Some embodiments of isothermal gas compression are described herein.

However, in some embodiments, a quasi-isothermal compression process is applied. An example embodiment using a quasi-isothermal compression process may include a mixing of colder gas and hotter fluid, where heating of gas by the fluid occurs, followed by additional compression of the gas. In all, the gas has equalized its temperature with the fluid, and then been further compressed by fluid pressure, and the gas final pressure is higher than achieved by, for example isochoric heating, and potentially closer to isothermal compression.

Reference is now made to FIG. 10A, which is a simplified illustration of a device for continuous isothermal gas compression according to an example embodiment.

FIG. 10A shows a device 1000 which includes a tank or container 1002, divided by a divider 1005 into a lower portion 1004 and an upper portion 1006.

One or more nozzles 1016 are mounted on arms 1014. The arms 1014 are designed to rotate, similarly to the arms shown is FIGS. 7A-D, 8A-C and 9.

When the arms 1014 and nozzles 1016 rotate, optionally rotated by a mechanical shaft or an electric motor (not shown), centrifugal force acts upon fluid in the arms, forcing the fluid toward the nozzles 1016 and out 1022 of the nozzles 1016. The movement of the fluid causes suction 1024, sucking more fluid 1010 from the lower portion 1004. As the arms rotate, fluid 1010 is sucked or pumped into the upper portion 1006. With the addition of fluid 1010 into the upper portion 1006, the air or gas is compressed, raising pressure in the upper portion of the container 1002.

The compressed gas or air may be used, for example by drawing through a pipe 1028, which may or may not include a pressure valve thereon.

In some embodiments, additional gas or air for continuous compression may be provided through a one-way valve to the upper portion 1006 (not shown) enabling gas or air to enter the upper portion 1006.

In some embodiments, additional gas or air for continuous compression may be provided 1018 through a pipe 1020 to the rotating arms 1014. The rotation of the arms 1014 and ejection 1022 of fluid from the nozzles 1016 optionally sucks in the additional gas or air, and the centrifugal force cause compress of the incoming gas or air even while in the arms 1014.

Providing the gas or air into the fluid in the rotating arms potentially increase the force by which a compressed-gas-and-fluid mixture are ejected 1022 from the nozzles 1016. Increasing the force by which the compressed-gas-and-fluid mixture are ejected 1022 from the nozzles 1016 potentially reduces the force need to rotate the arms 1014, potentially resulting in increasing the energy efficiency of the device 1000 by requiring less force for the same or more compression pressure.

In some embodiments, a float valve 1008 enables fluid accumulating in the top portion 1006 to flow back into the bottom portion 1004, so as not to accumulate in the top portion 1006, and without allowing compressed gas to be released.

In some embodiments, the lower portion 1004 is at ambient pressure. FIG. 10A shows an optional opening 1012 which enable equalizing pressure between the lower portion 1004 and outside the container 1002.

In some embodiments, a motor or mechanical shaft (not shown) rotates the arms 1014 and nozzles 1016, inducing centrifugal forces which suck the fluid 1010. At the upper level of a vertical (axial) pipe 1026, pressure is below ambient pressure, which enables gas at ambient pressure to enter the pipe at an optionally controlled rate. In some embodiments, gas flow rate is controlled to be sufficiently small compared to the fluid flow rate to maintain gas discontinuity in the rotating arms 1014 to maintain the centrifugal pressure of the liquid. The pressure increases with the radial distance from the center of rotation.

In some embodiments, the fluid 1010 flow rate is optionally higher than 20% of the gas flow rate. The centrifugal forces compress the gas, while the fluid temperature optionally equalizes with the gas temperature. The fluid typically has a much higher heat capacity than the gas, so the gas is brought to the temperature of the fluid.

In some embodiments, the fluid is hotter than the gas or air, causing an increase in pressure of the gas or air via the increase temperature.

The rotating velocity and the distance of the nozzles 1016 from the center add to the output pressure of the gas from the nozzle by virtue of centrifugal force.

The compressed air is collected in the upper portion 1006 of the container 1002, and potentially exits through the pressure valve continuously, while the fluid return to the lower portion 1004 through the float valve 1008 to be sucked back again into the nozzles 1014.

In some embodiments, such a device can be shaft connected to heat engines such as shown in FIGS. 7A-D, 8A-C and 9 for supplying compressed gas, such that some of the energy produce by the heat engine can power compression of gas or air for the heat engine.

A similar configuration can be realized where a compressed air chamber is attached to each one of the nozzles, and compressed gas or air is drawn from the compressed air chamber(s).

Reference is now made to FIG. 10B, which is a simplified illustration of a device for continuous isothermal gas compression according to an example embodiment.

FIG. 10B is an example embodiment variant of the example embodiment of FIG. 10A.

FIG. 10B shows a device 1040 which includes a tank or container 1042, in which one or more engines or nozzles 1056 are mounted on arms 1044. The arms 1044 are designed to rotate, similarly to the arms or rotors shown is FIGS. 7A-D, 8A-C, 9 and 10A.

When the arms 1044 and nozzles 1056 rotate, optionally rotated by a mechanical shaft or an electric motor (not shown), centrifugal force acts upon fluid in the arms, forcing the fluid toward the nozzles 1056 and out 1062 of the nozzles 1056. The movement of the fluid causes suction 1060 1064, sucking fluid 1050 from the container 1042. As the arms rotate, fluid 1050 is sucked or pumped into the arms 1044, and gas or air 1060 is also sucked into the arms 1044. The air or gas 1060 is compressed, raising pressure in pressure chambers 1057 mounted at exits of the nozzles 1056.

The compressed gas or air in the pressure chambers 1057 may be used, for example, by drawing through a pipe 1064 leading from the pressure chamber 1057 and providing 1070 compressed gas or air at an exit of the device 1040, which may or may not include a pressure valve thereon.

In some embodiments, a valve 1058 enables fluid accumulating in the pressure chamber 1057 to flow back into the container 1042, so as not to accumulate in the pressure chamber 1057. In some embodiments, the container 1042 is at ambient pressure. FIG. 10B shows an optional opening 1052 which enables the container 1042 to equalize pressure with outside the container 1042.

FIGS. 7A-D, 8A-C and 9 have shown heat engines optionally receiving inputs of compressed gas or air. FIGS. 10A and 10B have shown compressed air generators.

The heat engines and compressed air generators may be combined.

Reference is now made to FIG. 11, which is a simplified illustration of an energy production system using a combination of heat engines and compressed air generators according to an example embodiment.

FIG. 11 shows a system 1100 which includes a compressed air generator 1102 and a heat engine 1104.

The compressed air generator 1102 of FIG. 11 includes a first container 1106 containing one or more nozzles 1108 on rotating arms 1110, sucking up 1112 fluid 1114 from the first container 1106, sucking in 1116 gas or air, and ejecting 1118 a gas-and-fluid mixture into the first container 1106. The process produces an increase in pressure in the first container 1106.

Compressed gas flows through a connecting pipe 1120 from the compressed air generator 1102 to the heat engine 1104.

In some embodiments, an optional pressure valve 1122 maintains a specific pressure in the first container 1106 and for the gas supply to the heat engine 1104.

The heat engine 1104 includes a second container 1124 containing one or more nozzles 1126 on rotating arms 1128. When the arms 1128 rotate, the heat engine sucks up 1130 fluid 1132 from the second container 1124, and receives compressed gas or air via the pipe 1120, into the arms 1128. The rotation ejects 1134 a gas-and-fluid mixture through the nozzles 1126, producing a reaction which rotates the arms 1128, producing work or energy.

In some embodiments, the heat engine 1104 provides power to the compressed air generator 1102 via, by way of a non-limiting example, a mechanical link such as a chain 1136. In some embodiments, the mechanical link may include one or more shafts, or gears.

In some embodiments, the heat engine 1104 is optionally vented 1138, so as not to rise in pressure during operation of the heat engine 1104.

In some embodiments, a potentially continuous operation heat engine with heat retrieval is provided. A gas, such as air, nitrogen or exhaust gas, is optionally continuously compressed isothermally at room temperature.

In some embodiments, the gas is optionally isochorically heated before entering an isothermal expansion system turbine acting as a heat engine.

In some embodiments, the gas is injected at room temperature, and then isochorically heated along with the flow in the horizontally rotating pipe by the centrifugal forces.

In some embodiments, the gas isothermal expansion in the nozzle rotates both the isothermal compression unit and an electric motor. The gas exits at high temperature and ambient pressure from the nozzle.

In some embodiments, a heat exchanger optionally extracts the heat for the isochoric heating of cold air input. Optionally, the heat heats the cold air while the gas expands, followed by gas compression by the centrifugal forces of the rotating HTF.

In some embodiments, quasi-isochoric compression may be used, for example, isobaric heating of the cold air is performed, followed by adiabatic compression by the centrifugal forces of the HTF, which may be less efficient than isochoric heating.

In some embodiments, two coupled systems such as shown in FIGS. 10A-B, 11 and 12 are optionally used for continuous charging of a pressure battery and/or continuous discharging of a pressure battery.

In some embodiments, electricity drives a gas compression unit, such as shown in FIGS. 10A-B and 11.

In some embodiments, heat drives a heat engine such as described herein, for example the heat engine 1104 of FIG. 11, for continuous isothermal compression of gas or air for a pressure tank. The pressurized gas or air is optionally later used for continuous discharge in a continuous isothermal expansion unit to produce energy using a heat engine such as the heat engine 1104 of FIG. 11.

In some embodiments, the isothermal expansion of the gas can be done at ambient temperature, optionally mixing with water, for converting the pressure to electricity.

In some embodiments, the water is heated, and the heated water increases the expansion and the amount of extracted energy, for example in the form of electricity.

In some embodiments, high-temperature HTF is optionally used for generating electricity from both the pressure and the heat in a continuous mode.

Figure 12A:
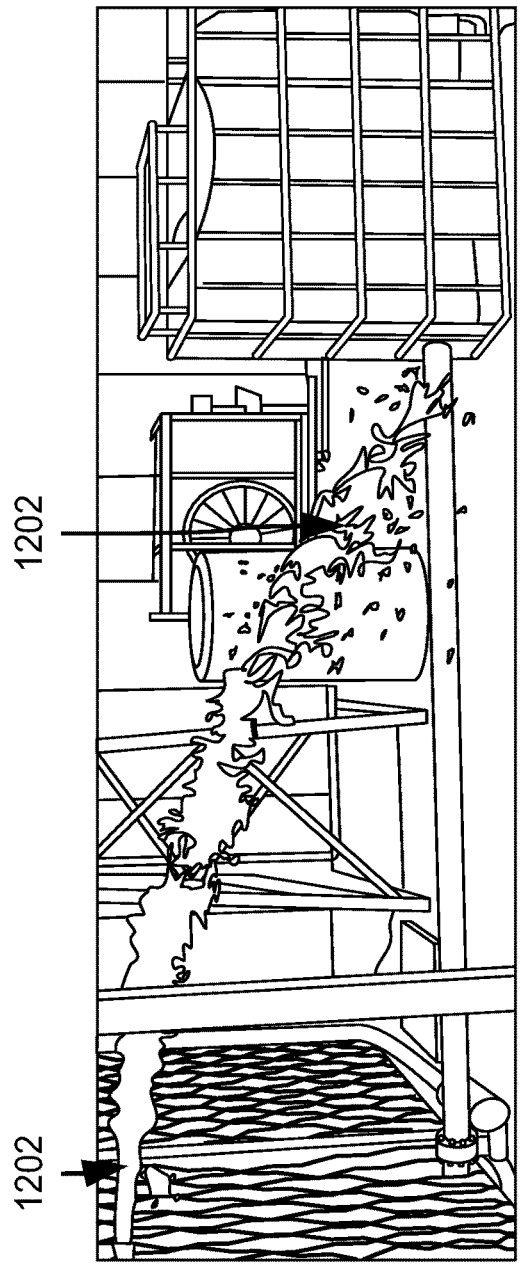
FIGS. 12A and 12B are photographs of water jets with and without added air or gas, according to an example embodiment.
Figure 12B:
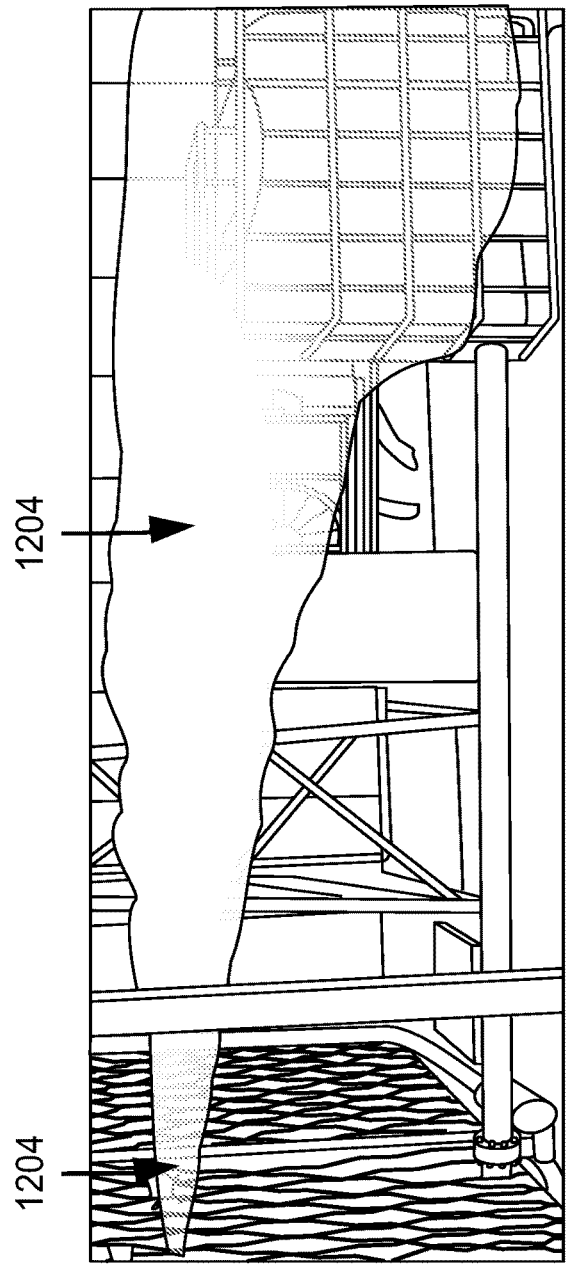

Reference is now made to FIGS. 12A and 12B, which are photographs of water jets with and without added air or gas, according to an example embodiment.

FIG. 12B shows how air pressure is converted to kinetic energy.

An efficiency of the process of extracting energy from a mix of air or gas and water is calculated as a ratio between additional energy in the water jet emerging from a nozzle and the isothermal energy of the compressed air. The calculation compares values at entrance to the experimental setup and values at exit from a nozzle, as follows:

$$\eta = \frac{\frac{1}{2}\dot{V}_w \rho_w (u_{out}^2 - u_{in}^2) + \dot{V}_w(P_{out} - P_{in})}{P_a \dot{V}_a \ln\left(\frac{P_a}{P_{out}}\right)}$$

where values marked with "in" subscript are values at entrance, values marked with "out" subscript are values at exit from a nozzle, "a" subscript marks air values, "w" subscript marks water values, $\rho$ denotes the water density, P denotes pressure, $P_a$ is ambient air pressure, V is water volume, and u is water velocity. Pressure of the inlet water, $P_{in}$, and of the injected air $P_a$, were measured, as were flow rate of both the water and the air. $u_{in}$ is calculated based on the flow rate and the cross-section.

Experiments using a nozzle show above 80% efficiency by virtue of isothermal expansion of the gas in the water.

A comparison was performed, comparing a load on a load cell connected to a nozzle operating by flow of only HTF compared to flow of HTF with gas or air bubbles at rates up to 10 g/sec of gas, at a pressure of up to 3 Bar.

FIG. 12A shows a first water jet 1202 emerging from a nozzle, and FIG. 12B shows a second gas-and-water jet 1204 emerging from the same nozzle, where 10 g/sec of air at 2 Bar pressure was added to the water.

The distance and height to which the jets 1202 1204 reach illustrate that the second jet 1204 contains more energy than the first jet 1202.

Reference is now made to FIG. 13, which is a simplified flow chart illustration of a method according to an example embodiment.

The example embodiment method of FIG. 13 is a method for converting heat to mechanical work including:
  providing incoming heat transfer fluid (HTF) at a first temperature to a mixing chamber (1302);
  providing incoming compressed gas at a second temperature to the mixing chamber (1304);
  enabling the gas and the HTF to mix, producing a gas-and-HTF mix (1306);
  enabling the HTF in the gas-and-HTF mix to heat the gas and isothermal expansion of the gas in the gas-and-HTF mix (1308);
  limiting volume of the HTF in the gas-and-HTF mix, thereby increasing pressure of the gas and causing acceleration of a flow of the gas-and-HTF mix (1310);
  causing the gas-and-HTF mix to eject through a nozzle, thereby converting the heat of the HTF to kinetic energy (1312); and
  using the kinetic energy to produce mechanical work (1314).

Figure 14:
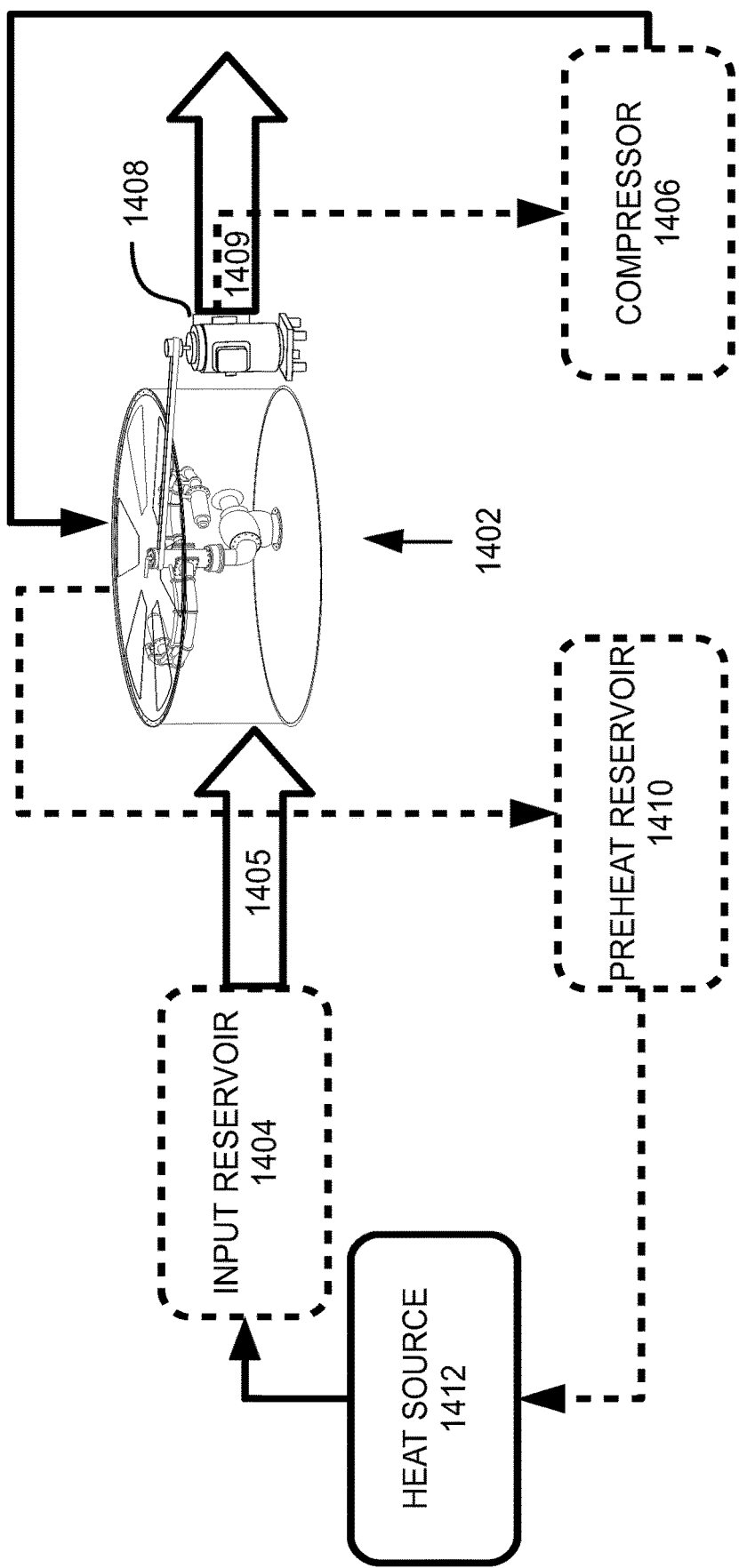
FIG. 14 is a simplified illustration of a system according to an example embodiment.

Reference is now made to FIG. 14, which is a simplified illustration of a system according to an example embodiment.

The system of FIG. 14 includes energy producing components as described herein, and additional optional components.

FIG. 14 shows a heat engine 1402, powering an electric generator 1408.

In some embodiments, the heat engine 1402 may power a compressor 1406 providing compressed air or gas to the heat engine 1402.

In some embodiments, the electric generator 1408 may power the compressor 1406 providing compressed air or gas to the heat engine 1402.

In some embodiments, heated fluid for operating the heat engine 1402 is provided 1405. The fluid is heated by a heat source 1412, such as, by way of some none-limiting example solar heating, geothermal heating, waste heat from power plants, heat from coolant used to cool atomic power plants, heat from coolant used to cool fossil fuel power plants, fossil fuel burning, heat from industrial applications, such as cement manufacturing, endothermic chemical reactions, and so on.

In some embodiments, the heated fluid may optionally be stored in an optional input reservoir 1404.

In some embodiments, hot gas or air from the heat engine 1402 may optionally be used to heat fluid in a pre-heat reservoir 1410 which potentially harvests heat exiting from the heat engine 1402, and optionally uses the heat to preheat the fluid intended for use in operation of the heat engine 1402.

In some embodiments, isochoric heating of compressed air is done in the heat engine 1402. The heated air arrives at a nozzle in the heat engine and produces mechanical energy as rotational motion.

In some embodiments, part of the mechanical energy drives the compressor 1406, optionally via a mechanical shaft or belt or chain drive, and additional mechanical energy is used to power the electric generator 1408.

In some embodiments, the electric generator may also be driven via the mechanical shaft or belt or chain drive.

In some embodiments, air is used as the gas being compressed, and molten salt, for example at a temperature of 550 degrees Celsius, is used as a heat transfer fluid. The hot air emerging from the nozzle, potentially at near to ambient pressure, yet still hot, for example at a temperature of close to 550 degrees Celsius, may optionally be directed to the preheat reservoir 1410, for heat reuse.

In some embodiments, the emerging hot air may optionally drive a second heat engine (not shown), in some embodiments at a lower temperature.

The system shown in FIG. 14 is expected to operate with an efficiency $\eta > 40\%$, calculated as described in the equation above.

It is expected that during the life of a patent maturing from this application many relevant heat engines will be developed and the scope of the term heat engine is intended to include all such new technologies a priori.

As used herein with reference to quantity or value, the term "about" means "within +75% of".

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for converting heat to mechanical work comprising:
providing incoming heat transfer liquid (HTL) at a first temperature to a plurality of mixing chambers;
providing incoming compressed gas at a second temperature to the plurality of mixing chamber;
enabling the gas and the HTL to mix, producing a gas-and-HTL mix;
enabling the HTL in the gas-and-HTL mix to heat the gas and isothermal expansion of the gas in the gas-and-HTL mix;
limiting volume of the gas-and-HTL mix, thereby increasing pressure of the gas and causing acceleration of a flow of the gas-and-HTL mix;
causing the gas-and-HTL mix to eject through a plurality of nozzles, thereby converting the heat of the HTL to kinetic energy to cause movement of the plurality of nozzles; and
using the kinetic energy to produce mechanical work.

2. The method according to claim 1, wherein the first temperature of the incoming HTL is greater than 90 degrees Celsius.

3. The method according to claim 1, wherein the second temperature of the incoming gas is lower than the first temperature.

4. The method according to claim 1 wherein the gas is quasi-isochorically or isochorically heated by the HTL.

5. A method for converting heat to mechanical work comprising:
providing incoming heat transfer fluid (HTL) at a first temperature to a plurality of mixing chambers;
providing incoming compressed gas at a second temperature to the plurality of mixing chamber;
enabling the gas and the HTL to mix, producing a gas-and-HTL mix;
enabling the HTL in the gas-and-HTL mix to heat the gas and isothermal expansion of the gas in the gas-and-HTL mix;
limiting volume of the gas-and-HTL mix, thereby increasing pressure of the gas and causing acceleration of a flow of the gas-and-HTL mix;
causing the gas-and-HTL mix to eject through a plurality of nozzles, thereby converting the heat of the HTL to kinetic energy to cause movement of the plurality of nozzles, wherein the plurality of nozzles is mounted on a turbine to result in its rotation; and
using the kinetic energy to produce mechanical work.

* * * * *